Sept. 6, 1966 T. E. ALLEN ETAL 3,271,524

KEY TYPE COMMON CONTROL TELEPHONE SWITCHING SYSTEM

Filed Sept. 27, 1961 33 Sheets-Sheet 1

INVENTORS
T. E. ALLEN
W. R. BAKER
R. H. BIDLACK
K. N. GARDNER
W. E. MULLAN, JR.
M. E. OZENBERGER
L. E. VAN DAMME

BY Donald M Duft

ATTORNEY

KEY TYPE COMMON CONTROL TELEPHONE SWITCHING SYSTEM

Filed Sept. 27, 1961 33 Sheets-Sheet 2

KEY TYPE COMMON CONTROL TELEPHONE SWITCHING SYSTEM

Filed Sept. 27, 1961

Sept. 6, 1966 T. E. ALLEN ETAL 3,271,524

KEY TYPE COMMON CONTROL TELEPHONE SWITCHING SYSTEM

Filed Sept. 27, 1961 33 Sheets-Sheet 4

Sept. 6, 1966 T. E. ALLEN ETAL 3,271,524

KEY TYPE COMMON CONTROL TELEPHONE SWITCHING SYSTEM

Filed Sept. 27, 1961 33 Sheets-Sheet 5

KEY TYPE COMMON CONTROL TELEPHONE SWITCHING SYSTEM

Filed Sept. 27, 1961

KEY TYPE COMMON CONTROL TELEPHONE SWITCHING SYSTEM

Filed Sept. 27, 1961 33 Sheets-Sheet 7

Sept. 6, 1966 T. E. ALLEN ETAL 3,271,524

KEY TYPE COMMON CONTROL TELEPHONE SWITCHING SYSTEM

Filed Sept. 27, 1961 33 Sheets-Sheet 9

KEY TYPE COMMON CONTROL TELEPHONE SWITCHING SYSTEM

Filed Sept. 27, 1961 33 Sheets-Sheet 11

KEY TYPE COMMON CONTROL TELEPHONE SWITCHING SYSTEM

KEY TYPE COMMON CONTROL TELEPHONE SWITCHING SYSTEM

KEY TYPE COMMON CONTROL TELEPHONE SWITCHING SYSTEM

KEY TYPE COMMON CONTROL TELEPHONE SWITCHING SYSTEM

KEY TYPE COMMON CONTROL TELEPHONE SWITCHING SYSTEM

Filed Sept. 27, 1961 33 Sheets-Sheet 18

KEY TYPE COMMON CONTROL TELEPHONE SWITCHING SYSTEM

Filed Sept. 27, 1961 33 Sheets-Sheet 19

KEY TYPE COMMON CONTROL TELEPHONE SWITCHING SYSTEM

Filed Sept. 27, 1961 33 Sheets-Sheet 23

Sept. 6, 1966 T. E. ALLEN ETAL 3,271,524

KEY TYPE COMMON CONTROL TELEPHONE SWITCHING SYSTEM

Filed Sept. 27, 1961 33 Sheets-Sheet 26

KEY TYPE COMMON CONTROL TELEPHONE SWITCHING SYSTEM

KEY TYPE COMMON CONTROL TELEPHONE SWITCHING SYSTEM

Filed Sept. 27, 1961 33 Sheets-Sheet 28

KEY TYPE COMMON CONTROL TELEPHONE SWITCHING SYSTEM

KEY TYPE COMMON CONTROL TELEPHONE SWITCHING SYSTEM

Filed Sept. 27, 1961

United States Patent Office 3,271,524

Patented Sept. 6, 1966

3,271,524

KEY TYPE COMMON CONTROL TELEPHONE SWITCHING SYSTEM

Theodore E. Allen, Topsfield, Mass., Walter R. Baker, North Hollywood, Calif., Richard H. Bidlack, Boonton, N.J., Karl N. Gardner, San Gabriel, Calif., William E. Mullan, Jr., Washington, D.C., and Milton E. Ozenberger and Louis E. Van Damme, Summit, N.J., assignors to Bell Telephone Laboratories, Incorporated, New York, N.Y., a corporation of New York Filed Sept. 27, 1961, Ser. No. 141,178

28 Claims. (Cl. 179—27)

Figures 1A, 1F:
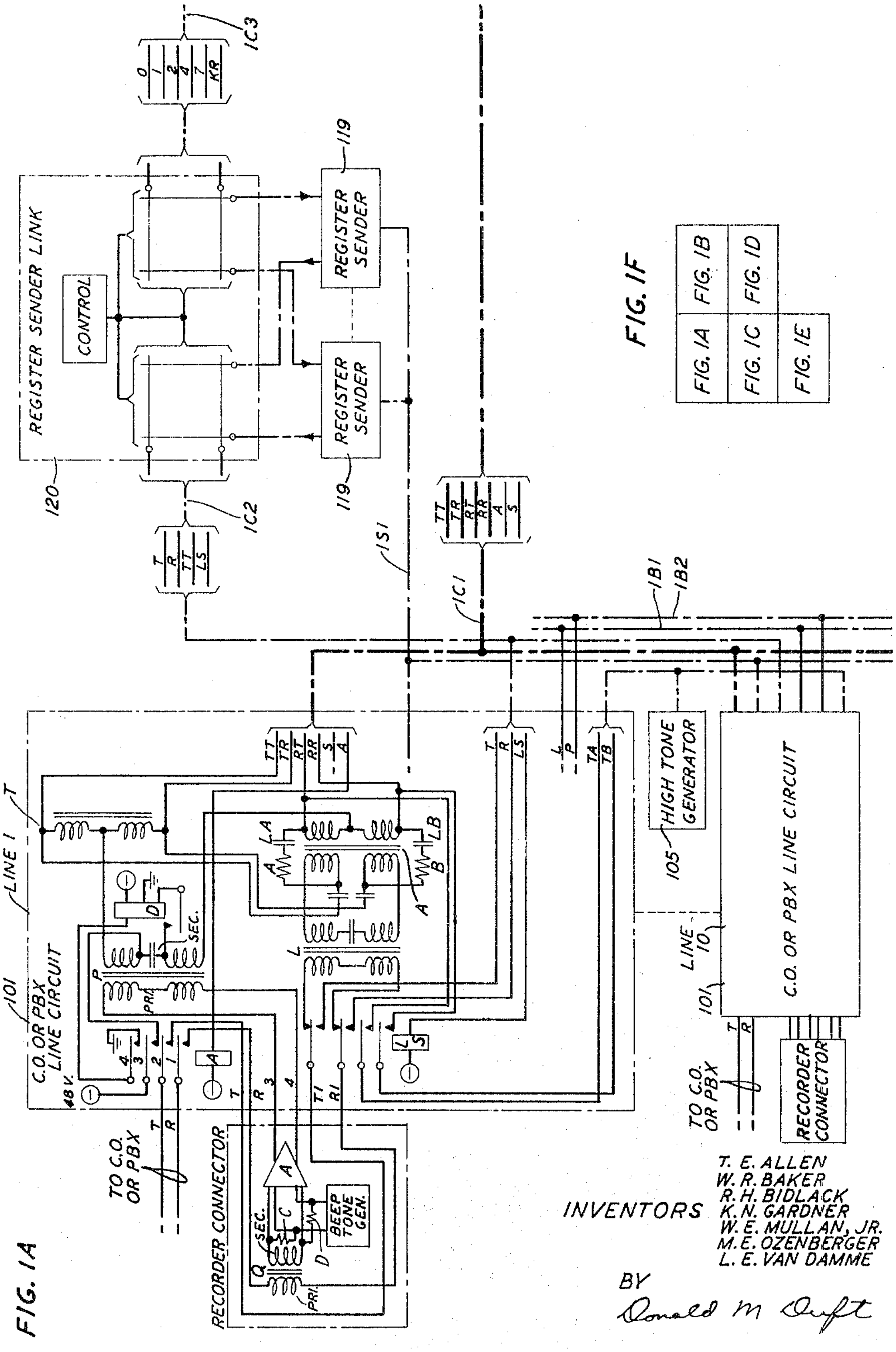

The present invention relates to a switching system and more particularly to a switching system having subscriber stations and attendant positions in which facilities are provided for serving calls from attendant positions to subscriber stations, from subscriber stations to attendant positions, and from one attendant position to another.

Still more particularly, the present invention relates to a private line key type switching system of the type described wherein any position may, under control of an attendant thereat, be interconnected with any subscriber station or other attendant position, and wherein certain of said stations have access to all attendant positions while others of said stations have access to only a single attendant position.

The present invention also relates to a private line key type switching system of the type described having different classes of interconnecting facilities with the class that is provided for interconnecting a particular station and a particular position, or one position with another, being determined in part by the calling rate therebetween.

Key type switching systems are a specialized type of switching system and are used in certain installations where the more conventional station to station switching system is not wholly suitable. In these installations, the key type system, due to its greater flexibility, provides a more convenient, economical and rapid interconnecting means for subscriber stations and attendant positions.

The disclosed system may advantageously be utilized by an organization, such as a governmental agency, which has frequent occasion to supply information to or interchange information with a plurality of outside individuals, agencies, or other organizations. In such an installation the attendants would probably be employees of the organization using the system while the subscriber stations would be situated at and under control of the plurality of outsiders with whom the attendants have occasion to communicate. When so used, the attendants may call any station in order to supply information to or receive information from the subscriber served by the called station, the attendants may call each other in order to interchange information, and the subscribers may call the attendants either to supply or receive information.

An example of an agency which might advantageously utilize the services of the presently disclosed system is the Federal Aviation Agency which is responsible for the regulation and control of air traffic in the United States. In connection with the control of this traffic, the F.A.A. has established a plurality of strategically located flight control centers each of which has jurisdiction over the aircraft in its area. Each flight control center is staffed by a plurality of Controllers, one for each section in the area, with each Controller being responsible for the aircraft in his sector. In connection with the fulfillment of his duties, each Controller has occasion to make frequent contact with the various aircraft currently in his sector as well as with a number of ground stations such as for example, the airlines owning the planes, weather bureaus, airport and airline dispatch centers, military aircraft control stations, airport control towers, police, etc.

If the presently disclosed system were to be used by the F.A.A., each Controller would be situated at an attendant position and the various parties with whom he frequently converses would be equipped with one or more of the disclosed subscriber stations. When so arranged, each Controller would utilize the facilities at his attendant position to receive calls from the various stations, to complete calls to any desired station, and to complete calls to other attendant positions.

The presently disclosed switching system differs from the more conventional public telephone system in that its over-all purpose is not to interconnect two subscriber stations but instead, is to interconnect either an attendant position with a subscriber station or two attendant positions with each other. Also, the attendants in this system are provided not to extend calls from one subscriber station to another but instead, to receive calls from subscriber stations, to effect calls from their own positions to subscriber stations, and to effect calls from their own to other attendant positions. Also, the disclosed system differs from conventional public switching systems in that the majority of its subscribers are not members of the general public but instead, are members of the various organizations which have occasion to communicate frequently with the organization which utilizes and controls the disclosed switching system. Further, most of the subscriber stations do not, by means of the facilities provided by this system, have access to the public telephone system and conversely, the stations of the public telephone network have only a limited access to the facilities of this system. In other words, this system is provided mainly to facilitate interconnections between the various stations and positions of which it is comprised and, it is not, for the most part, provided for facilitating interconnections between it and stations of public telephone systems.

The present system is intended for use in installations where the subject matter of the calls served thereby may often be of an urgent nature which requires that they be completed without delay. Therefore, facilities are provided whereby all calls initiated by an attendant are completed to the called party regardless of the current calling load of the system and also regardless of the current idle or busy condition of the called circuit. This feature also distinguishes the present invention from the conventional public telephone systems in which, due to the fact that a large plurality of line circuits are often interconnected by a fewer plurality of link circuits, calls may not be completed during periods of heavy loads due to the unavailability of an idle link. Also, in the public systems, calls are not completed in the event that the called line is busy.

It is desirable in switching systems of the disclosed type to provide each attendant with access to all subscriber stations as well as access to all other attendant positions. Also, experience has shown that the traffic from a given position is not equitably distributed but instead, each position makes a majority of its calls to a relatively limited number of stations and positions. Therefore, insofar as economies of labor and time are concerned, an attendant should be able to complete a connection to a frequently called station or position with a minimum of effort. Also, since each attendant places a relatively small percentage of his calls to the remaining stations and positions, his labors will not be appreciably increased if slightly more effort is required to call these than is required for the frequently called stations and positions.

Experience has shown that it is necessary to provide certain subscriber stations with access to all attendant positions while other subscriber stations require access to only a single position. Consequently, it is desirable to provide stations requiring access to all positions with facilities whereby they may select or control the position to which each call placed by them is directed, while for those stations which have access to only a single position, no such selection means is necessary and it is quite satisfactory to automatically direct all their calls to one position.

It may be seen from the foregoing that a key type switching system should, among other things, have facilities whereby each attendant may effect an interconnection to frequently called stations and positions with less time and effort on his part than is required to effect interconnections with stations and positions which are less frequently called; whereby certain subscriber stations have access to all attendant positions together with facilities for selecting the position to which each call is directed; whereby the remaining subscriber stations have access to only a single attendant position; and whereby all calls placed by an attendant are completed to the called circuit regardless of its idle or busy condition.

Accordingly, an object of the invention is to provide an improved switching system for facilitating calls between subscriber stations and attendant positions as well as between the various attendant positions.

It is a further object of the invention to provide an improved switching system for facilitating calls between subscriber stations and attendant positions as well as between attendant positions where the various stations and attendant positions have varied traffic patterns and calling rates.

It is a further object of the invention to provide an improved switching system comprising subscriber stations and attendant positions wherein the various stations and positions are provided with different call facilities as determined by the service requirements of each station and position.

It is a further object of the invention to provide an improved switching system for facilitating calls between subscriber stations and attendant positions where all calls from an attendant are completed to the called circuit regardless of its idle or busy condition.

In accordance with the present invention, a key type switching system comprising subscriber lines and attendant positions is disclosed where means is provided for interconnecting the stations and positions over various classes of facilities depending upon the service requirements of each and where each attendant has means at his position for controlling the operation of the equipment comprising the various facilities in order to interconnect his position with the subscriber stations and other attendant positions. The disclosed system also provides each subscriber station with access to the number of attendant positions required by the nature of the calls emanating from each such station.

As already discussed, the majority of the calls placed by an attendant are directed to a relatively few of the many stations and positions, for example, six or so in a moderately sized system. This being the case, it is more desirable that he be able to complete such calls with a minimum of time and effort than it is for calls to infrequently called stations and positions.

Accordingly, the system of the present invention provides two classes of outgoing facilities, designated direct access and indirect access, at each attendant position. The direct access facilities at a position include a direct access key and lamp for each station or other position to which the attendant has occasion to make frequent calls. When so equipped, each direct access key and lamp is individually associated with one of the frequently called stations or positions and a call may be completed to any such station or position by merely momentarily depressing its associated key. Thus, in a system having approximately 100 stations and positions total, a particular attendant may have occasion to make frequent calls to approximately six of these and accordingly, his position would then be equipped with 6 direct access keys and lamps, each of which would be individually associated with one of the frequently called stations or positions. The condition of the lamp associated with each direct access key provides the attendant with an indication of the current idle or busy status of its associated circuit. For example, as is fully described hereinafter, a fluttering lamp represents the circuit with which the attendant is currently connected, a flashing lamp represents an incoming but unanswered call, a steadily lit lamp indicates a circuit whose call has been answered at another attendant position, a winking lamp represents a circuit in a "hold" condition while an unlighted lamp represents an idle circuit.

The momentary depression of a direct access key effects the necessary circuit actions to connect the calling position with the subscriber station or the attendant position represented by the direct access key. An attendant who is currently conversing over one circuit, upon seeing a flashing lamp associated with a direct access circuit, need only momentarily depress the direct access key associated with the flashing lamp to disconnect his position from the circuit to which it is currently connected and to connect it with the calling direct access circuit represented by the flashing lamp.

Thus, the direct access facilities of the present invention provide a means whereby an attendant may answer calls from or initiate calls to any subscriber station or attendant position represented by a direct access key at his position. This provides an ideal means whereby each attendant may communicate with the stations and position he has occasion to contact frequently.

The indirect access call facilities at each position include a nonlocking indirect access key and lamp together with a key type dialing mechanism. Each position and station in the system is assigned an indirect access code, the number of digits in which depends upon the size of the system. An attendant may call any station or other position by first momentarily operating his indirect access key and by then dialing the code assigned to the called station or position. The common control switching equipment of the present invention responds to this operation and interconnects the calling attendant with the station or position represented by the digits dialed.

The lamp associated with the indirect access key, in a manner similar to that described for the direct access lamps, flutters to indicate that the attendant is connected to a called party over the indirect access facilities. The normal condition of the lamp signifies an idle condition of the indirect access circuit. The indirect access lamp will normally never be in a flashing condition, thereby indicating the presence of an incoming call, since the indirect access facilities are not normally utilized for incoming calls. Also, for reasons explained hereinafter, the indirect access lamp will never glow steadily.

Thus, the indirect access facilities permit an attendant to call any station or position, and in particular those with which he seldom converses and to which he does not have direct access at his position. However, since each station and position in the system is assigned an indirect access code, an attendant may, if he desires, also reach by means of his indirect access facilities any of the parties associated with the direct access keys at his position.

The various subscriber stations comprising this system are served by different types of line circuits in accordance with the service requirements of each subscriber. Thus, stations positioned a considerable distance from the switching center are served by toll type line circuits while those relatively near are served by local type line circuits. Also, some stations are served by line circuits which provide for automatic ringing while others are served by line circuits which require manual operation of certain keys by the calling attendant in order to effect ringing at the stations connected to such line circuits.

The service requirements of certain subscribers may be very specific in that all of their business is normally transacted with a single attendant. Such a subscriber has no reason to contact any other attendant and therefore is served by a line circuit which provides no selectivity in determining the destination of calls initiated by him. As soon as such a subscriber picks up his handset to initiate a call, the disclosed switching equipment operates to interconnect him with the one and only attendant position to which he has access. Calls from line circuits of this type normally arrive at a position by means of its direct access facilities and are manifested by a flashing of their associated direct access lamp at the called position.

Other subscribers may have more demanding service requirements which necessitate that they be provided with facilities for directing calls to different attendant positions depending upon the subject matter of each call. These subscribers are served by line circuits having a destination selecting means operable under control of the calling subscriber to select the destination of each call. Each attendant position is assigned a two-digit code and subscribers served by these line circuits complete a call to a particular position by lifting their handset and dialing the two-digit code assigned to the called position. The disclosed switching equipment responds to the dialed impulses to interconnect the calling station with the attendant position represented by the dialed code.

Calls of this type are received at the called attendant position by means of what is designated as the primary common answering (PCA) facilities. Associated with these facilities is a PCA key and lamp together with auxiliary PCA lamps designated 1, 2 and 3. The PCA key, the four aforementioned lamps, and the switching equipment associated therewith comprises a call storage queue whereby, in the event that two or more subscribers call the same position, calls are answered at the position in the order in which they are received. Thus, the first call to arrive is manifested by the flashing of the PCA lamp and the lamp designated 1. PCA type calls are answered in the same manner as are other calls; namely, by momentarily operating the associated key, in this case, the PCA key. In the event that the attendant operates the PCA key to answer the first call before any other calls arrive at his position, the PCA lamp changes from a flashing to a fluttering condition and the lamp designated 1 goes out. However, in the event that a second call arrives before the first call is answered, its arrival is manifested by the flashing of lamp 2. If the attendant operates his PCA key at this time to answer the call, the first call to arrive is answered and the call which was manifested by the flashing of lamp 2 and which was the second to arrive now moves up one in the queue and is represented by the flashing of the 1 lamp. On the other hand, in the event that a third call should arrive before the attendant answers the first call, its arrival is manifested by the flashing of lamp 3. All three lamps will continue to flash until the attendant operates his PCA key to answer the first call. When this is done, the first call is answered and the second and third calls move up one in the queue and are represented by the flashing of lamps 1 and 2. At this time, a fourth subscriber may call this position and the arrival of his call will be manifested by the flashing of lamp 3. Any subscriber who attempts to contact a position at the time that three calls are in the storage queue, will receive a busy tone in the conventional manner.

Interconnections exist between the various attendant positions so that one attendant may assist another attendant in the event that the other posiion is currently overloaded with incoming calls. Thus, each position is equipped with a secondary common answering (SCA) key and lamp together with lamps designated 1, 2, 3. These lamps are essentially in parallel with the lamps PCA 1, 2 and 3 at another position so that in the event that the attendant at the other position operates a lamps transfer key when his position is overloaded, the lamps SCA 1, 2 and 3 are energized in parallel with the lamps PCA 1, 2 and 3 at the overloaded position. The attendant at the secondary position may then answer any of the PCA calls at the overloaded position by momentarily depressing his SCA key.

A particular line circuit may have a direct access appearance at a plurality of attendant positions. The initiation of a call by such a circuit causes a lamp to flash at each position the calling circuit has a direct access appearance. By prearrangement, each attendant is directed to answer the calls on some of his direct access circuits ahead of others of his direct access circuits. This is termed primary answering responsibility and by means of it, an incoming call over a circuit having a direct access appearance at a plurality of positions will normally be answered by the attendant who has primary answering responsibility for the calling circuit. However, an attendant at any other position at which the circuit appears for direct access may answer the call in the event the attendant having primary answering responsibility therefore is busy or otherwise unavailable.

Each attendant position may be equipped with the following special function keys: a hold key which permits certain types of calls to be held in the conventional manner; a chime key which when operated permits the arrival of certain calls to be manifested by an audible signal as well as a flashing lamp; a lamps transfer key which when operated connects its lamps PCA 1, 2 and 3 in parallel with lamps designated SCA 1, 2 and 3 at a secondary position so that, as already mentioned, the attendant at the secondary position may assist the attendant at the primary position in answering incoming PCA calls; a short ring key and a ring and flash key which provide special ringing potentials for line circuits not equipped for automatic ringing of called stations; a release key whereby an attendant may disengage his position from an existing connection without effecting a new connection; and a key which permits the attendant to direct speech sigals incoming to his position from other attendants to either his headset receiver or to a loudspeaker at his position.

Each position has many lamps and therefore at certain times the lamp pattern may be such that, due to its visual complexity, an attendant may have difficulty in recognizing the arrival of certain calls. Accordingly, the present invention provides means whereby certain lamp signals at a position may be extinguished upon the arrival at a position of a call or calls which are more important insofar as the attendant thereat is concerned. This feature is called the position pilot blanking and it is associated with a red lamp bearing the designation P which flashes upon the arrival of any such important calls. Normally, each position is arranged so that the arrival of a PCA type call or a call for which the position has primary answering responsibility causes the direct access lamps to be extinguished for which the position does not have such responsibility. However, the lamp for a direct access circuit to which the called attendant is currently connected is not extinguished even if the attendant does not have primary answering responsibility therefor.

This lamp extinguishing operation is under control of the calling line circuit which, if the arrival of its calls at a particular position is to effect such an operation, applies a blanking potential to the position to effect the foregoing extinguishment of certain direct access lamps and the flashing of the P lamp. The direct access lamp indications which may be extinguished by the banking potential include steady direct access lamp indications for calls answered at other positions and flashing lamps indicating incoming calls.

Calls between positions are referred to as override calls since they proceed to completion at the called position regardless of its idle or busy condition at the time. Each position is equipped with an override lamp designated OV which is illuminated upon the arrival of an override call.

An attendant may make an override call to another position by means of the indirect access facilities which, as before described, enable him to call to any station or any position by operating his indirect access key and by then dialing its indirect access code. Also, it is possible that two positions may have frequent occasion to converse with one another and consequently it may be desirable to provide a direct access link between the two. In this case, each position will be represented by a direct access key and lamp at the other position and either attendant may reach the other on an override basis by operating a direct access key.

A feature of the invention is the provision of a switching system having nonlocking pushbutton keys at an attendant position for effecting a connection between the attendant position and various types of called lines by a momentary operation of the key associated with the called line.

A further feature of the invention is the provision in a switching system of attendant positions which have a single nonlocking pushbutton type key and a pushbutton dialer both of which are functionally associated with all subscriber lines and whereby upon the operation of the key and the dialing of a code assigned to the called station, the calling attendant position and the called station are interconnected.

A further feature of the invention is the provision in a telephone switching system of attendant positions having a plurality of direct access keys each of which is individually associated with a different subscriber station and each of which when operated interconnects the position with the station represented thereby.

A further feature of the invention is the provision of a switching system having attendant positions and subscriber stations together with facilities at each attendant position for enabling the attendant thereat to complete an interconnection to another attendant position regardless of whether the other attendant is, at the time, connected to a subscriber station.

A further feature of the invention is the provision of a switching system having subscriber stations and attendant positions where each position has a plurality of lamps which may be simultaneously energized to display the calling condition of various lines together with means at the position for alerting the attendant to the presence of incoming calls on a certain line by causing the lamp associated with the certain line, as well as an auxiliary lamp, to flash while the lamp displays for calls on other lines are extinguished.

A further feature of the invention is the provision of a switching system having attendant positions and subscriber stations wherein each attendant position is provided with call storage facilities whereby a plurality of calls may be received at the position while the attendant is busy with a prior call and which upon the momentary depression of a nonlocking pushbutton type key permits the attendant to answer the calls in the order in which they are received at his position.

A further feature of the invention relates to the provision of a switching system comprising attendant positions and subscriber stations whereby certain of the subscriber stations have facilities for selectively interconnecting themselves with any attendant position and whereby each attendant position has call storage facilities which, by the operation of a nonlocking pushbutton type key permits each attendant to answer the calls received from such subscriber station in the order in which they are received at his position by momentarily depressing the nonlocking key.

A further feature of the invention relates to the provision of a switching system having subscriber stations and attendant positions whereby each attendant position has call storage facilities including lamp displays associated therewith for storing the arrival of calls at the position at the time its attendant is busy on another call and for indicating the arrival of the stored calls by means of the lamp displays together with switch means at each position for enabling its attendant to energize a lamp display at a second attendant position to manifest the storage of calls at the first attendant position so that the attendant at the second position may operate a key to interconnect his position with the stored calls in the order of their arrival.

A further feature of the invention is the provision, in a telephone switching system having attendant positions and subscriber stations, of facilities whereby certain stations have access to only a single attendant position and whereby other stations have access to all attendant positions.

Figure 28:
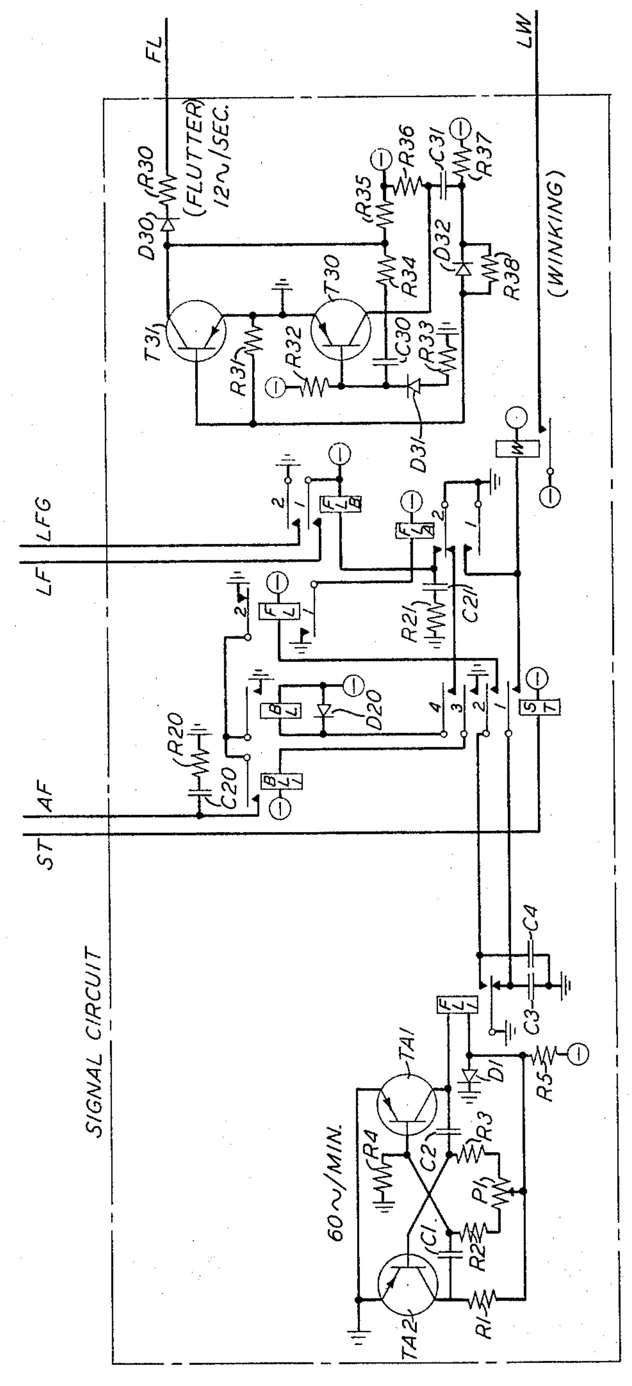
Figure 29:
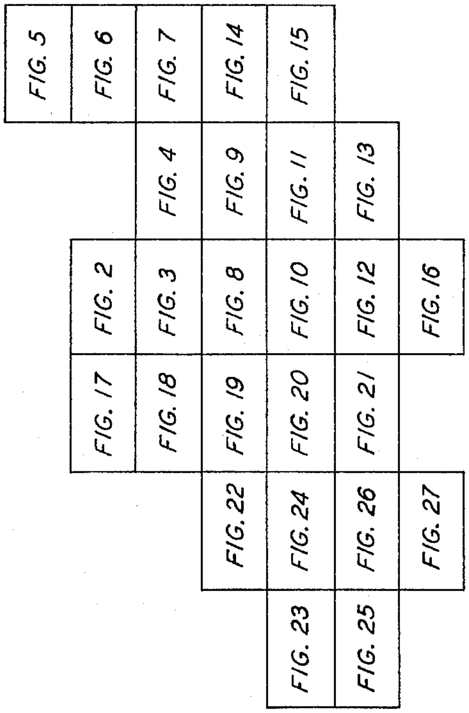

These and other objects and features of the invention will become apparent from a reading of the following description taken in conjunction with the drawing, in which:

FIGS. 1A through 1E together disclose the present invention partially in detail and partially in diagrammatic form;

FIG. 1F shows how FIGS. 1A through 1E should be arranged with respect to each other;

FIGS. 2 through 27 together illustrate in detail an exemplary embodiment of the present invention;

FIG. 28 discloses the details of the Signal Circuit which is shown only diagrammatically on various ones of FIGS. 2 through 27; and FIG. 29 shows how FIGS. 2 through 27 should be arranged with respect to each other.

The following description of the present invention is of considerable complexity and therefore, it is subdivided as shown in the following outline in order to facilitate its understanding and to provide ready access to any desired portion of the description. As may be seen, the specification is divided into a general descriptive portion designated 1.00 and a detailed descriptive portion designated 2.00.

Section 1.00 together with its subsections describes the invention in general terms, with respect to FIGS. 1A through 1E. Section 2.00 together with its subsections describes the invention in detail with respect to FIGS. 2 through 28.

1.00 General Description
- 1.01. Line Circuits
- 1.02. Attendant Position Equipment
- 1.03. Line Position Connector Circuits
- 1.04. Indirect Access Circuits
- 1.05. Register Senders and Link
- 1.06. Methods of Operation
  - 1.06-1. Direct Access—Outgoing Calls
  - 1.06-2. Direct Access—Incoming Calls
  - 1.06-3. Incoming Calls—Dial Selection of Attendant Positions, call Storage and Answering
  - 1.06-4. Incoming Calls—Primary and Secondary Common Answering
  - 1.06-5. Indirect Access to Line Circuits
  - 1.06-6. Override (Intercommunication) — Direct Access Method
  - 1.06-7. Override (Intercommunication) — Indirect Access Method
  - 1.06-8. Dial Selection of Central Office or PBX Stations 2.00 Detailed Description
- 2.01 Relay Designations
- 2.02 General Discussion of the Disclosed Detailed Embodiment
- 2.03 Attendant Positions
- 2.04 Direct Access—Call from an Attendant Position 1 to Subscriber Station 1

2.04–1 Activation of Attendant Position
2.04–2 Operation of Direct Access Key and Key Relay Circuit
2.04–3 Operation of Gate Circuit
2.04–4 Operation of Controller Circuit
2.04–5. Operatioin of Key Relay Circuit Preparatory to Operation of the Crossbar Switch
2.04–6. Operation of Select Magnet
2.04–7. Operation of Hold Magnet
2.04–8. Seizure of Line Circuit
2.04–9. Removal of Handset by Called Party
2.04–10. Disconnection
2.05 Call From Subscriber Station 1 to Attendant Position 1
2.05–1. Station 1 Handset Removed from its Mounting
2.05–2. Vertical Stepping
2.05–3. Rotary Stepping
2.05–4. PCA Call Storage Facilities
2.05–5. PCA Lamp Progression as Additional Stations Attempt to Seize Attendant Position 1
2.05–6. PCA Lamp Regression
2.05–7. Position Pilot Blanking
2.06 Primary Common Answering—Call Received at Position 1 from Station 1 is Answered by Operation of the PCA Key
2.06–1. Operation of PCA Key and Key Relay Circuit
2.06–2. Gate Circuit and Controller Operation
2.06–3. Operation of Select Magnet
2.06–4. Operation of Hold Magnets
2.06–5. Seizure of Line Circuit and Release of Controller
2.07 Direct Access Answering by Position 1 of a Call Received from Station 1
2.08 Indirect Access
2.08–1. Operation of Indirect Access (IA) Key and Key Relay Circuit
2.08–2. Indirect Access Circuit
2.08–2.1. Steering Circuit Description
2.08–2.2. Locking Circuit Description
2.08–2.3. Operation of Indirect Access Circuit
2.08–3. Operation of Register Connector
2.08–3.1. Registering
2.08–3.2. Translation
2.08–3.3. Connecting
2.08–3.3A. Two Digit Codes
2.08–3.3A1. Non-Restricted Operation
2.08–3.3A2. Restricted Operation
2.08–3.3A3. Unassigned Codes
2.08–3.3B. Three Digit Codes
2.08–3.4. Clearing
2.08–3.5. Release of Register Connector
2.08–4. Releasing the Indirect Access Control Circuit
2.08–4A. Early Release
2.08–4B. Initiation of Normal Release
2.08–4C. Release of Indirect Access Circuit and Closure of Crosspoints
2.08–5. Miscellaneous Features of Indirect Access Circuit
2.08–5.1. Time Out of the Indirect Access Circuit
2.08–5.2. Clear Function of Indirect Access Circuit
2.08–5.3. Busy Out and Alarm Features
2.08–6. Answer of the Call by the Subscriber at Station 10
2.08–7. Release of the Connection
2.09 Override Connections
2.09–1. Establishment of Connection between Positions 1 and 40
2.09–2. HS-LS Transfer Key
2.09–3. Condition 1—Overridden Position Connected to a Line Circuit or Another Attendant Position and the Headset-Loudspeaker Feature Is in the Headset Condition
2.09–4. Condition 2—Overridden Position Is Connected to a Line Circuit or Another Attendant Position and the Headset-Loudspeaker Feature Is in the Loudspeaker Condition.
2.09–5. Condition 3—The Overridden Position Is Not Connected to a Line Circuit or Another Attendant Position and the Headset-Loudspeaker Feature Is in the Loudspeaker Condition
2.09–6. Condition 4—The Overridden Position Is Not Connected to a Line Circuit or Another Attendant Position and the Headset-Loudspeaker Is in the Headset Condition
2.10 Dialing
2.11 Lamp Signals
2.11–1. Line Lamps
2.11–2. Position Pilot Lamp and Blanking
2.12 Busy Indication
2.13 Hold Winking
2.14 Outgoing Signaling
2.14–1. Automatic Signaling
2.14–2. Manual Signaling
2.15 Holding
2.16 Flashing
2.17 Recording
2.18 Dark Environment Lamp Lighting
2.19 Signal Circuit
2.19–1. Flutter
2.19–2. Flashing
2.19–3. Winking
2.19–4. Blanking

1.00. GENERAL DESCRIPTION

FIGS. 1A, 1B, 1C, 1D, and 1E, when positioned with respect to each other as shown in FIG. 1F, depict a general block diagram of the switching system of the present invention. The figure numbers shown in parentheses within each of the blocks of the block diagram indicate the figures of the drawing where the respective circuits are shown in greater detail.

The switching system of the present invention comprises a crossbar type common control switching system that provides facilities for attendants, at a plurality of attendant positions, to communicate with each other and to communicate, over various types of line circuits, to local stations, to distant stations and to stations served by central offices or PBX's. The switching functions in this system are controlled by nonlocking pushbutton keys at the attendant positions. More than one position can connect to the same line at the same time, but conference connections of more than one line to an attendant position are not permitted. There is no restriction as to the number of calls that can be in progress at the same time in the system of the invention. Transmission through the system is on a four-wire basis.

Figure 1B:
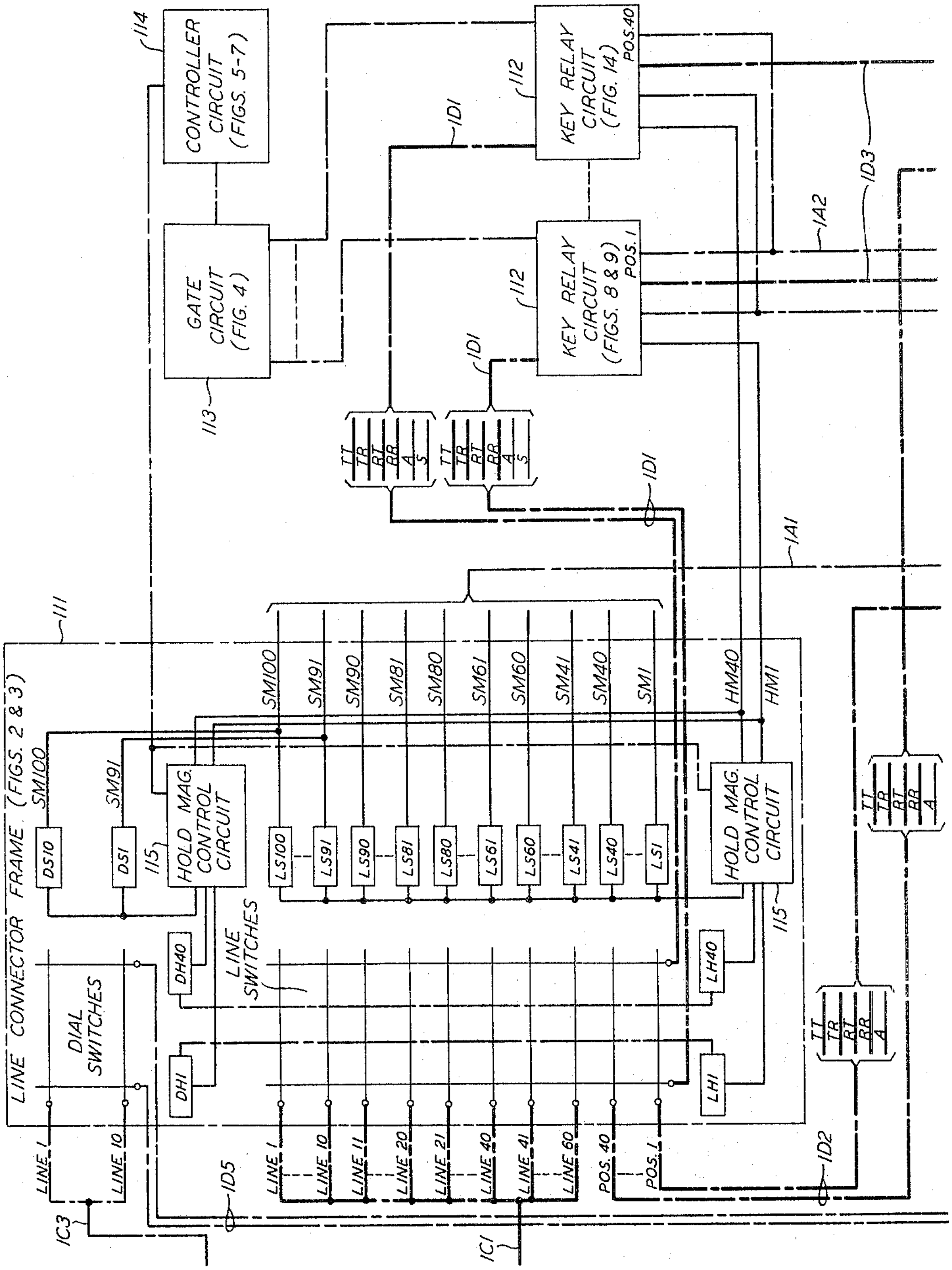

As shown in the block diagram of FIGS. 1A through 1E, the illustrative embodiment of the present invention comprises a plurality of Line Circuits 101, 102, 103, and 104 of various types, a plurality of Attendant Positions 110 (FIG. 1D), a Line Connector Frame 111 (FIG. 1B) through which transmission and signaling paths are established between the lines and the attendant positions under control of the Key Relay Circuits 112 (FIG. 1B), each of which is individually associated with one of the Attendant Positions 110, as well as under control of common control circuits which include the Controller Circuit 114 (FIG. 1B) and the Position Sequence Relay and Gate Circuit 113 (FIG. 1B). The switching system of the present invention also includes a plurality of Indirect Access Circuits 116 (FIG. 1D), each of which is individually associated with an individual Register Connector 117 (FIG. 1D) which, together, are utilized to give the attendant at any Attendant Position 110 access to all lines and to all other Attendant Positions 110 in the system although direct access facility thereto is not provided. The switching system of the present invention further includes a plurality of Register Senders 119 (FIG. 1A) which are utilized to translate the coded output of pushbutton dials in the Attendant Positions 110 into dial pulses. Register Sender Link 120 (FIG. 1A) selectively connects the Register Senders 119 to Attendant Positions 110 via the crossbar switch field and to the line circuits requiring outgoing dial pulse signaling.

1.01. *line circuits*

The line circuits which may advantageously be utilized in the present invention are divided into two general classes; (1) local two-wire line circuits which provide communication between local stations and the attendant positions, and (2) two- or four-wire line circuits which connect distant stations or the tie lines to the attendant positions. The local line circuits may be provided with various features such as manual or automatic outward ringing and inward dial selection of attendant positions. A central office or PBX line circuit provides for dialing by the attendants into a central office or PBX and for ringdown incoming signaling. Various types of signaling may be used on long lines such as manual ringing (loop, simplex, or composite) and outward selective signaling. Each of the two-wire line circuits includes a hybird coil arrangement for connecting the two-wire line to the four-wire transmission conductors of the present system.

The illustrative embodiment of the present invention as shown in the block diagram of FIGS. 1A through 1E, discloses sixty line circuits numbered line 1 through line 60. These circuits are typical of the various types of line circuits which may be utilized in the disclosed system. It is to be understood that in a typical installation of the present invention many more line circuits of various types may advantageously be utilized.

The four-wire transmission leads TT, TR, RT, RR and the control leads, A and S, are cabled via cable 1C1 from each line circuit direct to Line Connector Frame 111 (FIG. 1B) and are terminated on the horizontals of the crossbar field therein. Other control leads from the line circuits are cabled to Cross Connect Field 107 (FIGS. 1C and 1E) for cross connection as required to provide direct and indirect access to the various attendant positions.

Lines 1 through 10 are Central Office or PBX Line Circuits 101, of which line 1 and line 10 are shown. These line circuits provide two-way service between the attendant positions in the present system and dial or manual central offices or PBX's. In addition to the transmission and control leads which are cabled direct to Line Connector Frame 111 (FIG. 1B) in cable 1C1, each of these line circuits terminates a number of leads over which the dial pulses generated by the Register Sender 119 are transmitted. These leads, which include the T, R, and LS leads, are cabled directly to Register Sender Link 120 via cable 1C2 and terminate on the horizontals of the crossbar switches therein.

Each line circuit includes an L and a P lead over which the line and pilot lamps in the attendant positions are controlled. Each of these two leads is cabled from each line circuit via cables 1B1 and 1B2, respectively, to Cross Connect Field 107 (FIGS. 1C and 1E) where they are selectively cross connected as required to provide direct and indirect access and primary answering responsibility at the various attendant positions. Lines 1 through 10 are also connected to High Tone Generator 105 (FIG. 1A) which provides a tone over the receive pair of the transmission path through the switching system during the time that out pulsing by an attendant is taking place. This provides a guard tone to alert another attendant who might seize the line circuit during out pulsing so that the other attendant won't attempt to dial out on the line while he first attendant is dialing.

Lines 11 through 20 are designated Local Line Circuits 102 (FIG. 1C) of which lines 11 and line 20 are shown. These line circuits provide two-way service between the attendant positions and local dial stations of private line customers and are arranged for dial selection of attendant positions by the customers, for automatic or manual ringing toward the stations, for storing a maximum of three incoming calls to the same attendant position, and for answering the three incoming calls in the order in which they were received. Each Local Line Circuit 102 includes a two-motion step-by-step switch and an associated terminal bank. Each Attendant Position 110 (FIG. 1D) in the system is assigned a two-digit code and a subscriber at any station connected to a Local Line Circuit 102 can communicate with any attendant in the system by dialing the attendant's preassigned code.

The step-by-step switch of line circuits 102 is arranged in a manner known in the art to absorb initial "1" dialed digits and thus, a subscriber can select any one of a maximum of ninety attendant positions. Each step-by-step switch is provided with five sets of brushes designated P, PK, L1, L2, and L3 which connect to five contacts at each position in the terminal bank. An L1, an L2, an L3, and a PK lead, over which the common answering and sequence call storage features in this invention are controlled, is connected to its individual bank contact at corresponding positions in the terminal bank of each Line Circuit 102 and is then cabled via cable 1B5 to Cross Connect Field 107 (FIG. 1E) for cross connection to the Attendant Positions 110 as required. Thus, there are ninety sets of L1, L2, L3, and PK leads, numbered 21–20, 31–30 . . . 01–00 in a step-by-step manner, terminated on Cross Connect Field 107.

The fifth contact at each bank position in each Local Line Circuit 102 terminates a P lead which is cabled direct to Cross Connect Field 107 and is utilized to control the pilot lamps and signal blanking circuit in the Attendant Positions 110 when the line circuit has a direct access appearance thereat. Thus, since there are ninety working positions of the SXS switch, there are ninety P leads, numbered 21–20, 31–30 . . . 01–00, cabled from each Local Line Circuit 102 to Cross Connect Field 107. As shown in the block diagram, the P leads for lines 11 and line 20 are cabled to Cross Connect Field 107 via cables 1B3 and 1B4, respectively.

An L lead from each of lines 11 through 20 is also cross cabled via cable 1B1 to Cross Connect Field 107 for cross connection to Attendant Positions 110 which require direct access appearances of these lines. Each of Local Line Circuits 102 has an SM lead cabled via cable 1B6 to Cross Connect Field 107. These leads are cross connected as required to the select magnet operating leads from Line Connector Frame 111.

Lines 21 through 40 are designated Two-Wire Local Line Circuits 103 of which line 21 and line 40 are shown. These lines serve private line customers and provide termination for local manual stations or tie lines in the disclosed system. They may be arranged for manual or automatic outgoing signaling.

Lines 41 through 60 also serve private line customers and are Manual Long Line Circuits 104 of which line 41 and line 60 are shown. They provide two-way service between distant stations and the switching system of the invention via two- and four-wire long lines. The L and P leads from each of lines 41 through 60 are cabled to Cross Connect Field 107 with the corresponding leads of the other line circuits in cables 1B1 and 1B2, respectively.

Local Line Circuits 102 and 103 and Manual Long Line Circuits 104 are arranged for automatic outgoing signaling and hence are connected via leads in cable 1R1 to Power Ring Circuit 106, which provides the ringing current required to ring the subscribers at called stations.

Figure 10:
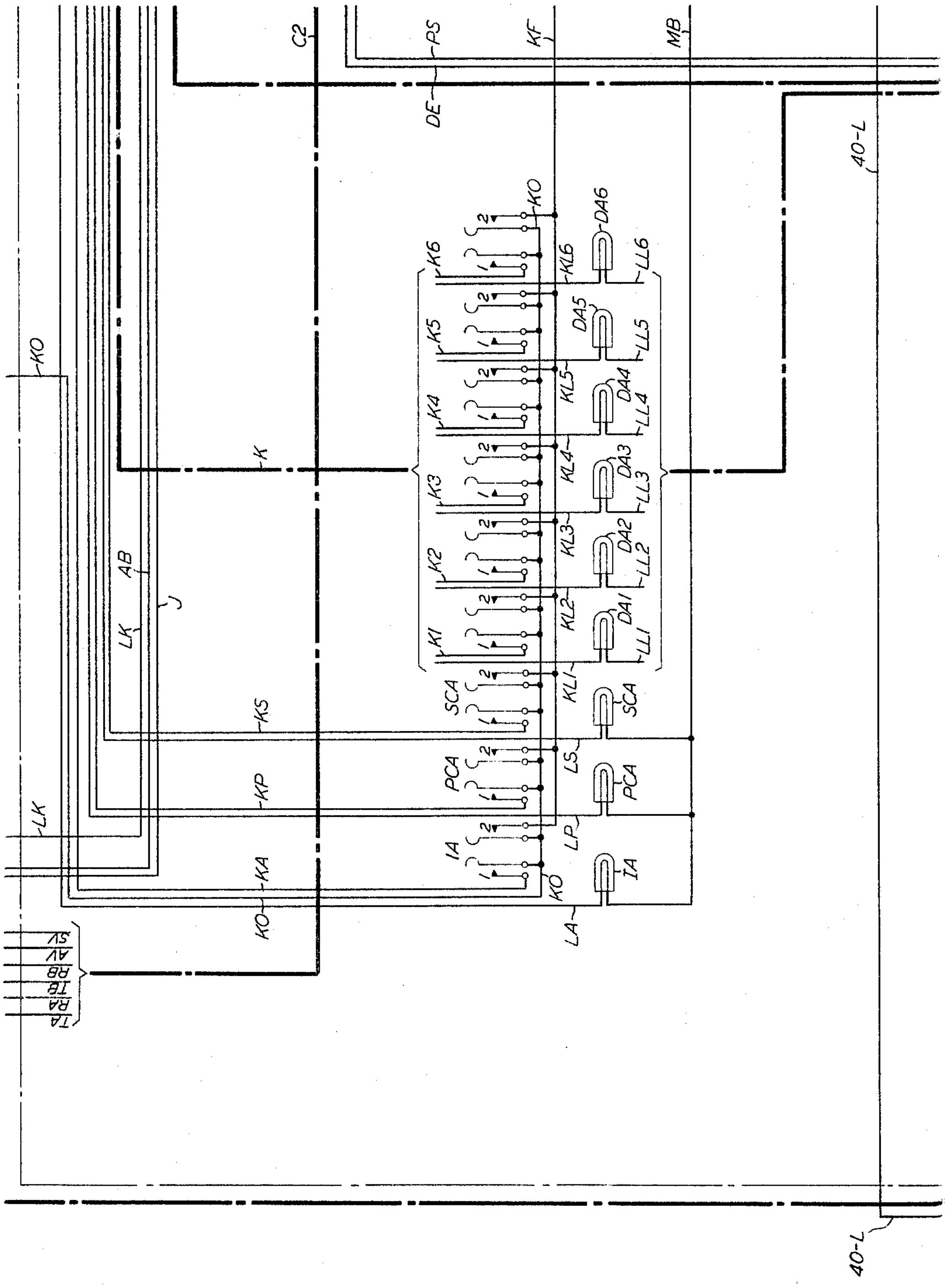

1.02. *Attendant position equipment* (FIG. 10)

The number of attendant positions which will be utilized in the switching system of the present invention depends upon the traffic which a particular installation must handle. The illustrative embodiment of the present system shown in the block diagram of FIGS. 1A through 1E is provided with forty Attendant Positions 110 numbered 1 through 40 of which position 1 and position 40 are shown. Each Attendant Position 110 is equipped with a telephone circuit which provides four-wire transmission to the line circuits of the system with telephone jacks for use with either a hand telephone set or a head telephone set, and with a pushbutton dial which is used both for connecting a position to line circuits and to other attendant positions by the indirect access method and as well as for transmitting dialing signals over selective signaling lines or PBX or central office lines once the position is connected to such lines by either the direct or indirect access facilities. The pushbutton dial includes three control keys (start key, end key and clear key), a ready lamp designated RL (as shown in the block diagram), as well as ten code button keys labeled in accordance with a conventional dial.

Each Attendant Position 110 is also equipped with a number of control keys and lamps. These are provided in modules of six keys and lamps each, and the number provided at any particular attendant position will depend upon the number of line circuits to which the position has direct access. In the Attendant Positions 110 shown in the block diagram, each nonlocking pushbutton key is represented by a small triangle. Lamps of various types are indicated by small circles, and locking turnbutton keys are indicated by a small circle with a pair of parallel lines extending therethrough.

Each Attendant Position 110 is equipped with a number of direct access keys and line lamps designated DA, there being one for each line circuit or override channel to another attendant position to which the attendant has direct access. In the block diagram of FIGS. 1A through 1E, each Attendant Position 110 is provided with six such direct access key and lamp circuits numbered 1 through 6. It is to be understood that any Attendant Position 110 may be equipped with a greater number of such key and lamp circuits if required. Each direct access key and lamp circuit in each Attendant Position 110 has an L lead cabled via cable 1A3 to Cross Connect Field 107 for cross connection to the L lead from the line circuit or other attendant position to which direct access is to be provided.

Each Attendant Position 110 is also equipped with an indirect access key and lamp designated IA in the block diagram which enables the position to connect to any line circuit or to any other attendant position regardless of whether it does or does not have direct access capability thereto. Such a connection is accomplished by first operating the IA key and then by dialing the indirect access code number of the desired line circuit or attendant position. Since each attendant position and each line circuit is assigned an indirect access code consisting of two or three digits, access thereto may be had to any position through the use of the indirect access circuits.

Each Attendant Position 110 is also equipped with a hold key designated HLD which is used to establish a hold condition on central office or PBX line circuits only, a short ring key (designated SR) which is used to provide a timed ringing signal on manual ring-down lines, a ring and flash key (designated R&F) which is used to take the place of a switchhook on central office and PBX line circuits, and which is also used on ring-down lines to provide signaling, a release key (designated RLS) which is used to release an established connection to any attendant position or line circuit, a headset loudspeaker key (designated HS–LS) and an associated loudspeaker transfer lamp (designated LS) which is used to transfer an incoming overrider's speech from the attendant's headset to a loudspeaker and vice versa with the LS lamp indicating when the speech is directed to the loudspeaker.

Each Attendant Position 110 may also be equipped with primary and secondary common answering keys and lamps (designated PCA and SCA) with each group comprising four lamps PCA, 1, 2, 3 and SCA, 1, 2, 3) and a pushbutton key. The PCA lamp and the associated primary common answering lamps designated 1, 2, and 3 provide indications for calls directed to the position over Local Line Circuits 102 only. Each position can have primary common answering for calls directed to it by line circuits 102 only and secondary common answering for calls directed to one other position by line circuits 102 only. Each Attendant Position 110 has L1, L2 and L3 leads cabled via cable 1A3 to Cross Connect Field 107 for cross connection to the L1, L2 and L3 leads from the terminals in the banks of all Local Line Circuits 102 corresponding to the two-digit code assigned to each attendant position. The leads which control the lighting of the secondary common answering lamps 1, 2, and 3 are cabled direct from the primary answering attendant position to the assigned secondary answering attendant position.

If an attendant desires to transfer incoming calls appearing on his PCA 1, 2 and 3 lamps to the associated position which has secondary answering responsibility for these calls, the attendant operates the locking turnbutton secondary lamp cutoff key designated SEC–LPS. This causes the lighting of the secondary common answering lamps 1, 2, and 3 associated with the SCA key and lamp at the associated attendant position in parallel with the lighting of the primary common answers lamps 1, 2, and 3 at the primary attendant position. These calls may then also be answered at this secondary position by the attendant thereat depressing the SCA key at the secondary answering position.

Each Attendant Position 110 has an L lead cabled to Cross Connect Field 107 via cable 1A3 for cross connection to the L leads from the direct access key and lamp circuit in each other Attendant Position 110 having direct access to this position.

When an Attendant Position 110 is located in an area requiring darkened environment, it may be provided with equipment for controlling lamp brightness. This equipment consists of a transistor voltage regulator, an ON-OFF brightness control key (designated BR CONT) and a manually controlled potentiometer. The brightness control equipment provides for dimming the active signals to a no signal condition. The potentiometer (not shown in the block diagram) controls the brightness of the lamps in both the signal and the no signal condition. The ON-OFF brightness control key in the OFF condition restores the signals to normal brightness and cuts off the no signal lighting.

Each of the Attendant Positions 110 may be provided with a position signal blanking circuit, working in conjunction with a position alerting (position pilot) circuit, which provides a means for extinguishing some of the lesser important lamp indications at a particular position upon the receipt thereat of position pilot calls which are of more importance (insofar as the same position is concerned) and which the attendant thereat is instructed to give priority in answering. Specifically, this feature automatically enables any incoming PCA call as well as incoming calls on certain direct access lines to extinguish the direct access lamp displays (at the same position) of direct access lines whose calls are arbitrarily determined to be of lesser importance (to this position). Thus, when an incoming call is directed to a position by a line circuit having blanking and position pilot capabilities, all flashing and steady direct access lamp signals at the position are extinguished except the flashing direct access lamps associated with that call and any other calls that are provided with the position pilot feature at the same position. The position blanking circuit works in conjunction with the position pilot lamp designated P in the block diagram. A P lead associated with each direct access key and lamp in an Attendant Position 110 is cabled via cable 1A3 to Cross Connect Field 107 for cross connection to the P lead from line circuits for which the attendant has primary answering responsibility. The pilot lamp is thus energized whenever any primary common answering lines for the particular position remain unanswered. When all calls are served from line circuits having blanking capabilities at a particular position, the position pilot lamp stops flashing and the normal lamp display is restored.

Each position is equipped with a locking turnbutton signal restore key (designated SIG RST) which in the OFF condition permits the signal blanking equipment to operate and in the ON position disables the blanking circuits to allow the lamps to operate in a normal manner. Each position is also provided with a position override lamp (designated OV) in the block diagram which when lighted indicates that one or more attendant positions have connected themselves to the particular position by means of the override facilities.

The line lamps at each Attendant Position 110 may be lighted in one of the following manners to show the status of the various line circuits. An unlighted lamp indicates that a line is not in use at any position. A steady lamp indicates that a line has been selected and is in use at another attendant position. A flashing lamp (one-half second ON, one-half second OFF) indicates an incoming call on a line circuit. A winking lamp (.97 second OFF, .03 second ON) is associated only with central office or PBX lines and indicates that the line is being held under key control. All other lines are held automatically until they are released by the attendant. A fluttering lamp (12 pulses per second, 80 percent ON) indicates to an attendant which line has been connected to his position by operation of the associated nonlocking line key. In addition, the position override lamp OV when lighted indicates that one or more attendant positions have connected themselves to the particular position by means of the override facilities. The position pilot lamp P when flashing indicates incoming calls being directed to a particular attendant position.

The signal potentials required for lighting the lamps at each Attendant Position 110 in the above-described manner and other lamps as described before are supplied by Signal Circuit 122 (FIG. 1E) which is connected via leads in cable 1S1 to the line circuits of lines 1 through 60, to Register Senders 119, to Register Connectors 117, and to Attendant Positions 110.

1.03. *Line position connector circuits*

The selective connection of any Attendant Position 110 to the various line circuits of the present invention is effected through line position connector (LPC) circuits which include a Line Connector Frame 111 (FIG. 1B) comprising a crossbar switch field, a Key Relay Circuit 112 (FIG. 1B) individually associated with each Attendant Position 110 in the system, a Gate Circuit 113 (FIG. 1B) and a Controller Circuit 114 (FIG. 1B). As shown in the block diagram, Line Connector Frame 111 is divided into two groups of crossbar switches, one designated lines switches and the other designated dial switches. The transmission and control leads TT, TR, RT, RR, A and S from each of the line circuits are terminated via conductors in cable 1C1 on individual horizontals of the line switches of Line Connector Frame 111. In addition, a horizontal of the dial switches is required for each line arranged for outdialing. This horizontal is used to connect the control and signaling leads from the position dial to Register Sender Link 120. Transmission and control Leads TA, RA, TB, RB, AV and SV for each Attendant Position 110 extend therefrom in cables 1D3 to the associated Key Relay Circuit 112 where they are connected to leads TT, TR, RT, RR, A, and S, respectively, and then via cables 1D1 are terminated on individual verticals of the crossbar switch field of Line Connector Frame 111. For purposes of intercommunication with other attendant positions, transmission and control leads TT, TR, RT, RR, and A are also cabled via cables 1D2 from each Attendant Position 110 and terminate on individual horizontals of the line switches of Line Connector Frame 111. Thus for the illustrative embodiment of the invention shown in the block diagram, which includes sixty line circuits and forty attendant positions, the crossbar switch field of Line Connector Frame 111 includes forty verticals, one for each attendant position, and one hundred horizontals on the line switches, one for each line circuit (60) and one for each attendant position (40). In addition, ten horizontals on the dial switches of Line Connector Frame 111 are also required for lines 1 through 10 which require out dialing.

Line Connector Frame 111 is associated with a Controller Circuit 114 which consists of a group of common control relays. For increased reliability the Controller Circuit 114 is divided into two sides, an A side and a B side. Either side of Controller Circuit 114 can serve all of the traffic on Line Connector Frame 111 and the two sides normally alternate in handling the traffic. However, in the case of a trouble on one side, the other side automatically takes over control of all the traffic on Line Connector Frame 111.

Associated with Controller Circuit 114 is Gate Circuit 113 which connects Controller Circuit 114 to the various Key Relay Circuits 112 on a one-at-a-time basis. The Key Relay Circuits 112 are provided on an individual basis for each Attendant Position 110. Each includes a number of common relays for controlling the operation of the crossbar switch field and an individual relay associated with each of the nonlocking keys provided at the associated Attendant Position 110. The transmission and control leads are cabled direct from each Attendant Position 110 to the associated Key Relay Circuit 112 via leads in cable 1D3. Each circuit 112 has an SM lead from each relay therein associated with a nonlocking pushbutton key in its related Attendant Position 110. These SM leads are cabled via cable 1A2 from the Key Relay Circuits 112 to Cross Connect Field 107 for cross connection to the select magnet operating leads SM from Line Connector Frame 111.

A PK lead and an SK lead from each Key Relay Circuit 112 are also cabled via cable 1A2 to Cross Connect Field 107 for cross connection to the PK leads from the terminals in the banks of Local Line Circuits 102 corresponding to the two-digit code assigned to each Attendant Position 110. These leads, in conjunction with the PCA and SCA primary and secondary common answering keys and lamps in the associated Attendant Position 110, are utilized to control the primary and secondary common answering and sequence call storage feature of the invention.

The line switches and the dial switches making up the crossbar switch field of Line Connector Frame 111 require Hold Magnet Control Circuits 115 which close through the hold magnet operating leads HM− from the respective Key Relay Circuits 112 to the associated line switch hold magnets designated LH1 through LH40 and the associated dial switch hold magnets designated DH1 through DH40 in the block diagram. The line switch hold magnets LH1 through LH40 are operated concurrently with the corresponding dial switch hold magnets DH1 through DH40 from the operating potentials applied to the corresponding hold magnet operating leads HM1 through HM40 each of which is cabled directly to its related Key Relay Circuit 112.

As further shown in the block diagram, each horizontal of the line switches in the crossbar switch field has a line select magnet. These are designated LS1 through LS100. Each horizontal of the dial switches in the crossbar switch field has a select magnet designated DS1 through DS10. It will be noted that the operating leads SM91 through SM100 for dial select magnets DS1 through DS10 are multipled with the operating leads of the line select magnets LS91 through LS100. In this manner, when a potential is applied to the select magnet operating lead SM91, for example, of the line switch, the associated select magnet DS1 in the dial switch is operated simultaneously with select magnet LS91. Thus when a particular attendant desires to be connected to a Central Office or PBX Line Circuit 101 which terminates on both the line and dial switches, both the signaling leads for transmitting signaling information and the voice transmission leads are connected through the crossbar switch field of Line Connector Frame 111. The select magnet operating leads SM1 through SM100 for controlling the operation of the select magnets of the line and dial switches on Line Connector Frame 111 are cabled via cable 1A1 to Cross Connect Field 107 to facilitate cross connections to provide the required direct and indirect access facilities between the various line and attendant positions of the system.

1.04. *Indirect access circuits*

In order to conserve space at the Attendant Positions 110, the switching system of the present invention includes indirect access circuitry which permits all attendants to reach all lines and all other attendants without having a direct access key for each line and attendant position. Each line and each Attendant Position 110 is given a preassigned two- or three-digit code which by using the indirect access facilities permits any attendant to have access to any line or other attendant. This circuitry includes a number of Indirect Access Circuits 116 (FIG. 1D) each with an associated Register Connector 117 (FIG. 1D) which, in conjunction with the indirect access key IA and pushbutton dial at an Attendant Position 110, permits the attendant to dial a two- or three-digit code to connect himself to a desired line or other attendant position. Control circuits in Indirect Access Circuits 116 control both the selection of an idle Register Connector 117 as well as its connection to the Attendant Position 110 requesting indirect access service. The pushbutton dial leads 0, 1, 2, 4, 7 and KR from each Attendant Position 110 are cabled via cables 1D4 to Indirect Access Circuits 116. These leads from a requesting Attendant Position 110 are connected through the first available Indirect Access Circuit 116 to its associated Register Connector 117. The Register Connector 117 translates the dialed code and applies a potential to the corresponding code lead C– which is cabled via cable 1A5 to Cross Connect Field 107 for cross connection to the select magnet operating lead SM– from the select magnet in Line Connector Frame 111 which is associated with the desired line or attendant position associated with the dialed code.

1.05. *Register senders and link*

A plurality of Register Senders 119 (FIG. 1A) are provided to convert the pushbutton dial codes received from the pushbutton dial in a calling Attendant Position 110 into ten-pulse-per-second dial signals when out dialing is required over a Central Office or PBX Line Circuit 101 to the terminating switching center. Register Sender Link 120 (FIG. 1A) serves as a connecting link between the Central Office or PBX Line Circuits 101, the Register Senders 119, and the Attendant Positions 110.

In the illustrative embodiment of the invention shown in the block diagram, Register Sender Link 120 comprises a crossbar switch field which comprises two groups of crossbar switches. Each Register Sender 119 is connected to a vertical in each group. The horizontals of the left-hand group are connected to the central office or PBX Line Circuits 101, and the horizontals of the right-hand group are connected to the horizontals of the dial switches in Line Connector Frame 111. The pushbutton dial leads 0, 1, 2, 4, 7 and KR from each Attendant Position 110 extend through the Indirect Access Circuits 116 and are cabled via cables 1D5 to Line Connector Frame 111 where they are connected to respective verticals of the dial switches.

As indicated hereinbefore, on calls to dial-type lines, crosspoints are closed in both the dial switches and the line switches in Line Connector Frame 111 at the same time to connect the signaling and transmission leads from a calling Attendant Position 110 to a particular Central Office or PBX Line Circuit 101. When the crosspoints of the dial switches in Line Connector Frame 111 are closed, the pushbutton dial leads are extended via conductors in cable 1C3 to the Register Sender Link 120. At that time, the control circuits therein associate an idle Register Sender 119 with the particular Central Office or PBX Line Circuit 101 that is to be used on the call. The Register Sender Link 120 completes this connection in a manner known to those skilled in the art when select magnets and hold magnets, one in each group of switches, operate to close two sets of crosspoints.

Although a crossbar switch field is utilized in Register Sender Link 120 in the illustrative embodiment of the invention shown in the block diagram, it is to be understood that other types of link circuits may be used to effect connections between the Register Senders 119, the line circuits of the invention, and the pushbutton leads from the Attendant Positions 110.

As known to those skilled in the art, Register Senders 119 advantageously include a plurality of register circuits, an in-steering circuit for steering the successive two-out-of-five code signals received over the pushbutton dial leads 0, 1, 2, 4, and 7 to successive registers, translating circuits for translating the two-out-of-five code information into a one-out-of-ten code form, a pulse generating circuit for generating pulse signals, and an out-steering circuit for successively controlling the pulse generation circuit in accordance with the digits stored in the register circuits. Register Senders 119 transmit dialing information over the T and R leads of cable 1C2 to the dial line circuit to which it is connected on each call. When the out pulsing of a number dialed by an attendant has been completed, the seized Register Sender 119 is released and is available for use on other calls.

1.06. *Methods of operation*

Connections between attendant positions and any of the various line circuits as well as between one attendant position and another are effected by the closure of crosspoints in the crossbar switch field of Line Connector Frame 111. The circuit actions which effect the closure of these crosspoints are initiated by the operation of one of the nonlocking pushbutton keys in the calling Attendant Position 110. A relay in the Key Relay Circuit 112 associated with the calling Attendant Position operates when its associated nonlocking pushbutton key is momentarily depressed. The operation of this relay initiates the required circuit actions for the Gate Circuit 113 and the Controller Circuit 114 to effect the closure of the required crosspoints. The select magnet associated with the horizontal in the crossbar switch field on which the desired called line circuit or called position is terminated is operated first. This is then followed by the operation of the hold magnet on the crossbar switch field which is associated with the calling attendant position.

The cross connections in Cross Connect Feld 107, as well as the methods of operation of the switching system will now be described for typical incoming and outgoing calls between the various line circuits and the attendant positions, as well as for override calls between the various attendant positions.

1.06–1. DIRECT ACCESS—OUTGOING CALLS

To provide a particular Attendant Position 110 direct access to a line circuit, cross connect jumpers are run from the L lead of the line circuit to the L lead of the direct access key which is to be assigned the line circuit.

Also, a jumper is run from the SM lead of this same key to the SM lead of the select magnet in Line Connector Frame 111 associated with the horizontal of the crossbar switch field on which the particular line circuit terminates. As shown in the block diagram, line 21, a Local Line Circuit 103, is provided with direct access on direct access key 1 of position 1. Jumper JP1 connects the SM lead for key 1 in position 1 to lead SM80 which is connected to line select magnet LS80 in Line Connector Frame 111. The conductor SM80 in FIG. 1E also bears the designation L21 and C21 which indicates that select magnet 80 serves line 21 which also has the indirect access code 21 as later described. Jumper JP2 is cross connected from the L lead of line 21 to the L lead of the direct access key 1 in position 1. As further shown in the block diagram, line 21 also has a direct access appearance in position 40 since the L lead of line 21 is cross connected by Jumper JP4 to the L lead of direct access key 6 in position 40 and the SM lead for key 6 in position 40 is cross connected by Jumper JP5 to select magnet operating lead SM80. Line 21 may have other direct access appearances in other Attendant Positions 110 not shown on the drawings, if desired.

To originate a call by the direct access method, the attendant depresses the direct access key serving the desired line. The associated line lamp for this key being unlighted indicates that the desired line is idle and available for seizure. After the direct access key is depressed and released, the line lamp flutters to give a continuing indication to the attendant which of his pushbutton keys has been operated and to which line he is connected. The operation of the direct access key causes a signal to be applied to its SM lead which results in the operation of the select magnet which has been cross connected thereto and which serves the desired line. Thus, when the attendant at position 1 operates direct access key 1, a signal is applied to lead SM80 to cause the operation of select magnet LS80 in Line Connector Frame 111. As a further result of the operation of direct access key 1, relays in the Key Relay Circuit 112 associated with position 1, in the Gate Circuit 113, and in the Controller Circuit 114 (FIG. 1B) operate to apply a signal to hold magnet operating lead HM1 associated with position 1 which, through Hold Magnet Control Circuit 115, causes the operation of line hold magnet LH1. Thus the crosspoints for connecting the transmission and control leads from position 1 to line 21 are closed and held operated. After closure of these crosspoints, the Gate Circuit 113 and the Controller Circuit 114 are all released and made available to serve other calls from other positions.

After the direct access key is operated, no further action by the attendant is required on outgoing calls where automatic ringing is provided. Depending upon the type of equipment at the distant end, however, further signaling by the operation of the short ring key SR or the ring and flash key R&F or the pushbutton dial in the attendant position may be required.

During the time that the connection between position 1 and line 21 is established, the line lamp associated with direct access key 1 at position 1 will flutter to indicate that the position is connected to line 21. Also, the direct access line lamps connected to the multiple appearances of line 21 at other Attendant Positions 110 will be lighted in a steady manner to indicate a busy condition of line 21.

At the end of the conversation, the attendant at position 1 may release the established connection to line 21 by operation of another line or special function key, the operation of the release key RLS, or the removal of the telephone headset or handset from the jack of his position.

1.06–2. DIRECT ACCESS—INCOMING CALLS

When an incoming call on a particular line circuit is received, the direct access lamp in each attendant position which has a direct access appearance of that line is lighted in a flashing manner. Thus, as shown in the block diagram, a call from the subscriber connected to line 21 causes the line lamp associated with the direct access key 1 in position 1 and the line lamp associated with the direct access key 6 in position 40 to be lighted in a flashing manner.

When a particular attendant position is assigned primary answering responsibility for a particular line, the P lead from the line circuit is cross connected to the P lead from the attendant position. An incoming call on this line circuit causes the pilot lamp P in the attendant position as well as his direct access lamp serving this line circuit to light in a flashing manner to indicate the presence of an incoming call for which the attendant has primary answering responsibility. Thus, as shown in the block diagram, position 1 has primary answering responsibility for calls received from the subscriber connected to line 21 since Jumper JP3 connects the P lead of line 21 to the P lead for direct access key 1 in position 1. Also, position 40 does not have such responsibility, even though it has direct access to this line, since its P lead for key 6 isn't connected to the P lead from line 21.

When the attendant at position 1 sees the flashing lamp associated with direct access key 1 and the flashing pilot lamp P at his position, he operates direct access key 1 to answer the call. The operation of key 1 causes the operation of the select and hold magnets in Line Connector Frame 111 in the manner described above to establish a communications connection between line 21 and position 1. The flashing line lamp associated with direct access key 1 at position 1 changes from a flashing lamp to a flutter to indicate to the attendant that he is connected to line 21. At the same time the flashing pilot lamp P at position 1 is extinguished. The flashing line lamps at the multiple direct access appearances of line 21 at other attendant positions are changed to steady to indicate at those positions the busy condition of line 21.

If the attendant at position 1 has his signal blanking circuit in the "on" state when the call over line 21 is received, all other direct access lamp signals at position 1 are extinguished except the flashing pilot lamp P, the flashing line lamp associated with line 21 and any other flashing direct access lamps representing calls for which position 1 has primary answering responsibility. When the call over line 21 is answered, the lamp signal display will be returned to normal and the pilot lamp P will be extinguished provided it is not energized by other calls.

The PCA- and SCA-lamps are not extinguished when a direct access call energizes the blanking circuit. Also, calls incoming over the PCA facilities are similarly effective to energize the blanking circuit and thereby extinguish all direct access lamps except those currently in a calling condition and which represent circuits for which the position has primary answering responsibility.

1.06–3. INCOMING CALLS—DIAL SELECTION OF ATTENDANT POSITIONS, CALL STORAGE AND SEQUENCE ANSWERING

As indicated hereinbefore, Local Line Circuits 102 are equipped with step-by-step switches which enable subscribers connected thereto to select any one of a maximum of ninety attendant positions by dialing two-digit codes. Each Attendant Position 110 is provided with a primary common answering key and lamp circuit which includes a set of three local line incoming signal lamps. This circuit operates in conjunction with relays in Local Line Circuits 102 as controlled by signals on the L1, L2, L3, and PK leads to permit a maximum of three calls directed to any particular position from line circuits 102 to be stored and answered in the order in which they were received.

Each Attendant Position 110 is connected to a terminal position in the banks of the step-by-step switches in Local Line Circuits 102 in accordance with the two-digit code assigned thereto. In the illustrative embodiment of the invention shown in the block diagram, the L1, L2 and L3 leads from position 1 are cross connected via Jumper JP6 to the L1, L2 and L3 leads of terminal 30 in the bank terminals of lines 11 through 20. Similarly, the PK lead from position 1 is cross connected via Jumper JP7 to the PK lead of terminal 30 in the bank terminals of lines 11 through 20. Thus the subscribers at stations connected to lines 11 through 20 may be connected to position 1 by dialing the two-digit code "30." In a similar manner the L1, L2, L3 and PK leads from position 40 are cross connected to bank terminals 21 of Local Line Circuits 102 by Jumpers JP8 and JP9. This permits the subscribers connected to lines 11 through 20 to be connected to position 40 by dialing the two-digit code "21."

The SM leads from lines 11 through 20 are cross connected to the select magnet operating leads extending to the line select magnets associated with the horizontals of the crossbar switch field in which the transmission and control leads of the respective line circuits are terminated. Thus the SM lead from line 11 is cross connected by Jumper JP10 to lead SM90 which extends to line select magnet LS90 associated with the horizontal on the line switches of Line Connector Frame 111 on which line 11 terminates. Similarly, the SM lead from line 20 is cross connected via Jumper JP11 to lead SM81 which extends to line select magnet LS81 in Line Connector Frame 111.

The first call from a subscriber connected to a Local Line Circuit 102 and directed to position 1 by dialing the code 30 causes the lighting of lamp 1 of its primary common answering lamps. The second call to position 1 received over another Local Line Circuit 102 before the first call is answered causes the lighting of lamp 2 of its primary common answering lamps. Similarly, the third call to position 1 received over still another Local Line Circuit 102 before the first and second calls are answered causes the lighting of lamp 3 of its primary common answering lamps. These lamps are lighted in a flashing manner and as long as one of these lamps is lighted the position pilot lamp P at position 1 will also flash. If the attendant at position 1 has the signal blanking circuit turned on, all direct access line lamps will be extinguished except those currently in a calling condition and for which the position has primary answering responsibility i.e., line 21 and direct access lamp 1 at position 1 if line 21 should now be calling. This is later described in detail. The lighting of the respective lamps 1, 2, and 3 of the primary common answering circuit in position 1 is effected over the L1, L2 and L3 leads which terminate in the bank terminals of Local Line Circuits 102.

To answer the first of the calls received over the Local Line Circuits 102, the attendant at position 1 operates his PCA nonlocking pushbutton key. The operation of this key causes a relay in the Key Relay Circuit 112 associated with position 1 to operate and apply a signal over the PK lead which is cross connected to the PK lead in the bank terminals of Local Line Circuits 102 as indicated above. In response to the signal on the PK lead, relays operate in the Local Line Circuit 102 from which the first call was received to cause a signal to be applied to the SM lead from this line circuit. The signal on this SM lead is, in turn, applied to the select magnet operating lead extending to Line Connector Frame 111 and causes the operation of the select magnet associated with the horizontal on which this particular Local Line Circuit 102 is terminated. Thus, for example, if the first call directed to position 1 is received over line 11, the operation of the PCA key in position 1 results in a signal being applied to the select magnet operating lead SM from line 11 which is cross connected via Jumper JP10 to the select magnet operating lead SM90 and causes the operation of select magnet LS90 in Line Connector Frame 111. As a further result of the operation of the PCA key, to answer the first call, other relays in the Key Relay Circuit 112 in the Gate Circuit 113, and the Controller Circuit 114 operate to apply a signal to the hold magnet operating lead HM1 associated with position 1 which, through Hold Magnet Control Circuit 115, causes the operation of hold magnet LH1. The operation of hold magnet LH1 and select magnet LS90 closes the crosspoints in the crossbar switch field to interconnect the transmission and control leads of position 1 and line 11.

When the PCA key at position 1 is first operated, the PCA lamp of the primary common answering lamp circuit is lighted in a fluttering manner to indicate to the attendant at position 1 that he is connected to a line circuit.

The answering of the first call directed to the attendant at position 1 from one of the line circuits 102 causes the flashing lamp signals in the primary common answering circuit to advance, that is, the calls waiting to be answered move up one position in the queue. Hence the flashing of lamp 1 of the primary common answering lamps is now controlled by the Local Line Circuit 102 over which the second call was received and the flashing of lamp 2 is now controlled by the Local Line Circuit 102 over which the third call was received. Lamp 3 is extinguished. Thus the attendant can see at a glance that he still has two PCA type calls waiting to be answered. If a subsequent call is received over another Local Line Circuit 102 and directed to the attendant at position 1, the third PCA lamp will again be lighted in a flashing manner.

When the attendant at position 1 completes the conversation on the first call and is ready to answer the second call, he reoperates his PCA key. This releases the Local Line Circuit 102 over which the first call was received and causes the operation of relays in the Local Line Circuit 102 over which the second call was received. The operation of these relays, in turn, applies a signal to the select magnet operating lead SM for operation of the line select magnet associated with the horizontal in the crossbar switch field on which the line circuit serving the second call is terminated. Thus the attendant at any Attendant Position 110 may answer all calls directed to his position from Local Line Circuits 102 by operation of a single nonlocking pushbutton PCA key and these calls will be answered in the order in which they are received. The attendant may be talking on one call and have a maximum of three calls in storage and waiting to be answered. During the time that calls are waiting to be answered, audible ringing signal is returned to the subscriber originating these calls. On any calls received when a maximum of three calls are in storage, busy tone will be returned to the calling subscriber.

To provide access for outgoing calls by way of the direct access method, direct access appearances of Local Line Circuits 102 may also be selectively provided at various Attendant Positions. These terminate on the direct access key and lamp circuits of the Attendant Positions in the manner already described hereinabove.

As shown in the block diagram, position 1 is provided a direct access appearance of line 11 on direct access key 2 therein. The L lead from line 11 is cross connected by Jumper JP12 to the L lead associated with the direct access key 2 in position 1. Similarly, the SM lead associated with direct access key 2 in position 1 is cross connected via Jumper JP13 to the select magnet operating lead SM90 which extends to the select magnet associated with the horizontal of the crossbar switch field on which line 11 terminates. In addition, the P lead from the bank terminal on position 30 of the step-by-step switch for line 11 is cross connected by Jumper JP14 to the P lead for direct access key 2 of position 1 to control the position pilot lamp and blanking circuit therein.

When a subscriber connected to a Local Line Circuit 102 lifts his handset to initiate a call to one of the Attendant Positions 110, a signal is applied over the L lead of the line circuit 102 to all Attendant Positions having a direct access appearance of that line. This causes the line lamp in the direct access key and lamp circuit thereat to light in a steady fashion to indicate that the line is busy. Thus when a subscriber connected to line 11 lifts his handset to initiate a call, the line lamp associated with direct access key 2 in position 1 lights in a steady manner.

Assume, now, that the subscriber connected to line 11 dials the two-digit code "30" to reach the attendant at position 1. At the completion of the dialing of this code, the line lamp associated with the direct access key 2 at position 1 changes from a steady to a flashing lamp to indicate that a call for the attendant at position 1 is being received over line 11. At the same time one of the three line lamps 1, 2 or 3 in the common answering key and lamp circuit at position 1 will flash to indicate that a call is being received over the PCA facilities. If there are no other calls waiting, PCA lamp 1 will flash as described above. By cross connecting the P lead from line 11 to the P lead for direct access key 2 in position 1, the flashing lamp associated with the direct access appearance of line 11 in position 1 will not be extinguished if the attendant at position 1 has the signal blanking circuit turned on.

The attendant at position 1 now has two alternatives for answering the call. He may operate his direct access key 2 which effects the establishment of a connection between position 1 and line 11 through Line Connector Frame 111 in a manner similar to the establishment of such connections for the direct access calls already described. Alternatively, the attendant may answer the call by operating the primary common answering key PCA as described. If the direct access method of answering the call is utilized, the call received over line 11 will be answered without having to wait its turn in the call storage queue of the common answering circuit.

1.06–4. INCOMING CALLS—PRIMARY AND SECONDARY COMMON ANSWERING

As indicated hereinbefore, Attendant Positions 110 may be paired for primary and secondary common answering responsibility, that is, calls directed to position 1 for example may be transferred to another position for secondary answering responsibilty, and vice versa. To associate two Attendant Positions 110 as reciprocal primary and secondary common answering positions, the SK lead from the secondary common answering position is cross connected to the same bank terminals of the step-by-step switches in Local Line Circuits 102 to which the PK lead of the primary common answering position is cross connected. Thus, as shown in the block diagram, the PK lead from a terminal in bank position 30 of Local Line Circuits 102 is cross connected by a Jumper JP7 to the PK lead of position 1, and the SK lead from position 40 is cross connected via Jumper JP15 to the PK lead of position 1. Position 40 is thus the secondary common answering position for PCA calls directed to position 1. Similarly, the PK lead at position 40 is cross connected via Jumper JP9 to the PK lead of a terminal in bank position 21 of Local Line Circuits 102 and is also cross connected via Jumper JP16 to the SK lead at position 1. Thus the position 1 is the secondary common answering position for PCA calls directed to position 40 from line circuits 102.

The attendant at a primary common answering position may transfer incoming calls from Local Line Circuits 102 directed specifically to his position to the associated secondary common answering position by the operation of the secondary lamp transfer key SEC LPS. This causes the lighting of the secondary common answering lamps 1, 2, and 3 in the secondary position in multiple with the primary common answering lamps in the primary position via conductors in cable 1D6. The attendant at the secondary answering postion may then answer the calls directed to the primary position by the operation of the secondary common answering key SCA which causes a signal to be applied to the PK lead in the calling local line circuits 102 which results in the operation of the line and select magnets in Line Connector Frame 111 in the same manner as that described above. The secondary common answering lamps are successively lighted in the same manner as the primary common answering lamps as subsequent calls for the primary position are received and they successively advance as the calls are answered either at the primary answering position or the secondary common answering position.

1.06–5. INDIRECT ACCESS TO LINE CIRCUITS

In accordance with an aspect of the present invention, an Attendant Position 110 may gain access to any line circuit in the system of the present invention even though that position does not have a direct access appearance of each line circuit. This is accomplished through the Indirect Access Circuits 116 (FIG. 1D) and the associated Register Connectors 117 (FIG. 1D). Each line circuit is assigned a predetermined two-or-three-digit indirect access code which enables an Attendant Position 110 to connect to any line circuit by dialing its assigned code on his pushbutton dial.

As shown in the block diagram, line 41 terminates on the horizontal in the crossbar switch field controlled by line select magnet LS60. The select magnet operating lead, SM60, connected thereto is cross connected via Jumper JP17 to the code lead C100 from Register Connectors 117. Thus when the three-digit code "100" is dialed by an attendant, a signal is applied over the C100 code lead to the lead SM60 to operate select magnet LS60. Similarly, select magnet operating lead SM41 connected to line select magnet LS41, which is associated with the horizontal on which line 60 terminates, is cross connected via Jumper JP18 to code lead C52 from Register Connectors 117. Accordingly, when the two-digit code "52" is dialed by an Attendant, select magnet LS41 associated with the termination of line 60 is operated. Select magnet operating lead SM90, which controls the operation of line select magnet LS90 associated with the termination of line 11, is cross connected via Jumper JP27 to code lead C24 and permits an Attendant Position 110 to gain access to line 11 by dialing the indirect access code "24".

In a similar manner, select magnet operating lead SM80, which controls the operation of line select magnet LS80 associated with the termination of line 21 on Line Connector Frame 111, is cross connected via Jumper JP19 to code lead C21 and permits an attendant to gain access to line 21 by dialing the two-digit code "21." Although only a few cross connect jumpers between code leads C– and select magnet operating leads SM– are shown on Cross Connect Field 107, it is to be understood that each of lines 1 through 60 will be assigned a distinctive two- or three-digit code and cross connect jumpers will be run from the respective C– code leads to the select magnet operating leads SM– connected to the select magnets controlling the respective horizontals of the crossbar switch field on which the respective lines terminate.

To gain access to any line circuit of the present invention by way of the indirect access method, the attendant depresses the indirect access key IA to start the circuit action. A relay in the Key Relay Circuit 112 associated with the Position operates and causes the first available Indirect Access Circuit 116 to be seized. The seizure of the first available Indirect Access Circuit 116 connects the first idle Register Connector 117 associated therewith to the pushbutton dial leads 0, 1, 2, 4, and 7 from the pushbutton dial of the calling position. When this connection has been completed, a signal is transmitted to the attendant position over the KR lead to light the ready lamp RL in the pushbutton dial circuit. The lighting of the RL lamp indicates that a register connector has been seized and is ready to receive the indirect access code.

The attendant may then proceed to dial the two- or three-digit code for the desired line. This code is transmitted on a two-out-of-five basis on leads 0, 1, 2, 4, and 7 to the seized Register Connector 117. The Register Connector 117 translates the dialed code and applies a signal to the particular code lead C– represented by the two- or three-digit code dialed by the attendant. Thus, for example, if the attendant at position 1 dials the two-digit code "52" to gain indirect access to line 60, the seized Register Connector 117 causes a signal to be applied to code lead C52. This signal causes the operation of line select magnet LS41 in Line Connector Frame 111 in the same manner as that already described.

As a further result of the operation of the indirect access key IA in an Attendant Position 110, relays in the Key Relay Circuit 112 associated with that Position in the Gate Circuit 113, and in the Controller Circuit 114 operate to apply a signal to the hold magnet operating lead HM– associated with the position requesting indirect access service which, through Hold Magnet Control Circuit 115, causes the operation of the hold magnet associated with the position. The operation of the required select and hold magnets in Line Connector Frame 111 closes the crosspoints in the crossbar switch field for connecting the transmission and control leads from the calling attendant position to the particular line having the preassigned two- or three-digit code which the attendant dialed. After the desired indirect access connection is established, the Indirect Access Circuit 116 and the Register Connector 117 are released and are available for use on other indirect access calls.

The operation of the line lamps in the other Attendant Positions 110 which have direct access appearances of the line just selected by another attendant with his indirect access facilities is identical to that described. As soon as the line is seized by indirect access, the line lamps at all direct access appearances of that line are lighted in a steady manner to indicate that the line is busy. The busy lamp IA associated with the indirect access circuit in the Attendant Position 110 which originated the indirect access call is lighted in a fluttering manner to indicate to the attendant which key has been operated.

After completion of the conversation, the connection established by the indirect access method is released in the same manner as that of a direct access call, i.e., by the operation of a release key or the operation of another line or special function key at the Attendant Position 110.

1.06–6. OVERRIDE (INTERCOMMUNICATION)—DIRECT ACCESS METHOD

As indicated hereinbefore, an Attendant Position 110 may be connected to another Attendant Position 110 for intercommunication purposes via the direct access method, that is, any attendant position may be cross connected to other attendant positions and a transmission connection therebetween established by means of the operation of the nonlocking pushbutton direct access key assigned thereto. For purposes of intercommunication, conductors of each attendant position also terminate on a horizontal in the crossbar switch field of Line Connector Frame 111. Thus, as shown in the block diagram, position 1 terminates on horizontal 1 which is controlled by line select magnet LS1. Similarly, position 40 terminates on horizontal 40 and is controlled by a line select magnet LS40 in the crossbar switch field. To provide an override channel (intercommunication) between two Attendant Positions 110, the select magnet associated with one position is operated and is followed by the operation of the line hold magnet associated with the position requesting the connection. This closes crosspoints in the crossbar switch field to close the desired override communications channel.

As shown in the block diagram, position 1 is provided direct access to position 40 on direct access key 3 at position 1. The SM lead associated with the direct access key 3 in position 1 is cross connected via Jumper JP20 to the select magnet operating lead SM40 which extends to the line select magnet LS40 controlling the crossbar switch horizontal on which position 40 terminates. The L lead associated with the direct access key and lamp circuit 3 in position 1 is cross connected via Jumper JP21 to the L lead of position 40. This L lead from position 40 is utilized to control the lighting of the line lamps in all other Attendant Positions 110 which have a direct access appearance of position 40. When the attendant at position 1 operates his direct access key 3 to establish a communication path to position 40 over an override channel, the operation of a relay in the Key Relay Circuit 112 associated with position 1 causes a signal to be applied to the SM lead for key 3. This signal is applied over Jumper JP20 to the conductor SM40 extending to line select magnet LS40 in Line Connector Frame 111. As a further result of the operation of direct access key 3, relays in the Key Relay Circuit 112 associated with position 1, in the Gate Circuit 113, and in the Controller Circuit 114 operate to apply a signal to the hold magnet operating lead HM1 associated with position 1. This, in the manner described hereinbefore, causes the operation of the hold magnet associated with position 1 after the operation of the select magnet for position 40 to close the crosspoints in the crossbar switch field and thereby establish the desired communications path between positions 1 and 40.

When this communications path is effected in the manner described above, the override lamp OV at position 40 is lighted in a steady manner to indicate to the attendant at position 40 that one or more other attendant positions have seized his position on an override channel. The attendant at position 40 receives the incoming speech from the attendant at position 1 on his headset or, in the event that the attendant at position 40 has his headset loudspeaker transfer switch operated to the loudspeaker position, the override speech from position 1 is transferred to a loudspeaker on position 40. If position 40 has a call in progress when position 1 is connected thereto via the override channel, the attendant at position 1 will hear the conversation. With the headset loudspeaker switch thrown to the loudspeaker position, the subscriber to whom the attendant at position 40 is talking will not hear the override speech from position 1.

1.06–7. OVERRIDE (INTERCOMMUNICATION)—INDIRECT ACCESS METHOD

Connections may be established between attendant positions by utilizing the indirect access method in a manner similar to that described hereinbefore for indirect access calls to various line circuits. Each attendant position is assigned a two- or three-digit indirect access code. For example, as shown in the block diagram, position 1 is assigned the indirect access code "20" and a Jumper JP 22 is cross connected between code lead C20, from Register Connectors 117, and the select magnet operating lead SM1 extending to line select magnet LS1 which controls the crossbar switch horizontal on which position 1 is terminated. Similarly, position 40 is assigned a three-digit indirect access code "110" and a Jumper JP23 is cross connected between the code lead C110, from Register Connectors 117, and the select magnet operating lead SM40 extending to line select magnet LS40 which controls the crossbar switch horizontal on which position 40 is terminated.

To establish intercommunications from one position to another via the indirect access method, the attendant desiring the connection (the overrider) operates the indirect access key IA at his position and then, with his pushbutton dial, dials the indirect access code of the desired position. In the manner described hereinbefore, this causes a signal to be applied to the select magnet operating lead of the select magnet which controls the crossbar switch horizontal on which the desired attendant position terminates. The operation of the circuits from this point on is similar to that already described in the closing of the required crosspoints in Line Connector Frame 111 to establish direct access override calls.

Because there is no direct access lamp appearance for this channel, the only indication that the overrider attendant receives is a fluttering lamp associated with the indirect access key IA at his position. The position to which the connection is established (the overridden position) responds in the same manner as described for the direct access method, and the override lamp OV thereat is lighted in a steady fashion to indicate to the attendant that one or more other attendant positions have seized his position on the override channel. The speech from the calling attendant position is received at the called attendant position headset or loudspeaker depending on the condition of the loudspeaker transfer circuits.

1.06-8. DIAL SELECTION OF CENTRAL OFFICE OR PBX STATIONS

As indicated hereinbefore, dial lines of which Central Office or PBX Line Circuits 101 are an example, are provided in the system of the present invention to give the attendants the ability to select one of a multiplicity of distant stations. In the event that the line circuits are connected to dial central offices or dial PBX's, Line Circuits 101 enable the attendants to dial desired stations within the central office or PBX.

The Central Office or PBX Line Circuit 101 provided as line 1 in the system of the present invention is shown in the block diagram in more detail to permit an understanding of the aspect of the invention whereby a guard tone is applied to the receive pair of the four-wire transmission path to alert other attendant positions who might intrude on the busy line circuits while outpulsing to dial central offices or PBX's is in progress. The manner in which this is accomplished is described hereinafter in connection with the simplified showing of the circuit elements in line 1.

Central Office or PBX Line Circuits 101 are seized by attendants at Attendant Positions 110 by the direct or indirect access methods described hereinbefore. Thus these line circuits may have a direct access appearance at some attendant positions, and those positions which do not have direct access appearance of these lines may gain access thereto by the use of the pushbutton dial, the Indirect Access Circuits 116, and the Register Connectors 117. For example, line 1 is given a direct access appearance in position 1 on direct access key 4 by cross connect Jumpers JP24 and JP25. Jumper JP24 cross connects the L lead of line 1 to the L lead associated with direct access key 4 in position 1, and Jumper JP25 cross connects the SM lead associated with key 4 to the select magnet operating lead SM100 which extends to the select magnets of the crossbar switch field in Line Connector Frame 111 associated with the horizontals on which line 1 terminates. Line 1, for illustrative purposes, is also assigned the indirect access code "119," and a Jumper JP26 cross connects code lead C119 from Register Connectors 117 to the select magnet operating lead SM100. Accordingly, any Attendant position 110 may seize line 1 by dialing the indirect access code "119" or, as in the case of position 1, by the operation of the direct access key 4 in the manner described hereinbefore.

When seizure of line 1, for example, is initiated by the direct or indirect access method, a signal is applied to the select magnet operating lead SM100 in the manner described hereinbefore. This signal causes the operation of line select magnet LS100 and dial select magnet DS10 in Line Connector Frame 111. As a further result of the operation of the direct access key or indirect access key to effect seizure of line 1, in position 1 for example, circuits in the Key Relay Circuit 112 associated with position 1, in the Gate Circuit 113, as well as in the Controller Circuit 114 operate to control the operation of the line hold magnet LH1 and dial hold magnet DH1 under control of the Hold Magnet Control Circuits 115 in Line Connector Frame 111. The operation of these hold magnets closes crosspoints in the line switches and the dial switches of the crossbar switch field to close through the communications path from position 1 to line 1 and to close through the signaling leads from the pushbutton dial at position 1 via normal contacts in the Indirect Access Circuits 116 to Register Sender Link 120.

In response to the closure of the crosspoints in Line Connector Frame 111, a ground is applied to lead A in cable 1C1 which is one of the control leads extending from position 1 through Line Connector Frame 111 to line 1. This ground causes the operation of relay A shown in simplified form in line 1. The operation of relay A closes the T and R conductors from the central office or PBX through the Recorder Connector and through to the L repeating coil in line 1 which provides a bridge for operating the central office or PBX line equipment. Dial tone from the central office or PBX is applied through the hybrid coil in line 1 to the RT and RR receive conductors of the four-wire transmission path to the attendant at position 1 when the equipment at the distant end is ready to receive dial pulses.

The closure of the crosspoints in the dial switches in the crossbar switch field of Line Connector Frame 111 closes through the 0, 1, 2, 4, 7, and KR leads from the pushbutton dial of position 1 to Register Sender Link 120. Register Sender Link 120 completes a connection between an idle Register Sender 119 serving line 1 and pushbutton dial leads from position 1 in the manner indicated hereinbefore. When an idle Register Sender 119 has been seized and is ready to receive the coded signals from the pushbutton dial at position 1, a signal is transmitted over the KR lead to position 1 to light the ready lamp RL to indicate to the attendant at position 1 that the dialing of the desired central office or PBX station may be commenced.

The attendant at position 1, after hearing dial tone and observing that the ready lamp RL on the pushbutton dial is lighted, operates the pushbutton dial to transmit the digits of the directory number of the desired station in the central office or PBX. These digits are transmitted in two-out-of-five code form over the pushbutton dial leads to the seized Register Sender 119. When the two-out-of-five code for the first digit is received at the Register Sender 119, circuits therein operate in a manner known in the art to apply a signal to the LS lead which extends through the crosspoints of the left-hand group of crossbar switches in Register Sender Link 120 via cable 1C2 to line 1. The signal on the LS lead causes the operation of the LS relay in line 1. The LS relay in operating connects the T and R conductors extending to the central office or PBX to the T and R conductors in cable 1C2 extending to the Register Sender Link 120. In this manner the T and R conductors which extend to the central office or PBX are connected to the seized Register Sender 119 and are ready to receive the dial pulse digits generated in the Register Sender 119.

The LS relay in line 1 in operating also connects the TA and the TB leads from High Tone Generator 105 to the receive pair RT and RR of the four-wire transmission path extending to the attendant positions. The high tone from High Tone Generator 105 serves as a guard tone to warn any attendant who may connect to line 1 that outpulsing is in progress on line 1.

The successive digits transmitted from the pushbutton dial of the calling attendant at position 1 are received by the seized Register Sender 119, are translated from a two-out-of-five code to a one-out-of-ten code, and are outpulsed over the T and R conductors to the central office or PBX as dial pulses. When outpulsing of the station directory number is completed, the seized Register Sender 119 is released and is made available for use on other calls. The operating ground is removed from the LS lead which permits the LS relay in line 1 to release. This transfers the T and R conductors of the central office or PBX line to the T and R conductors connected to the recorder connector of line 1 and permits the calling attendant at position 1 to communicate with the station at the central office or PBX. The release of the LS relay in line 1 also removes the guard tone from High Tone Generator 105 from the receive pair of the four-wire transmission path.

The line circuit for line 1 also contains a transformer P and a recorder connector which, together with the other equipment shown in the line circuit, provide a means whereby a mechanical recorder attendant position to which the line circuit 101 is connected records the conversation on line 1 as long as the Beep Tone Generator in the recorder connector is operative to impress the required Beep Tone on the line every 15 seconds. In the event the Beep Tone Generator should become inoperative, the recorder no longer records the conversation, but yet, the attendant and the party connected to line 1 may continue their conversation. The circuit details of this feature are described later.

2.00. DETAILED DESCRIPTION

2.01. *Relay designations*

Each relay is given a designation comprising one or more letters and in some cases a combination of letters and numbers. In some instances, these designations are purely arbitrary while in others they are related to the circuit function of the relay.

Since the detailed circuit of the present invention is shown on some 27 sheets of drawings, the location of each relay is facilitated in the following description by preceding its normal designation, as shown on the drawings, with the figure number of the drawings on which the relay appears. Thus, for example, relay KA on FIG. 9 may be referred to as 9–KA. Similarly, relay C on FIG. 13 may be referred to as relay 13–C. However, in order to avoid repetition, this identification scheme is used selectively and thus if, during the course of a discussion, repeated reference is made to a particular relay or a particular group of relays, the figure identifying prefix precedes the normal designation of the relay or relays being discussed only once or twice at the beginning of the discussion and is not repeated each and every time the relay is again mentioned. In other words, this identification scheme is used both selectively and judiciously in such a manner so as to facilitate the identification of each relay's drawing location and, at the same time, to avoid undue and monotonous repetition by preceding each and every mentioning of a relay with such a designation.

This method of designating relay figure number locations is advantageous since it avoids the repetitious use of the term "on FIG. . . . " as would be necessary in the event that no such figure-designating prefix were used and, at the same time, simplifies the drawings to the extent that the prefix need not to be used on the drawings as part of the official designation of each relay.

There are a number of instances on the present drawings where groups of relays are disclosed in which each relay in the group has a designation which differs from that of other relays in the group only by a final digit or digits. For example, on FIG. 4 there are two groups of relays, one of which comprises the 40 relays designated PA1–PA40 and the other of which comprises the 40 relays designated PB1–PB40. In the following description groups of relays such as these are often discussed by merely identifying the entire group as the PA-relays for relays PA1–PA40 and the PB-relays for relays PB1–PB40. This abbreviated designation permits the circuit function of the group to be discussed without the necessity of enumerating each and every relay therein during the course of the discussion.

2.02. *General discussion of the disclosed detailed embodiment*

The circuit details of an exemplary embodiment of the present invention are shown on FIGS. 2–29 of the drawings. The embodiment shown on these figures corresponds, with but a few exceptions, to that shown in diagrammatic form on FIGS. 1A through 1E. Thus, the detailed embodiment has 40 attendant positions with position 1 being shown in detail on FIGS. 10–13 and 16 of the drawings while position 40 is shown for the most part in diagrammatic form on FIG. 15. Accordingly, there are 40 key relay circuits with the key relay circuit for position 1 being shown in FIGS. 8 and 9 in detail and with that for position 40 being shown for the most part in diagrammatic form on FIG. 14.

Figure 3:
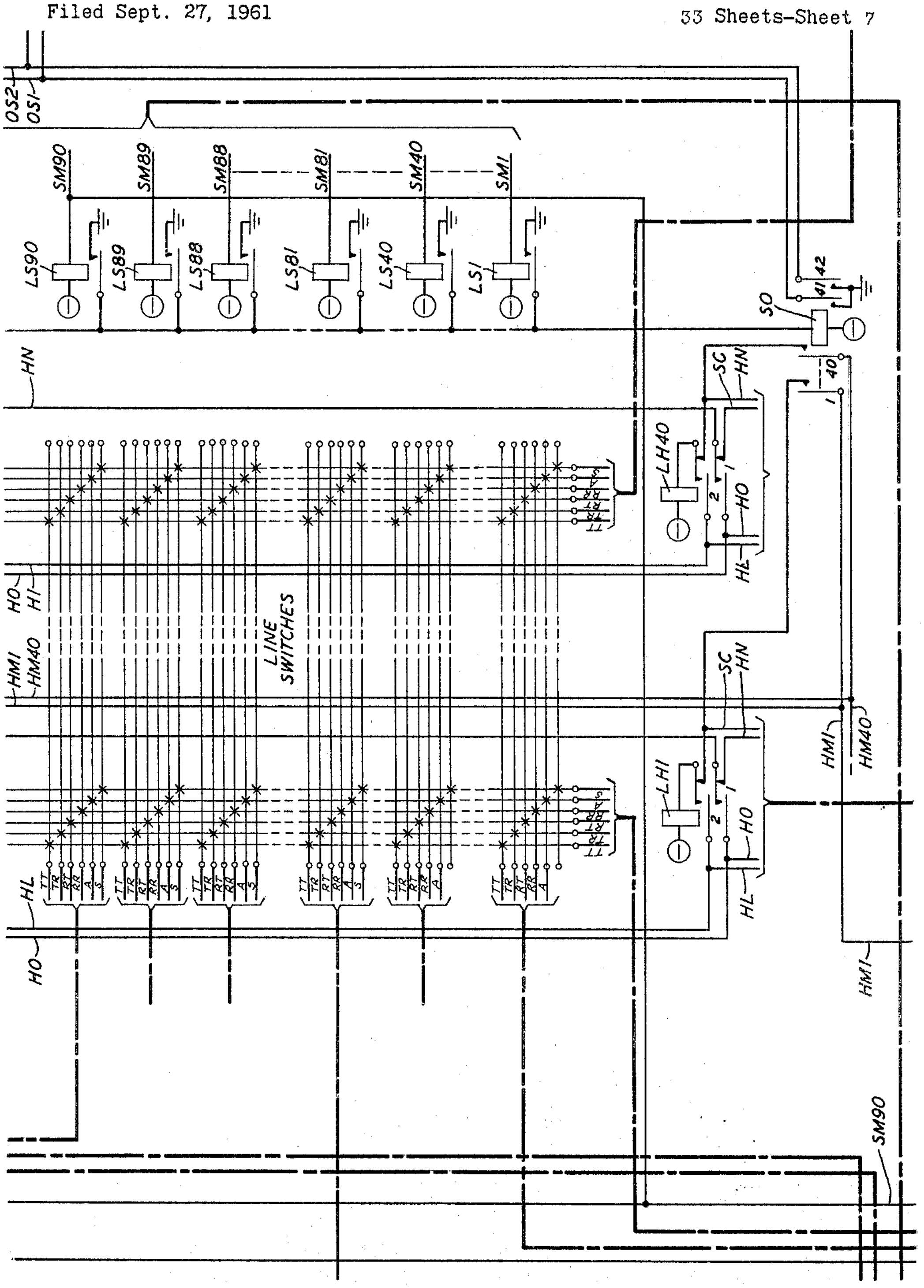
Figure 4:
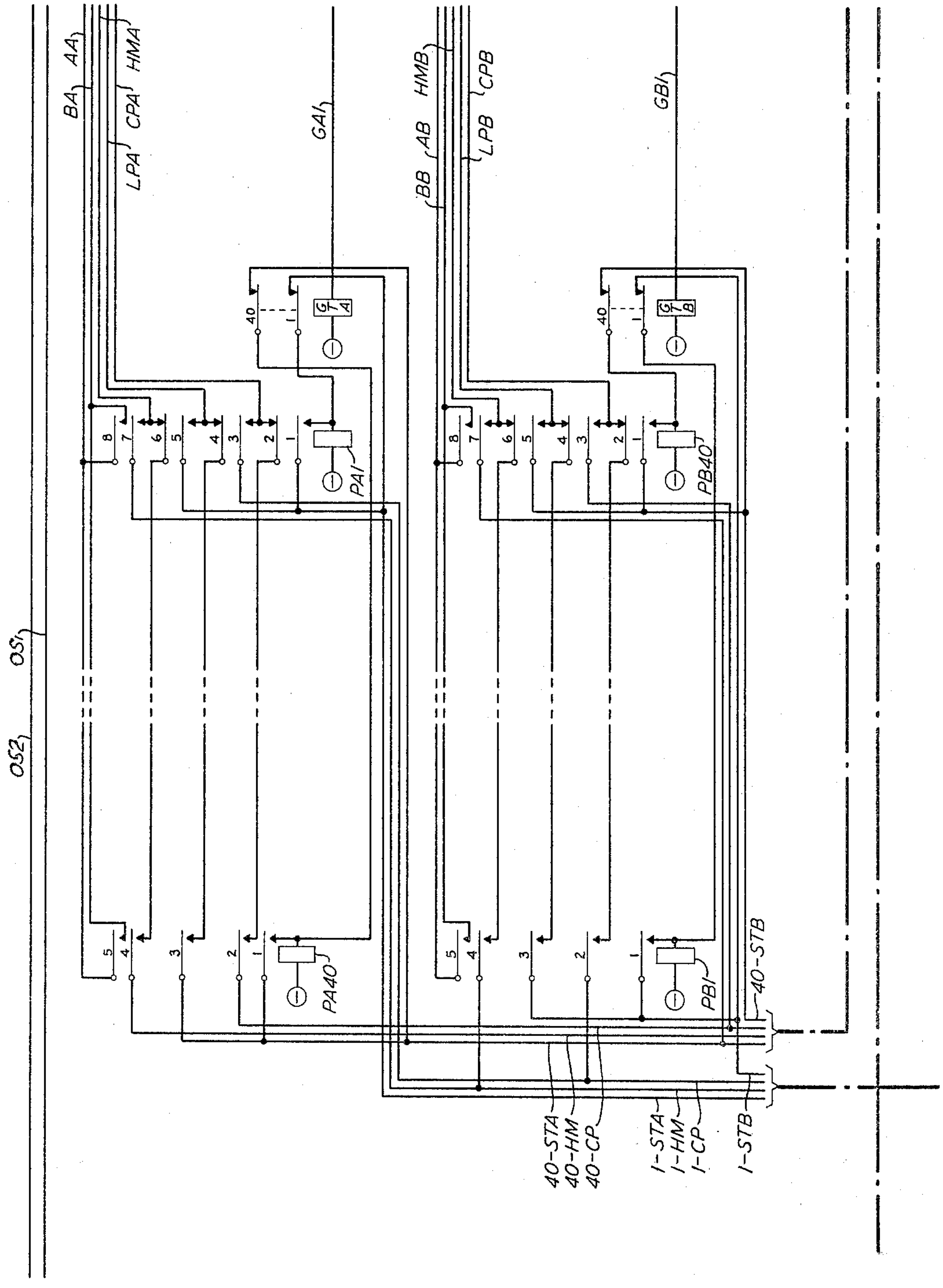
Figure 5:
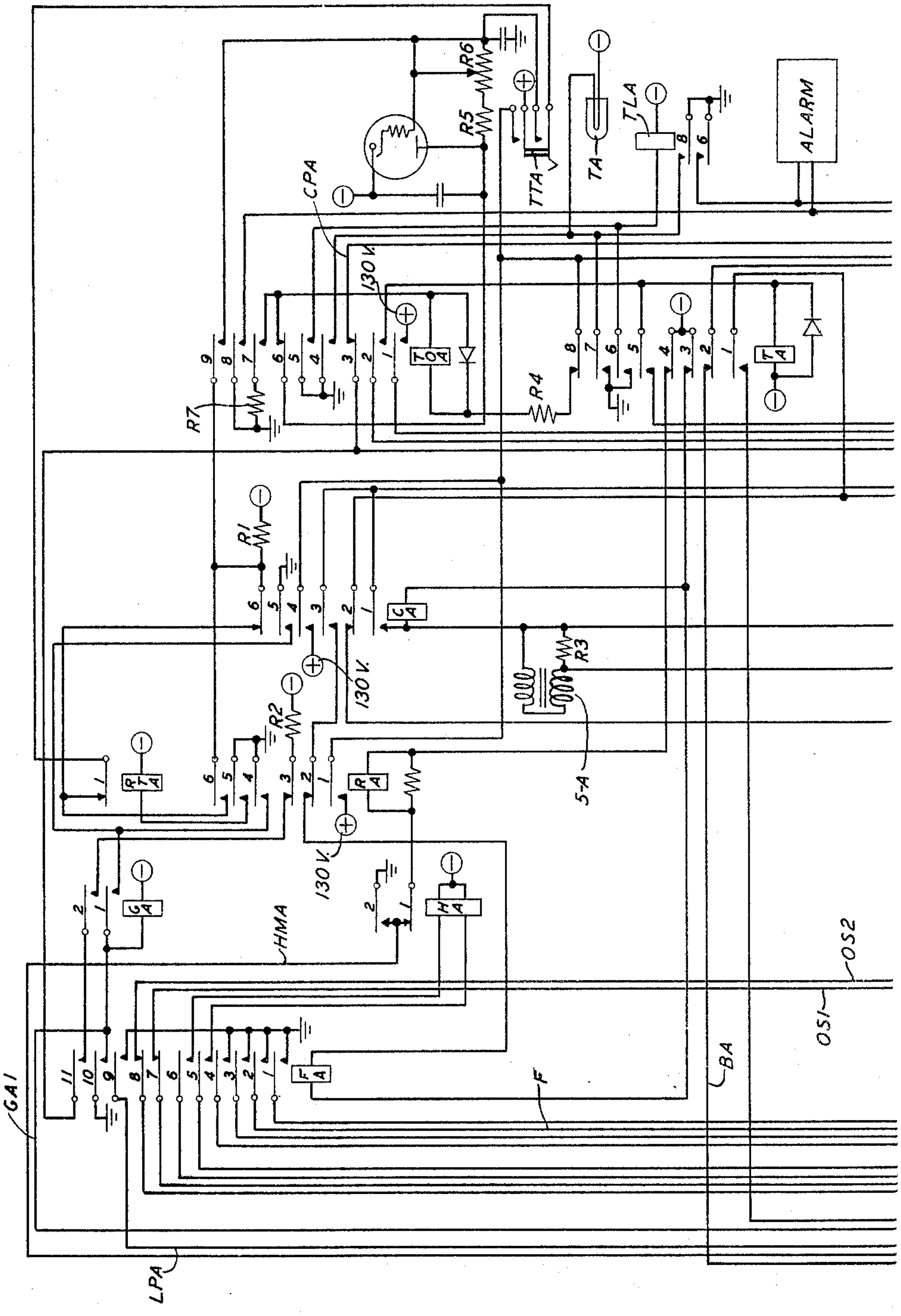
Figure 6:
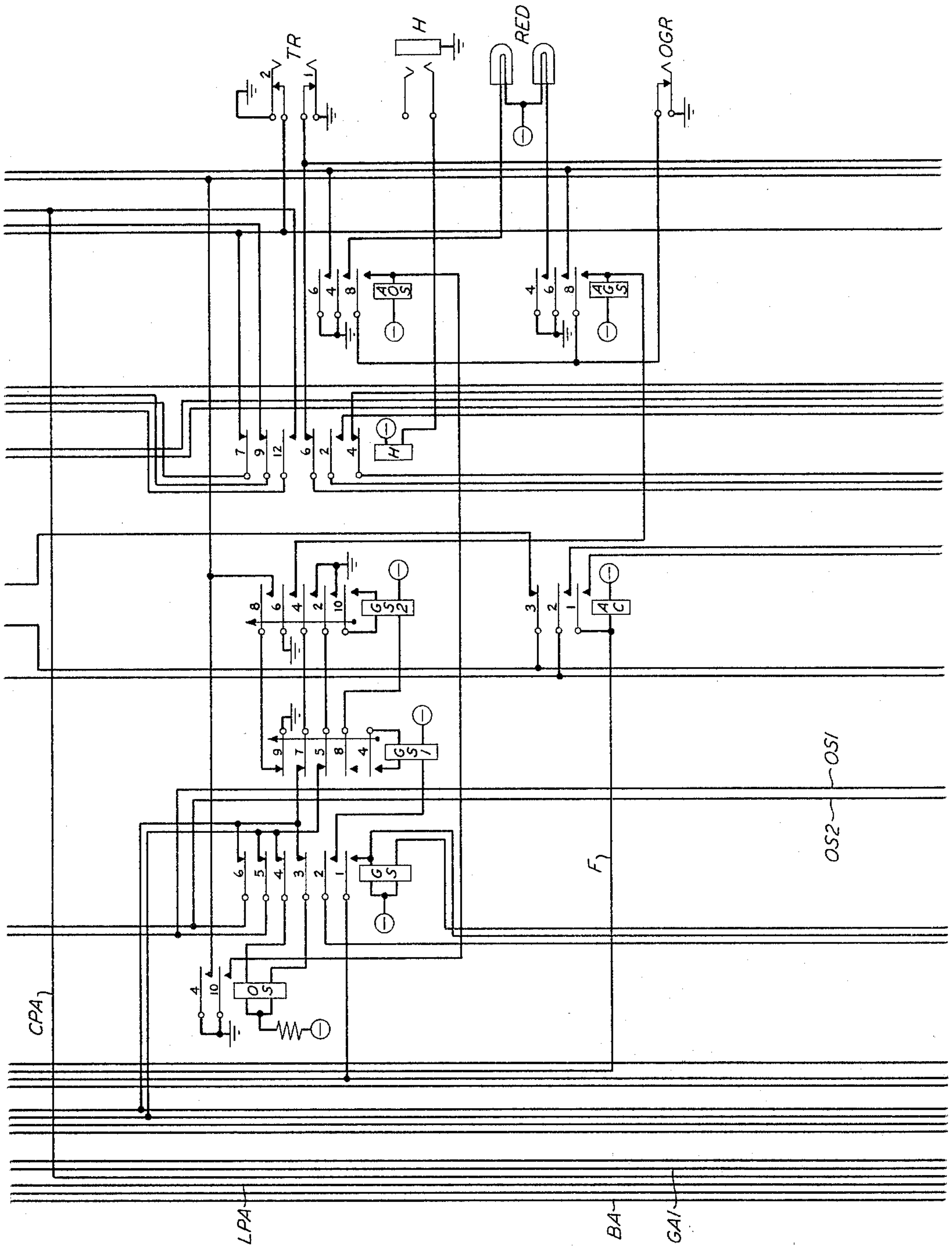
Figure 7:
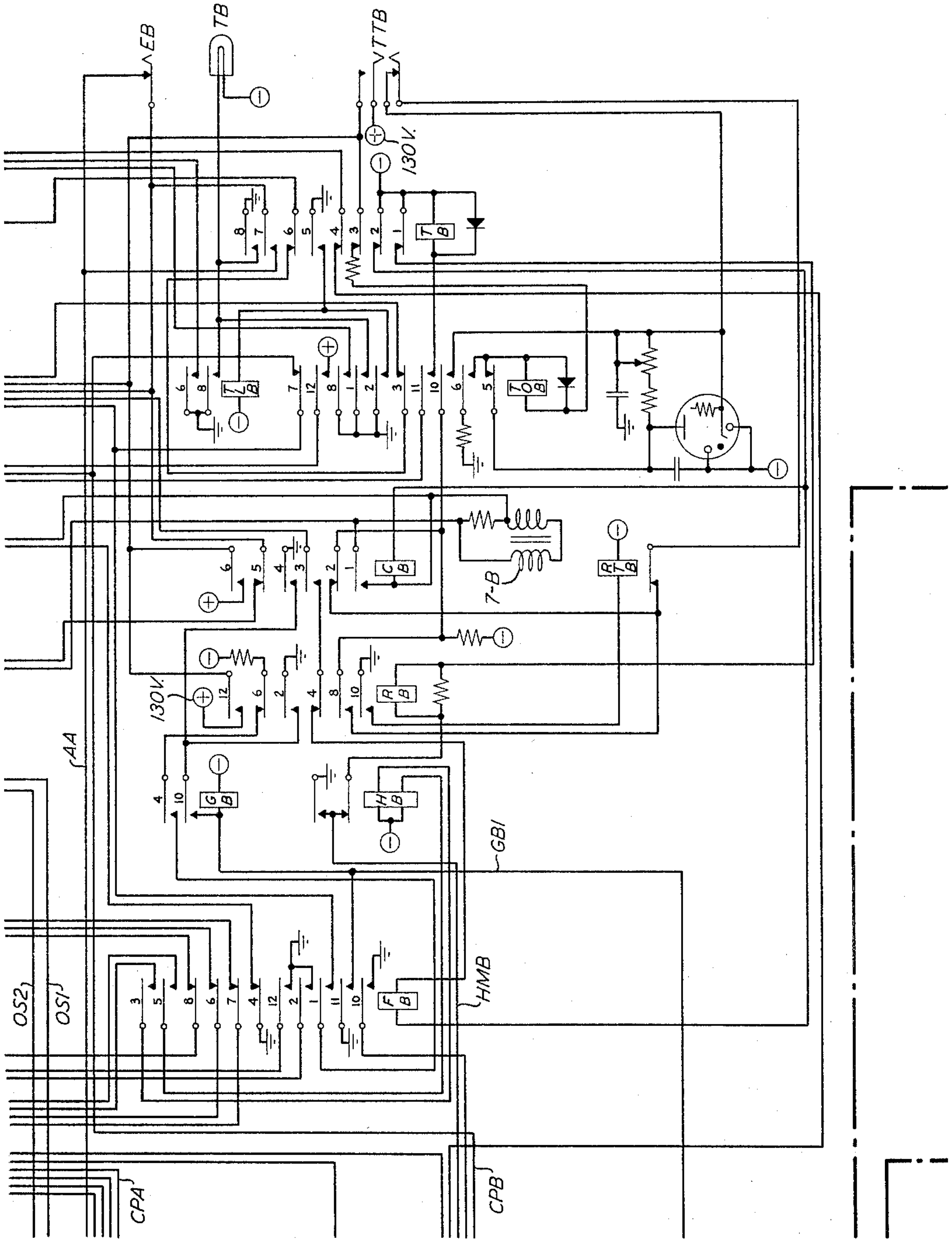

The gate circuit is shown on FIG. 4 while the controller circuit is shown on FIGS. 5–7. The two crossbar switches together with their select and hold magnets, and the control circuits for the hold magnets are shown on FIGS. 2 and 3. Two indirect access circuits (a first and a last) are shown on FIGS. 19–21 with the control circuit of the first indirect access circuit being shown in detail and with the control circuit of the last indirect access circuit being shown in diagrammatic form only on the bottom of FIG. 21. Two register-connectors (a first and a last) are shown with the circuit of the first register-connector being disclosed on FIGS. 22–26 while the last register-connector is shown for the most part in diagrammatic form only on FIG. 27.

Figure 1C:
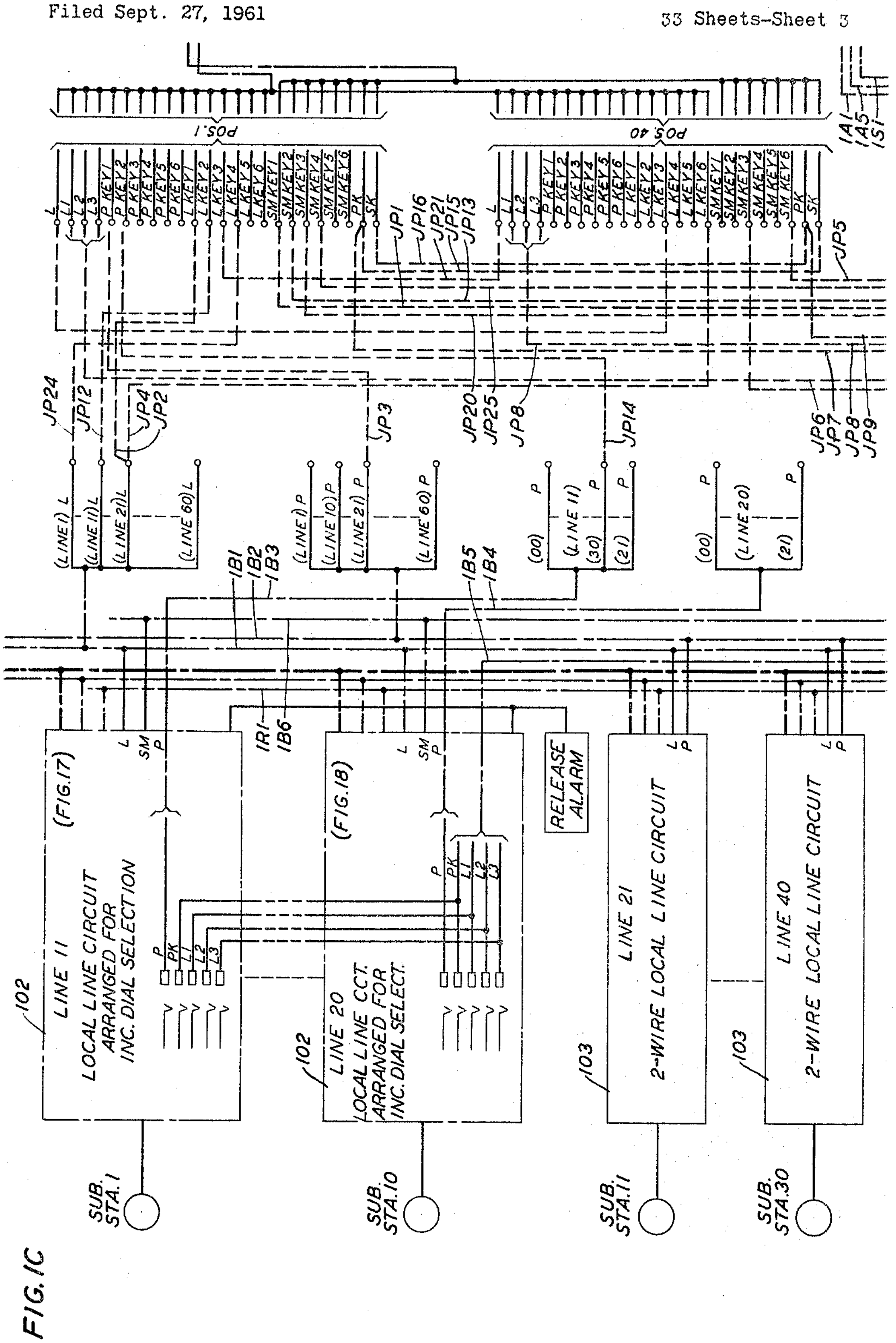
Figure 1D:
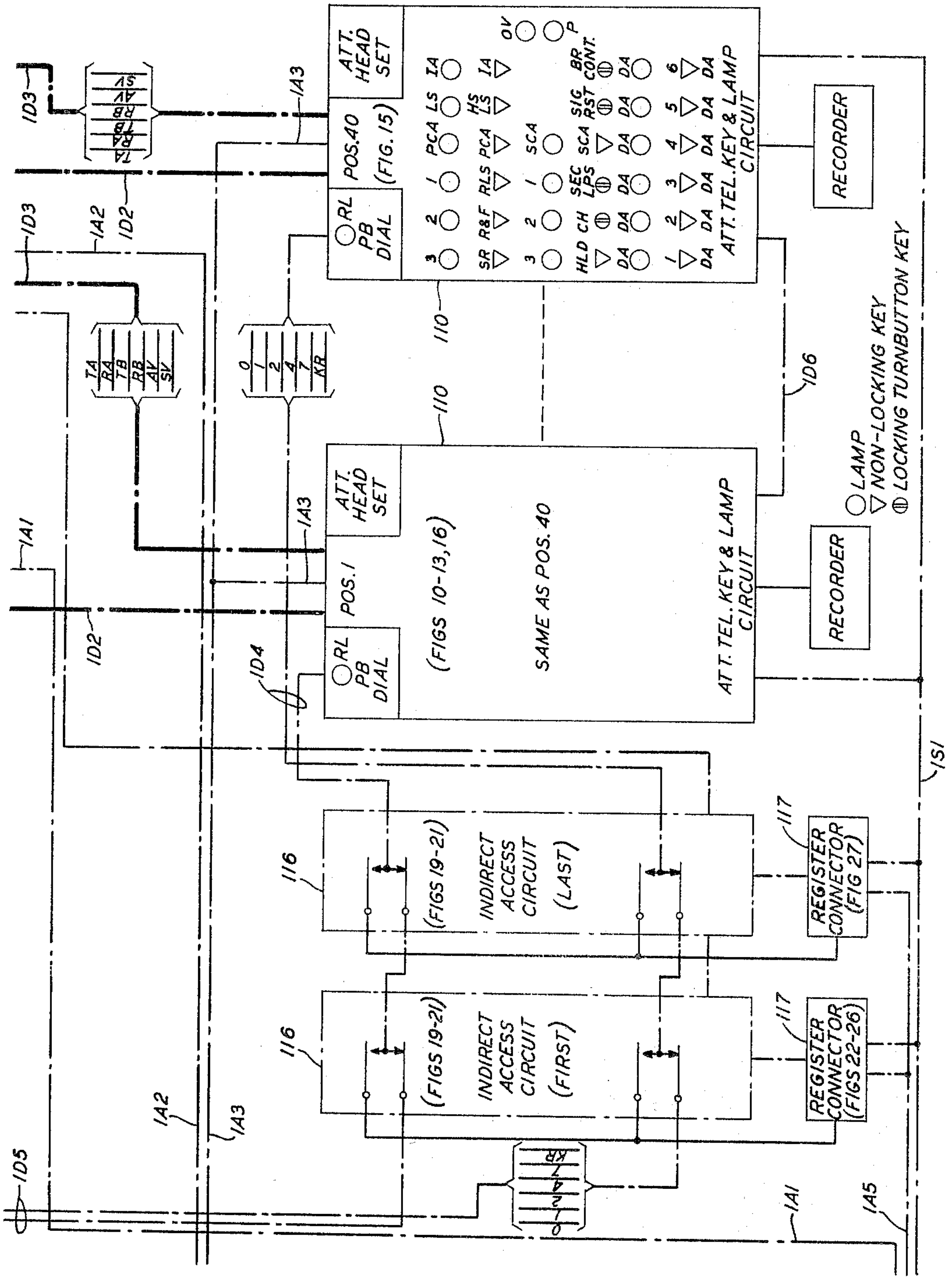
Figure 1E:
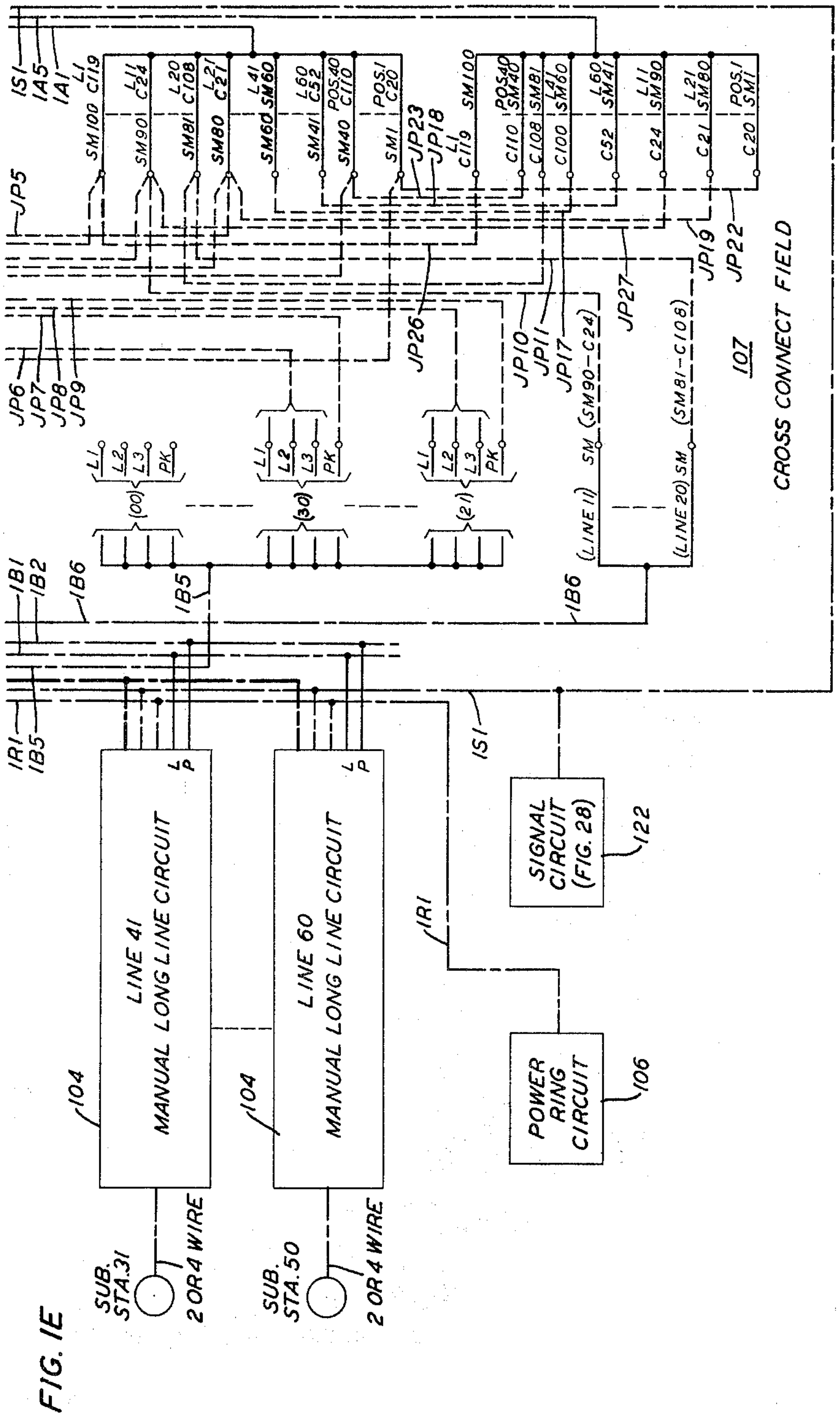

The general description of FIGS. 1A, 1C and 1E discloses four different types of line circuits which might be utilized with the present invention; namely: the central office or PBX line circuits 101, the local line circuits 102 arranged for incoming dial selection, the two-wire local line circuits 103 and the manual long line circuits 104.

Only line circuits 102, together with their circuit details, are shown on the detailed embodiment of FIGS. 2–29. The detailed disclosure was arranged in this manner both in order to minimize its complexity as much as possible and because the other line circuits comprise circuits which for the most part are well known, by now, in the telephony art. Thus, the two-wire local line circuits 103 and the manual long line circuits 104 both may be of the conventional type.

Most of the details of the central office and PBX line circuits 101 are also well known. The only exception to this statement insofar as these line circuits 101 are concerned is the portion of the circuit associated with the recorder-connector feature of the present invention whereby conversations over these line circuits are recorded at the attendant positions only in the event that a beep tone generator in each such line circuit is operative to superimpose the required warning tone on the conductors carrying the speech currents. The details associated with this feature, which distinguish line circuits 101 from conventional central offce and PBX line circuits, are shown on FIG. 1A. This precludes the necessity of disclosing the entire circuit of line circuits 101 on FIGS. 2–29.

Also, the elimination of line circuits 101 from the detailed embodiment enables the register sender 119 and the register sender link 120 to be similarly eliminated. The omission of these elements in no way hampers an understanding of the present invention since both register senders and interconnecting link circuits are by now well known in the telephony art and, if desired, any suitable register-sender and sender link of the prior art may be utilized.

The various wiring terminals, together with their interconnections shown on the right-hand side of FIGS. 1C and 1E, are not shown on the detailed embodiment in order to reduce its complexity. Instead, the interconnections between the various circuits are comprised of conductors running directly between such circuits.

2.03. *Attendant positions*

Figure 15:
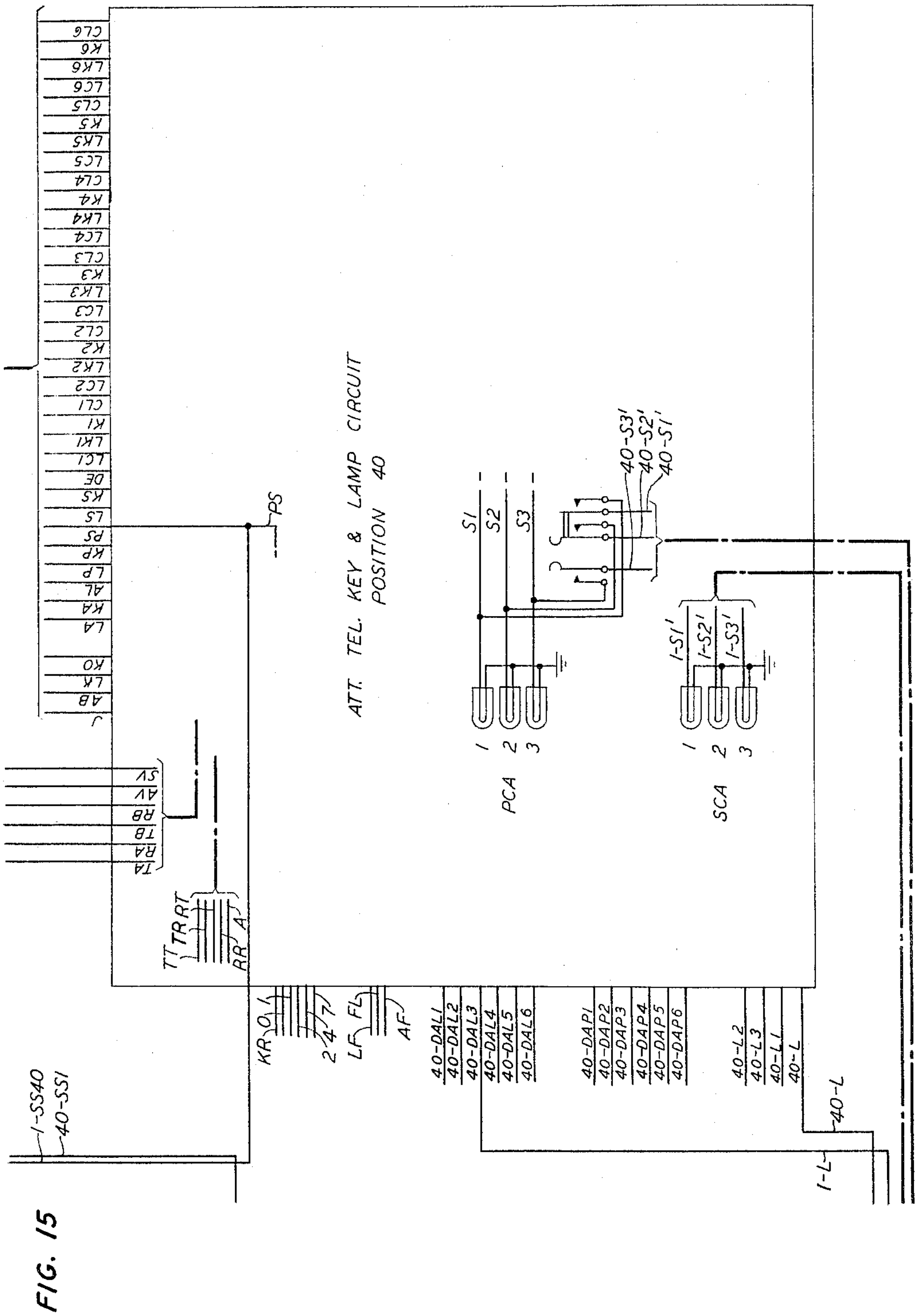

Attendant position 40 is shown for the most part in diagrammatic form on FIG. 15 while attendant position 1 is disclosed in detail on FIGS. 10–13 and 16. Referring to the various equipment comprising attendant position 1, FIG. 10 discloses the six direct access keys designated K1–F6 together with their associated lamps designated DA1–DA6, the indirect access key and lamp designated IA, the primary common answering key and lamp designated PCA, and the secondary common answering lamp and key designated SCA. The top portion of FIG. 12 discloses the keys and lamps comprising the pushbutton dial set in the attendant position. The lower portion of FIG. 12 contains: the override lamp OV, the position pilot lamp P, a chime key CH for switching a bell-like chime into the circuit whereby it emits an audible clang every time the position pilot lamp flashes, a signal restore key SIG–RST for deactivating the position pilot blanking feature, the three primary common answering lamps designated PCA 1, 2 and 3, the three secondary common answering lamps designated SCA 1, 2 and 3, and a brightness control key designated BR–CONT associated with the dark environmental lamp feature. The upper portion of FIG. 16 contains the equipment associated with the position pilot blanking feature together with the dark environmental lamp feature while the M and L relays in the lower right-hand corner of the figure are associated with the call storage feature of the primary common answering facilities.

Figure 11:
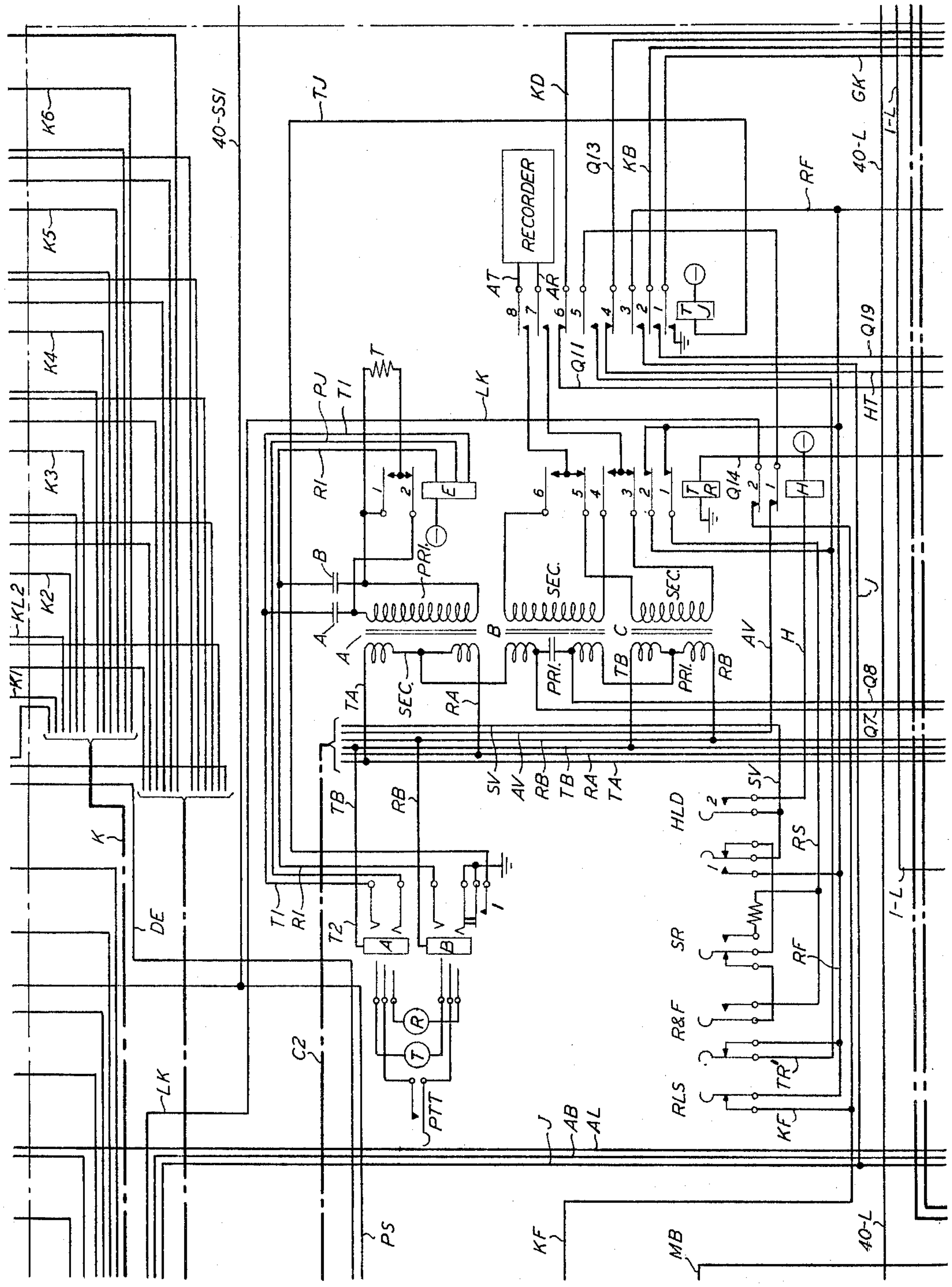

FIG. 11 discloses miscellaneous equipment included in the attendant position circuit including the release key RLS, the ring and flash key R&F, the short ring key SR, and the hold key HLD. Also included on this figure is the attendant's headset which includes plugs A and B, a transmitter T, a headset receiver R and a push-to-talk switch designated PTT. Plugs A and B are inserted into jacks A and B respectively whenever the attendant desires to activate his position. Also included on this figure are the transmission transformers A, B and C, a recorder for recording all calls between an attendant and the various subscribers, together with miscellaneous ralays.

Figure 13:
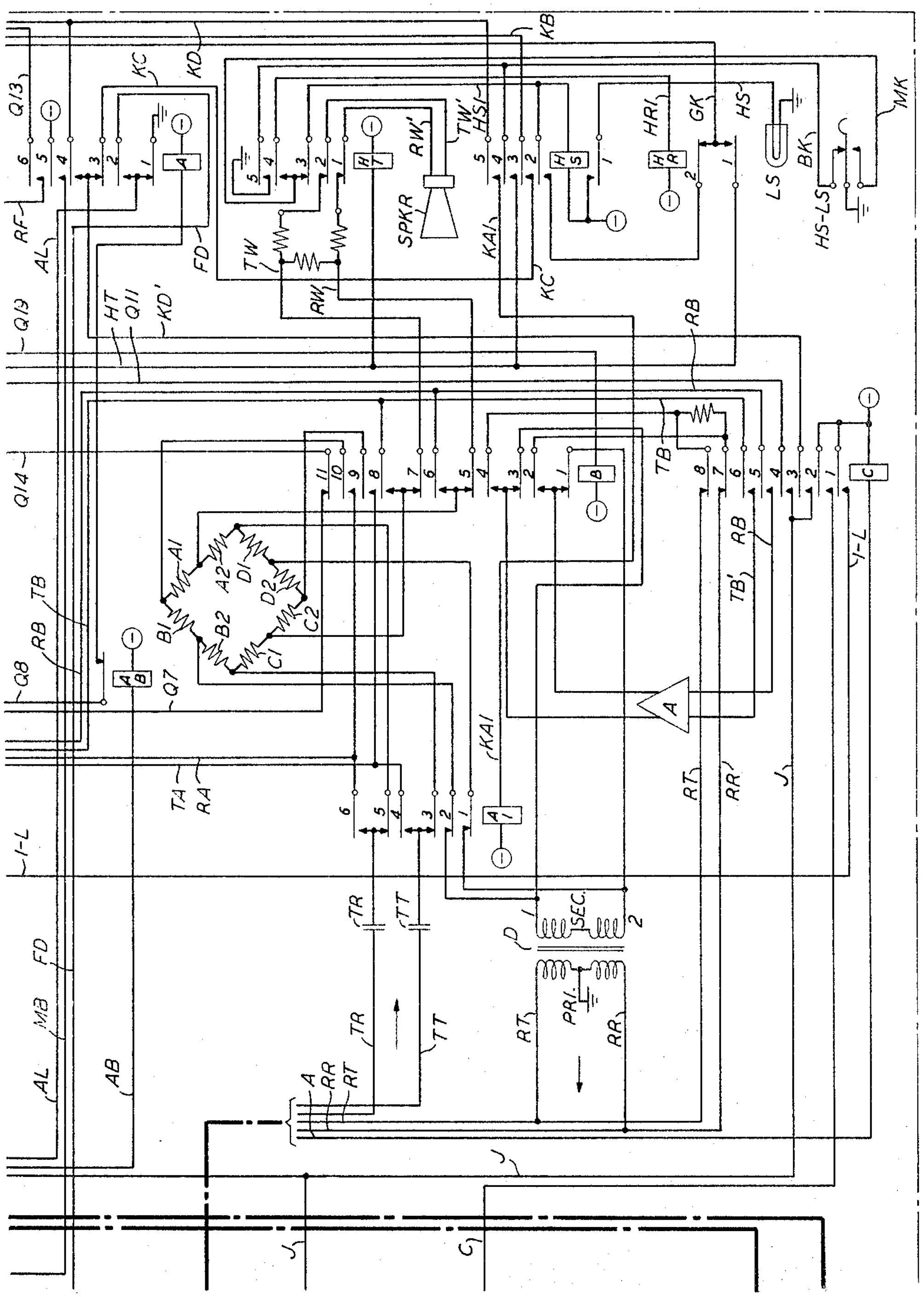

FIG. 13 discloses equipment associated with the override feature as well as other miscellaneous relays. Included in the override feature is the headset loudspeaker key designated HS–LS and the speaker designated SPKR which together permit an attendant to selectively direct incoming overrider speech signals either to his headset or to the loudspeaker.

2.04. *Direct access—call from an attendant position 1 to subscriber station 1*

2.04–1. ACTIVATION OF ATTENDANT POSITION

An attendant must first insert his headset plugs A and B (FIG. 11) into jacks A and B to make a call. The insertion of the headset plugs into the jacks together with the closing of the push-to-talk switch PTT completes the following path for the operation of relay 11–E: negative battery, through the upper winding of relay E, the tip of jack B and plug B, the headset transmitter T, the tip of plug A and jack A, the bottom winding of relay E, the ring of jack A and plug A, the push-to-talk switch PTT, the ring of plug B and jack B to ground. Relay E operates over this path and at its break contacts removes the idle transmitter terminating shunt comprising the resistance T from a primary winding of the transformer A. The insertion of the headset plugs A and B into jacks A and B, respectively, also completes a path to operate relay 11–TJ from the battery on the one side of its winding, over conductor TJ, through the make contacts 1 of jack B (which close when the plug B is inserted into jack B) to ground. The operation of relay TJ performs a number of circuit functions which are described in detail hereinafter. The only thing that need be said at this point concerning the operation of the relay is that it supplies a number of holding grounds for the rest of the circuit.

At this time the receiver of the attendant's headset is connected by means of the sleeves on jacks A and B to the receive conductors TB and RB. Also, the attendant's transmitter is connected over the tips of jacks A and B, over conductors T1 and R1, through capacitors A and B, to the primary winding of transformer A. The secondary of this transformer is connected to the transmit conductor pair TA and RA.

2.04–2. OPERATION OF DIRECT ACCESS KEY AND KEY RELAY CIRCUIT

As shown on FIGS. 1A through 1D, the L lead from direct access key 2 of attendant position 1 is connected to the L lead of line circuit 11 and therefore, the attendant now operates his direct access key 2 to establish a direct access connection between his position and line circuit 11. The operation of the direct access key K2 on FIG. 10 closes a path from ground on break contacts 17 of relay 8–CP, over conductor J extending from FIG. 8 to FIG. 11, over make contacts 3 of relay 11–TJ operated, over conductor RF, through the break contacts of key RLS, over conductor KF, over make contacts 2 of key K2, over conductor KO extending from FIG. 10 to FIG. 8, to the winding of relay KO which operates from the battery on the other side of its winding.

The ground extended through make contacts 2 of key K2 is also extended through make contacts 1 of the same key, over conductor K2 extending through cable K from FIG. 10 to FIG. 11, over conductor K2 to the winding of relay 9–K2, through the winding of the relay, conductor BA, to break contacts 4 of relay 8–KO which are connected to resistance battery. Relay 9–K2 does not operate at this time since a portion of its operating path remains open at break contacts 4 of operated relay KO. The operation of relay KO completes the following circuit for operating relay 8–KN: negative battery, the winding of relay KN, break contacts 1 of relay ST, conductor KN which extends from FIG. 8 to FIG. 9, break contacts 5 of relay 9–K6 and through a chain circuit comprising break contacts 5 on all of relays K5–K1 which are unoperated at this time, break contacts 4 of relays SCA and PCA, break contacts 5 of relay IA, to ground on make contacts 2 of relay KO operated.

Figure 9:
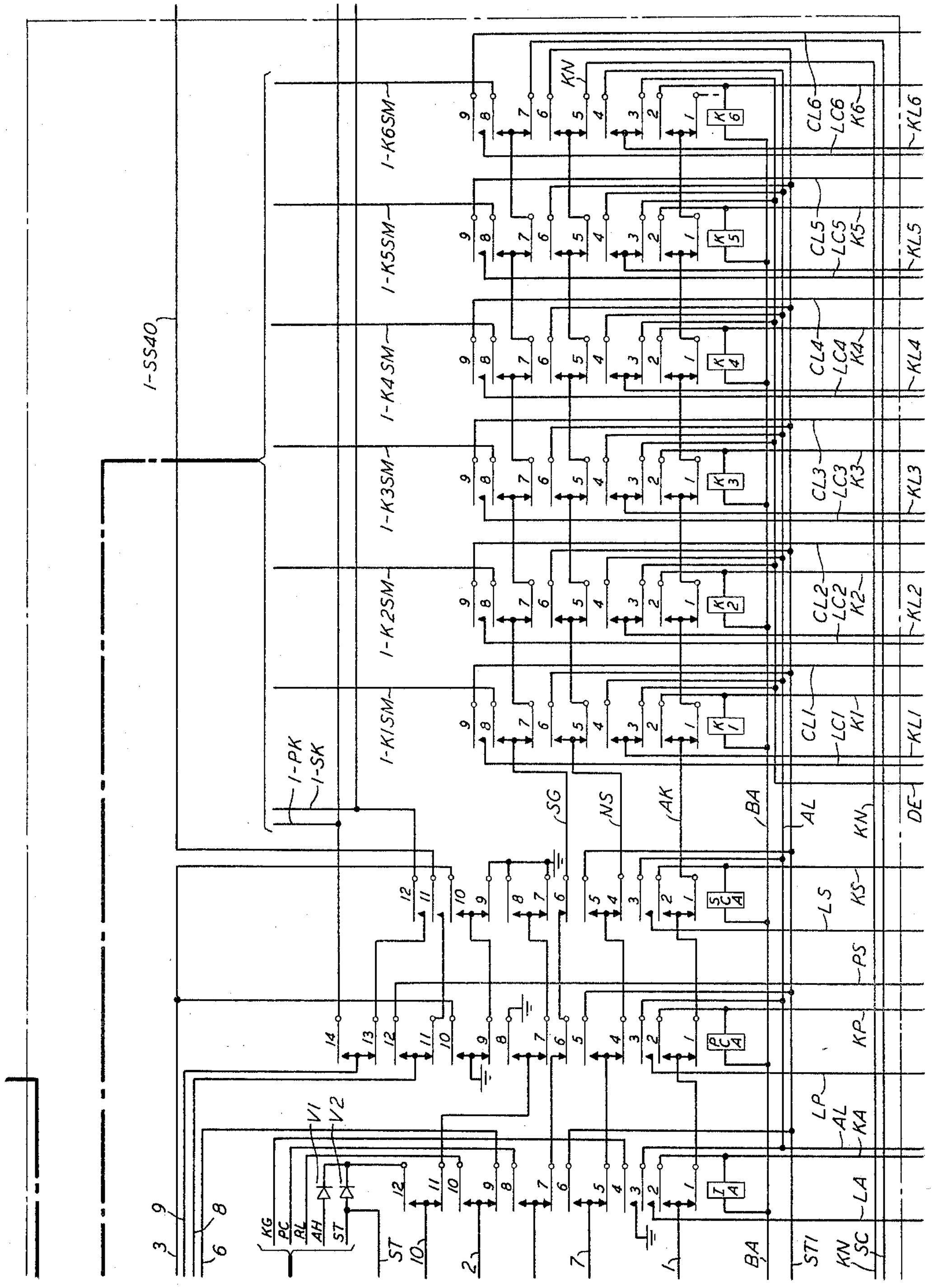

Pausing briefly, it may be seen so far that the operation of direct access key K2 has operated relay 8–KO which, in turn, completes a path to operate relay KN in the event that all the relays on FIG. 9 associated with the attendant's keys on FIG. 10 are unoperated. The operation of relay 8–KN extends a resistance battery through its make contacts 2 and over conductor BA to one side of all of key relays IA, PCA, SCA and K1–K6. Relay KN locks to ground to make contacts 3 of relay KO. Out of all these relays, relay K2 now operates by virtue of the ground applied to the other side of its winding by the operated key K2 as described.

FIG. 1D shows that each attendant position has individually associated therewith a key relay circuit shown as 112 on FIG. 1B. Accordingly, referring to the detailed circuit, the attendant position 1 comprising FIGS. 10–13 and 16 has individually associated therewith the key relay circuit shown on FIGS. 8 and 9. Also, attendant 40 whose position circuit is disclosed on FIG. 15 has individually associated therewith the key relay circuit shown diagrammatically on FIG. 14.

Figure 8:
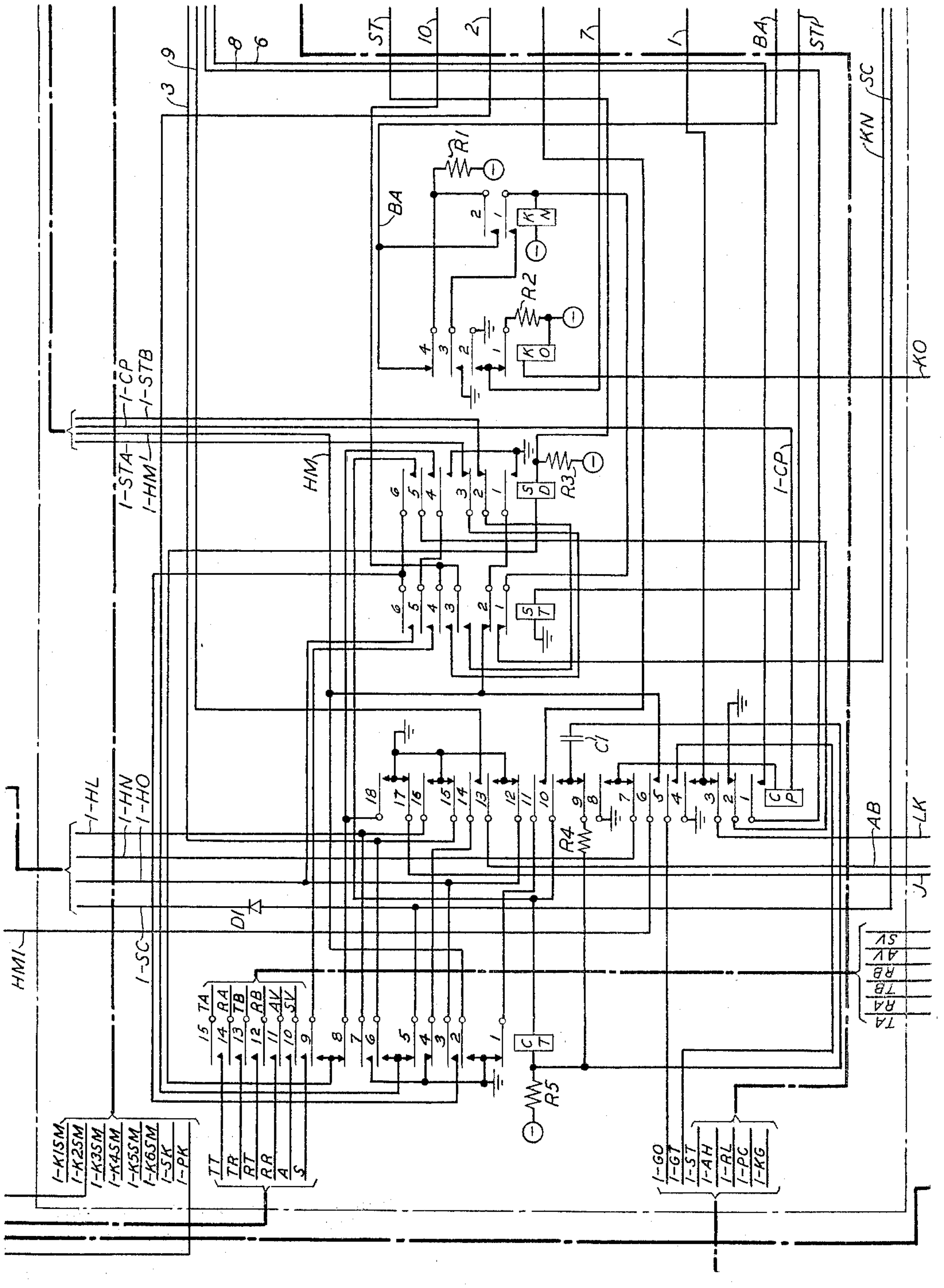

Each key relay circuit basically comprises a number of miscellaneous control relays shown on FIG. 8 together with a plurality of key relays, one for each of the keys shown on FIG. 10 of the attendant's position circuit. The key relays are shown on FIG. 9. Each such relay is individually associated with one of the keys of FIG. 10 and it is operated when the attendant operates its associated key.

Operated relay K2 closes a locking path to ground for itself over its make contacts 2, through break contacts 1 of relays K1, SCA, PCA, IA, break contacts 3 of relay 8–CP, over conductor LK extending from FIG. 8 to FIG. 11, through break contacts 2 of relay H to the aforementioned ground on conductor KF and the break contacts of key RLS. Operated relay 9–K2 also prepares an operating path for relay 8–ST, prepares a part of the operating path for the select magnet which must be operated in order to interconnect attendant position 1 with the line circuit 11, opens operating path for relay KN, bridges leads CL2 and LC2 on FIG. 16 in order that the lamp associated with key 2 will not be blanked as is explained in detail hereinafter, and transfers a ground source for the lamp LL2. These latter two mentioned features associated with the lamp are described in detail hereinafter. Lamp DA2 is not illuminated at this time since the circuit operation described in this section assumes that the attendant is initiating a call to line circuit 11 which is in an idle condition.

Key K2, as well as the rest of the line keys, is of the nonlocking type and it therefore releases when the attendant removes his finger from it. The opening of contacts 2 of key K2 as it is released removes the ground from conductor KO to release relay 8–KO. The release of this relay closes its break contacts 4 to supply another path for maintaining a resistance battery on conductor BA and thereby maintaining relay 9–K2 operated. Recalling that relay 8–KN locked itself to ground at make contacts 3 of relay KO, it may now be appreciated that relay KN releases as make contacts 3 of relay KO open upon the release of relay KO. The operating path for relay KN was previously opened at break contacts 5, relay 9–K2. The release of relay 8–KO provides the following path to operate relay 8–ST: ground on one side of the winding of relay 8–ST, the winding of the relay, conductor ST1, make contacts 6 of relay 9–K2 operated, break contacts 5 of relay K1, break contacts 4 on relays SCA and PCA, break contacts 5 on relay IA, to resistance battery on break contacts 1 of relay 8–KO.

With the release of relays 8–KO and 8–KN, only relays 8–ST and 9–K2 remain operated in the key relay circuit. Thus it may be seen that in the event that a previous connection is being held when an attendant depresses a direct access line key, the operation of relay 8–KO opens its break contacts 4 and thereby first releases the already operated relay in FIG. 9 associated with the previously operated key. The line keys are arranged so that the key relay operating circuit is always closed either simultaneously with or later than the 8–KO relays operating circuit. This and the fact that the 8–KO relay is fast operating, compared to the key relays of FIG. 9, prevents the operation of a second key relay while one is still in an operated condition. This feature is necessary in order to avoid the possibility of the attendant operating one line key and then releasing another without the functioning of the relays 8–KO and 8–KN. These relays must function in order to provide for the release of a previous connection and to register a request for service to the controller.

However, it should also be noted that in the event that more than one line key is depressed at the same time, and as a consequence thereof causes the operation of more than one key relay at the same time, that further irregular circuit actions are prevented by delaying the operation of relay 8–ST until all line keys have been restored to normal. Also, the chaining of the locking circuit for the key relays of FIG. 9 prevents more than one such relay from remaining locked up when more than one line key of FIG. 10 is operated and released simultaneously.

2.04–3. OPERATION OF GATE CIRCUIT

The operation of relay 8–ST completes a path to operate relays 4–PA1 and 4–PB40. This path may be traced from ground on break contacts 7 of relay 9–SCA, through break contacts 7 of relay PCA, break contacts 11 of relay IA, through make contacts 3 and 4 of operated relay 8–ST, through break contacts 2 and 3 of relay 8–SD, over conductors STB and STA extending from FIG. 8 to FIG. 4, through break contacts 1 of relays 4–GTB and 4–GTA to the windings of relays PB1 and PA1 both of which now operate since the other side of their windings is connected to battery.

The circuit shown on FIG. 4 comprises the gate circuit shown as element 113 on FIG. 1B. It may be seen from a study of FIG. 4 that it comprises two sets of relays with each set having a relay individual to each key relay circuit. Thus, since in the illustrative embodiment disclosed herein there are assumed to be 40 attendant positions and hence 40 key relay circuits, each of the two sets of relays on FIG. 4 contains 40 relays. These two sets of relays may be conveniently designated as the A and B set respectively with relays PA1–PA40 comprising the A set and relays PB1–PB40 comprising the B set. Each key relay circuit is associated with an individual relay in both the A and B sets. Thus, the key relay circuit shown on FIGS. 8 and 9 is associated with relay PA1 in the A set and relay PB1 in the B set. Similarly, attendant position 40 and the key relay circuit for attendant position 40 shown on FIG. 15 are associated with relays PA40 and PB40.

Relay 4–GTA and 4–GTB are gate relays, the purpose of which is described in detail hereinafter. The contacts of each set of A and B relays are arranged in a chain circuit which provides a preference circuit to determine the order in which simultaneous calls from a plurality of attendant positions will be served by the controller shown on FIGS. 5–7. In the A set, position 1 is first preferred while position 40 is last preferred. In the B set, position 40 is first preferred and position 1 is last preferred. This reversing of the preference between the two sets together with the fact that either set of relays may serve a call insures that all attendant positions receive equitable service. The gate relays GTA and GTB operate for each call to open the operating paths for all relays in their group. However, all relays in the group which were operated at the time the gate relay operates, remain operated until the call represented thereby is served. When the last relay in a group is released, the associated gate relay releases and, in turn, permits relays in its group to be operated. When the associated gate relays operate, the operated PA- and PB-relays remain operated by make contacts 1 shunting the break contacts of the gate relays.

When operated relay 4–PA1 is being served it is held operated by a path through its make contacts 1 and 5. Similarly, make contacts 1 and 5 of relay 4–PB40 provide a holding path for relay 4–PB40 upon the subsequent operation of relay 4–GTB when 4–PB40 is being served.

2.04–4. OPERATION OF CONTROLLER CIRCUIT

The operation of relays 4–PA1 and 4–PB40 transmits a seizure signal to the controller circuit shown on FIGS. 5–7. The controller is effectively divided into an A portion, which is shown on FIG. 5 and is associated with the PA-string of relays on FIG. 4, a B portion, which is shown on FIG. 7 and is effectively associated with the PB-relays of FIG. 4, and a plurality of relays common to both sections as shown on FIG. 6. Division of the controller circuit into two identical sides, each with its respective gate relays and position sequence relays, provides in effect two separate and complete sets of common control equipment for reasons of security of service. Calls can be served by only one side at a time, and normally the two sides alternate each time the gate circuit operates. The A section of the controller is seized by operating relay 5–CA while the B section is seized by operating relay 7–CB.

Reviewing the circuit action so far, it should be noted that the operation of a key on FIG. 10 causes an associated relay on FIG. 9 to be operated, and, additionally, causes the operation of certain relays on FIG. 8 common to all keys. The operation of the relays on FIGS. 8 and 9 together causes the operation of an associated relay in each of the two relay chains on FIG. 4. Specifically, the operation of the relays on FIGS. 8 and 9 causes the operation of relays 4–PA1 and 4–PB1 both of which are exclusively associated with attendant position 1.

The operation of relays 4–PA1 and 4–PB1 closes simultaneous paths to operate relay 5–CA and 7–CB. However, these two relays are arranged in a chain circuit so that the operation of one opens the operating path of the other and so that one always operates before the other as determined by the condition of relay 6–AC. If the last call had been served by the B side of the controller as shown on FIG. 7, relay 6–AC would be normal and would place a shunt across inductor 5–A and open a shunt across inductor 7–B. Inductor 7–B is in the operating path of relay 7–CB and thereby increases its operating time and, in turn, permits relay 5–CA to win the race. On the other hand, if the last call had been served by the A side of the controller, relay 6–AC would be operated, would place a shunt across conductor 7–B and would also open the shunt across inductor 5–A. Inductor 5–A is then in the operating path of relay 5–CA and thereby increases the operate time of this relay. This, in turn, permits relay 7–CB to operate first and win the race. Relay 6–AC is operated by the operation of relay 5–CA and released by the operation of relay 7–CB.

The methods of operation of the A and B sides of the controller are identical except for the operation and release of relay 6–AC as described. The corresponding relays of the two sides are designated in a corresponding manner for ease of comparison. The following description assumes that relay 6–AC is normal and that the A side of the controller will serve the next call.

The operation of relay 4–PA1 closes the following path to operate relay 5–CA: battery on break contacts 3 of relay 5–TA, the winding of relay 5–CA, break contacts 3 of relay 6–AC, break contacts 5 of relay 7–CB, break contacts of key 7–EB, conductor AA extending from FIG. 7 to FIG. 4, make contacts 8 of relay 4–PA1, conductor BA extending from FIG. 4 to FIG. 5, through break contacts 2 of relay TA to ground on break contacts 2 of key 6–TR.

A similar path is closed at this time over make contacts 8 of relay 4–PB40 to operate relay 7–CB. However, inductor 7–B is effectively in series with the winding of relay 7–CB while inductor 5–A is short-circuited by break contacts 3 of relay 6–AC. This delays the operation of relay 7–CB and permits relay 5–CA to operate first. Relay 5–CA in operating opens its break contacts 2 to break the operate path for relay 7–CB so that it cannot operate at this time. The operation of relay 5–CA closes its break contacts 1 which places an additional shunt across inductor 5–A so that the holding path of relay 5–CA will not be disturbed upon the subsequent operation of relay 6–AC.

The operation of relay 5–CA closes the following path to operate relay 5–FA: battery on break contacts 3 of relay 5–TA, the winding of relay 5–FA, break contacts 2 of relay 5–RA, make contacts 3 of relay 5–CA, to ground on contacts 2 of key TR over the previously described operate path of relay 5–CA. The operation of relay 5–FA closes its make contacts 9 which extends a ground over conductor LPA extending from FIG. 5 via FIG. 6 to FIG. 4, over make contacts 5 of relay 4–PA1 operated, over make contacts 1 of this relay to one side of its winding. This circuit provides an additional holding circuit for the relay. This provides a means whereby the lowest numbered operated relay in the PA-string will remain operated while it is being served. The initial holding ground for relays PA–1 and PB–1 is removed while PA–1 is being served. If relay PA–40 had also been operated when the controller circuit started serving relay PA–1 the operation of relay GTA would not release relay PA–40. Relay PA–40 would be held by ground on 40–STA lead through contacts 1 of relay PA–40.

The operation of relay 5–FA extends a ground over its make contacts 10 to operate relay 5–GA. The closure of make contacts 10 of relay 5–FA also applies a ground to conductor GA1 which extends from FIG. 5 to FIG. 4, to the winding of relay 4–GTA which now operates. The operation of relay 5–FA also extends a ground over its make contacts 2 to conductor F which extends from FIG. 5 to FIG. 6 to the winding of relay 6–AC which now operates.

Operated relay 4–GTA opens the operating paths for all unoperated relays in the PA-string. However, all operated PA-relays remain operated by virtue of ground on their associated STA leads. Relay 5–GA operated closes its make contacts 1 which completes a holding path for itself to ground on make contacts 5 of relay 5–CA operated. Make contacts 1 of relay 5–GA also apply an additional holding ground to conductor GA1 which is connected to relay 4–GTA. Thus, relay 5–GA operated provides a locking path for itself and additionally provides another locking path for relay 4–GTA under the control of relay 5–CA operated. Since relay 5–CA remains operated as long as any relays in the PA-string on FIG. 4 remain operated, relay 5–CA and in turn 5–GA and 4–GTA remains operated until the last operated relay in the PA-string has had its associated position served and has in turn released.

2.04–5. OPERATION OF KEY RELAY CIRCUIT PREPARATORY TO OPERATION OF THE CROSSBAR SWITCH

The operation of relay 5–GA also closes the following path to operate relay 8–CP: negative battery on one terminal of resistor 5–R2, through resistor 5–R2, break contacts 3 of relay 5–RA, make contacts 2 of relay 5–GA, make contacts 11 of relay 5–FA, break contacts 3 of relay 5–TOA, the CPA lead extending from FIG. 5 to FIG. 4, make contacts 3 of relay 4–PA1, conductor 1–CP which extends from FIG. 4 to FIG. 8, through the winding of relay 8–CP, break contacts 7 of relay 8–CP, conductor HN which extends from FIG. 8 to FIG. 3, break contacts 1 of hold magnet LH1 to ground on break contacts 1 of hold magnet DH1. The operate path for relay 8–CP includes the break contacts on the hold magnets in order to insure that relay 8–CP cannot operate before the hold magnets are fully released from the serving of a previous call by the same position.

Operated relay 8–CP closes a direct ground for itself on its own make contacts 8. Break contacts 7 and make contacts 8 of this relay comprise a make-before-break combination to insure a continuous ground on the top winding terminal of the relay. The closure of make contacts 18 of relay 8–CP extends a ground over break contacts 8 of relay CT to the winding of relay 8–SD which operates at this time by virtue of a battery on the other terminal of its winding supplied through resistor 8–R3. The operation of break contacts 17 of relay CP removes the ground from conductor J which extends from FIG. 8 to FIG. 11. The removal of ground from this conductor temporarily removes ground from certain circuits in the attendant position. Included among such circuits is the key circuit of FIG. 10 which has the ground removed from conductor KF in order that the operation of any key at this time will not disturb the proper functioning of the circuits of FIGS. 8 and 9.

It will be recalled that key relay 9–K2 is maintained operated by ground on conductor LK which extends from FIG. 8 to FIG. 11. The ground on this conductor is dependent upon the existence of a ground on conductor J and, since the ground on conductor J is removed during the operation of relay 8–CP, the ground is also removed from conductor LK at this time. Therefore, the operation of make contacts 4 of relay 8–CP supplies a ground to maintain relay 9–K2 operated during the time that relay 8–CP is operated.

Make contacts 13 of relay 8–CP operated apply a ground to conductor AB which extends from FIG. 8 to FIG. 13 to one winding terminal of relay AB. This relay now operates from the battery on the other side of its winding. The operation of this relay opens the receive simplex in the attendant position circuit at the time the transmission circuits are being closed in the position and key relay circuit.

2.04–6. OPERATION OF SELECT MAGNET

The operation of relay 8–CP also completes the following path to operate the select magnet for the called line circuit: ground on break contacts 1 of relay 8–CT, make contacts 11 of relay 8–CP, break contacts 7 of relay 9–IA, break contacts 6 of relay PCA, break contacts 6 of relay SCA, break contacts 7 of relay K1, make contacts 8 of relay 9–K2, conductor K2SM which extends from FIG. 9 to FIG. 8 where in the upper left-hand corner of FIG. 8 it is connected to a conductor SM90 on FIG. 3 which extends to select magnet LS90 to operate it.

Figure 17:
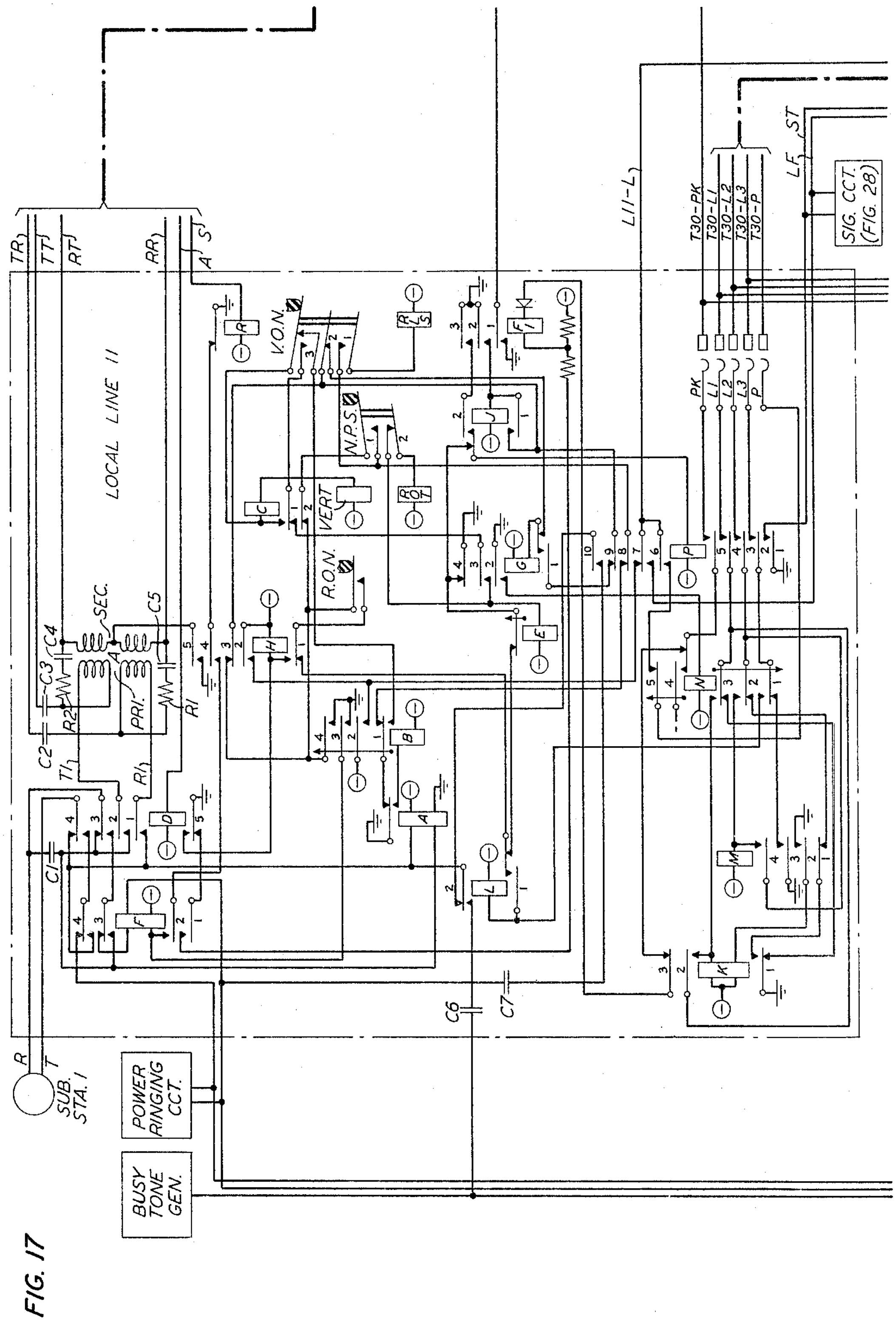

It may be seen from an inspection of FIGS. 1A–1E and of the crossbar switch shown on FIG. 3 that the transmission leads from line circuit 11 on FIG. 17 are connected to the level of the switch served by select magnet LS90. Therefore, the operation of this select magnet partially closes the crosspoints unique to this select magnet and hold magnet LH1. Select magnet 3–LS90 operated completes a path over its make contacts from ground to operate relay 3–SO. Relay 3–SO operated closes its make contacts 1–40 which close through the 40 HM leads to the hold magnets of the switch in preparation for the operation of the hold magnet associated with the position being served. The operation of make contacts 41 and 42 of relay 3–SO applies ground to conductors OS1 and OS2 as a signal to the controller that the select magnets have operated. Ground on conductors OS1 and OS2 on FIG. 6 are extended through break contacts 5 and 6 respectively, of relay 6–GS and then through break contacts 4 and 3, respectively, of the same relay to both windings of relay 6–OS. This relay does not operate at this time since its windings are wound in opposition. The ground supplied through break contacts 5 and 6 of relay 6–GS is also supplied through make contacts 6 and 5 relay 5–FA to both windings of relay 5–HA which operates at this time by virtue of battery on the other side of its windings.

2.04–7. OPERATION OF HOLD MAGNET

The operation of relay 5–HA completes the following path to operate the hold magnet for the attendant's position now being served: ground on make contacts 2 of relay 5–HA, over conductor HMA from FIG. 5 to FIG. 4, make contacts 7 of relay 4–PA1, conductor HM which extends from FIG. 4 to FIG. 8, make contacts 6 of relay 8–CP to conductor HM1 which extends from FIG. 8 to FIG. 3, make contacts 1 of relay 3–SO, and break contacts 2 of hold magnet LH1 to one side of its winding. The hold magnet now operates since the other side of its winding is connected to battery. The operated hold magnet 3–LH1 closes through the transmission leads TT, TR, RT, RR, A and S from line circuit 11 to FIG. 8 where they are open at relay 8–CT. Hold magnet 3–LH1 operated completes a holding path for itself over its make contacts 2 to the HL lead which extends to FIG. 8 and there picks up a ground on make contacts 16 of relay 8–CP.

The operation of hold magnet 3–LH1 applies a ground over its make contacts 1 to conductor HO which extends to FIG. 8, through make contacts 6 of relays 8–ST and 8–SD to the winding of relay 8–CT to operate it. In order to allow for the maximum difference in the operate time of any combination of line and dial switch hold magnets, the operate time of relay 8–CT is increased by capacitor 8–C1 being effectively shunted across the winding of the relay by operated make contacts 10 of relay CP and by the series resistor 8–RS. This extends the operate time of relay 8–CT. Operated relay 8–CT cuts through the transmission leads TT, TR, RT, RR, A and S to the transmission leads from the attendant's position circuit; namely, TA, RA, TB, RB, AV and SV. The operation of relay 8–CT also opens its break contacts 1 which removes the ground holding select magnet 3–LS90 operated thereby permitting it to release. Make contacts 2 of operated relay CT apply a ground to conductor HM. Relay CT operated also switches the operating path of relay 8–SD so that it remains held under control of relay 8–ST. This path may be traced as follows: left-hand winding terminal of relay 8–SD, make contacts 9 of relay 8–CT, make contacts 5 of relay 8–ST, to ground on make contacts 4 of relay 8–SD. Relay 8–CT operated also closes its make contacts 7 which extends a ground to conductor HL to provide an additional holding path for the operated hold magnets on FIGS. 2 and 3.

The release of select magnet 3–LS90 releases relay 3–SO. Relay SO released releases its make contacts 41 and 42 thereby removing the ground from conductors OS1 and OS2. The removal of the ground from these conductors in turn effects the release of relay 5–HA. Relay HA released closes the following path to operate relay 5–RA: ground on conductor HM on FIG. 8 as already described, make contacts 7 of relay 4–PA1, conductor HMA extending from FIG. 4 to FIG. 5, break contacts 1 of relay 5–HA released, the left-hand winding terminal of relay 5–RA, the other side of the winding of the same relay, to battery on break contacts 4 of relay 5–TA. Relay 5–RA operated closes its make contacts 4 to supply an additional holding path to ground for relay 5–GA. These contacts also provide an additional holding path for relay 4–GTA via the GA1 lead connected to make contacts 1 of relay 5–GA.

The operation of relay 5–RA opens its break contacts 3 which, in turn, open the path holding relay 8–CP operated and thereby causes it to release. Relay 5–RA operated also opens its break contacts 2 thereby opening the circuit holding relay 5–FA operated and, in turn, causing it to release. Relay 5–FA released opens its make contacts 9 which remove ground from conductor LPA to cause relay 4–PA1 to release. Relay 5–FA released opens its make contacts 10 which open the operating circuit for relays 5–GA and 4–GTA. However, both of these relays remain operated over their previously described holding paths.

The release of relay 5–FA also opens its make contacts 9 and thus removes the PA1 relay locking ground from lead LPA. The release of relay PA1 opens its make contacts 7 to remove the ground from conductor HMA and, in so doing, to open the circuit holding relay 5–RA operated to cause its release. The release of relay 4–PA1 also opens its make contacts 8 which, in turn, open the circuit holding relay 5–CA operated. This relay now releases in the event that no other relays in the PA-string of FIG. 4 are operated. If, however, one or more such relays are operated, relay 5–CA then remains operated. The opening of make contacts 5 of relay 5–CA and make contacts 4 of relay 5–RA as their respective relays release opens the holding paths for relays 5–GA and 4–GTA thereby causing them to release.

If other attendant positions are requesting service and thereby holding their associated PA– relays operated on FIG. 4, the 5–CA, 5–GA, and 4GTA relays remain operated until all such positions have been served. In case other such PA– relays are operated, the release of relay 5–RA reoperates relay 5–FA to start the controller on another cycle to serve the next 4PA– relay in the order of preference. When the last PA– relay is released, the release of relays 5–CA, 5–GA and 4–GTA returns the A side of the controller to its normal condition.

The release of relay 8–CP transfers capacitor 8–C1 from across the winding of the relay to resistor 8–R4 which provides a discharge path for the capacitor. The release of relay 8–CP also recloses its break contacts 17 which reapplies ground to the J lead in the attendant's position. The release of relay 8–CP also transfers the locking path for operated relay 9–K2 from ground on make contacts 4 of relay CP to ground on break contacts 3 via the LK lead. The release of relay CP also opens its make contacts 13 to remove ground from conductor AB. This causes relay 13–AB to release in the position circuit and thereby close the receive simplex.

Relays 9–K2, 8–CT, 8–SD, and ST remain operated together with the hold magnets on the crossbar switch as long as the call is held.

2.04–8. SEIZURE OF LINE CIRCUIT

At this time, the transmission and control leads in the attendant's position namely, leads TA, RA, TB, RB, AV and SV are connected through the contacts of relay 8–CT and through the crosspoints on the crossbar switch common to hold magnet 3–LH1 and select magnet 3–LS90 to transmission and control conductors TR, TT, RT, RR, A and S of the line circuit shown in FIG. 17. Ground is now furnished from the attendant's position circuit to operate relay 17–D in line circuit 11 on FIG. 17. This path may be traced as follows: ground on break contacts 17 of relay 8–CP, conductor J extending from FIG. 8 to FIG. 11, make contacts 3 of relay 11–TJ, conductor RF, break contacts of key R&F, conductor TR, make contacts 5 of relay 11–TJ, break contacts 1 of relay 11–H, conductor AV extending from FIG. 11 to FIG. 8, make contacts 11 of relay 8–CT, conductor A extending from FIG. 8 to the crossbar switch of FIG. 3, through the crosspoint common to hold magnet 3–LH1 and select magnet 3–LS90, over conductor A to FIG. 17, to the winding of relay 17–D which now operates since the other side of its winding is connected to battery.

The operation of relay 17–D closes its make contacts 5 to complete an obvious path to operate relay 17–H. The operation of relay D also closes its make contacts 3 and 4 and opens its break contacts 3 and 4 which disassociate the tip and ring conductors of station 1 from relay 17–A and transfer them to the power ringing circuit via break contacts 3 and 4 on relay 17–F in series with the upper winding of of relay 17–F. The closure of this circuit applies the ringing voltage output from the power ringing circuit to the tip and ring and from there to the called station 1 to energize the bell at that station. This ringing current is applied through capacitor 17–C1 and make contacts 2 of relay 17–D to conductor T1 and from there back through the transmission conductors to provide an audible ringing tone for the attendant. The ringing current through the upper winding of relay 17–F does not operate it at this time.

Figure 12:
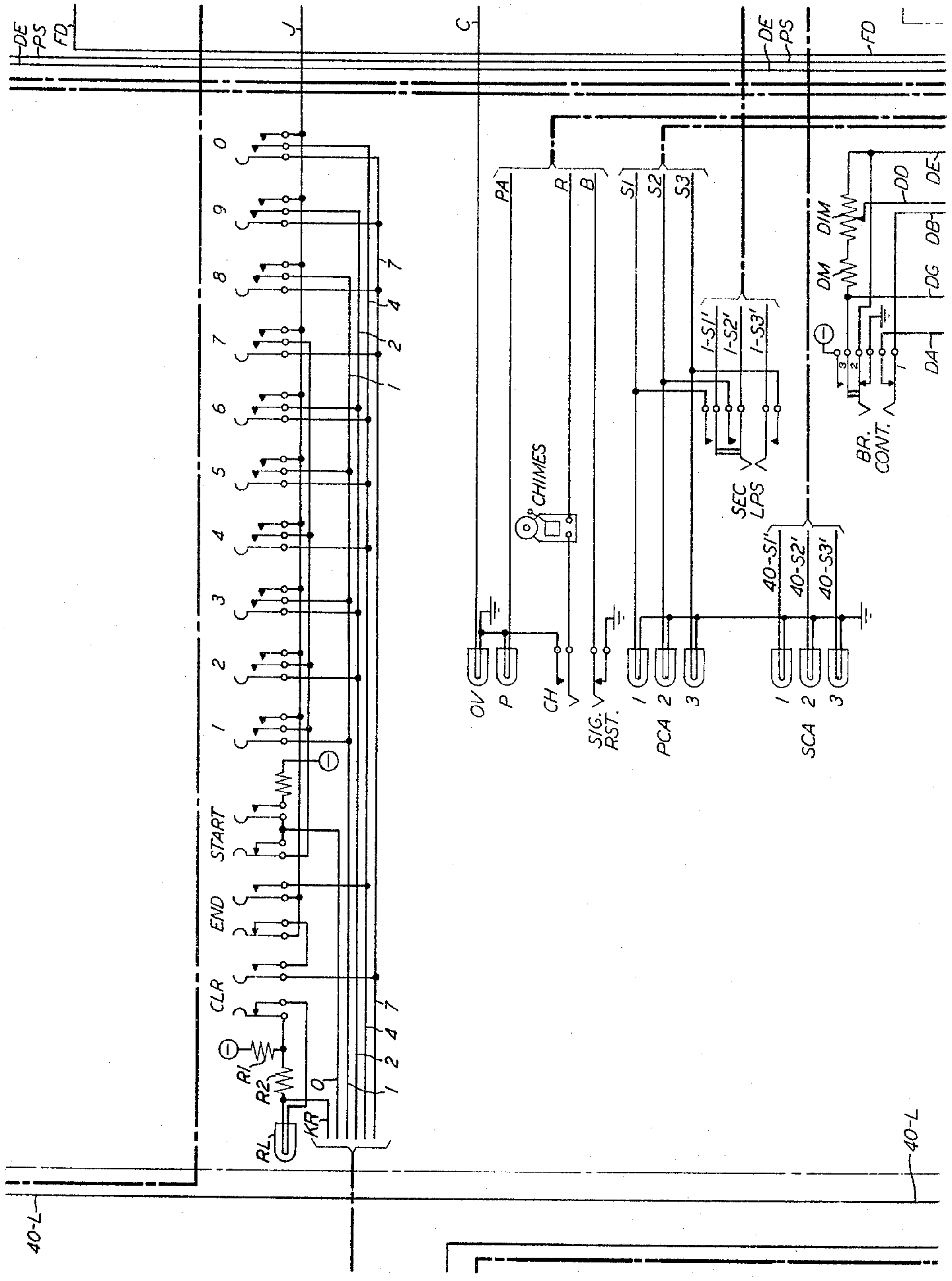

The operation of relay 17–H closes the following circuit to operate relay 13–A: ground on make contacts 5 of relay 17–H, the center tap of the secondary of transformer A, out over the simplex comprising conductors RR and RT, through the closed crosspoints of FIG. 3, through the make contacts of relay 8–CT to conductors TB and RB extending from FIG. 8 to FIG. 11, both primary windings of transformer C, the center tap of the primary of this transformer, the lower winding of the primary of transformer B, conductor Q8 extending from FIG. 11 to FIG. 13, the break contacts of relay 13–AB, to the winding of relay 13–A which now operates since the other side of its winding is connected to battery.

Figure 16:
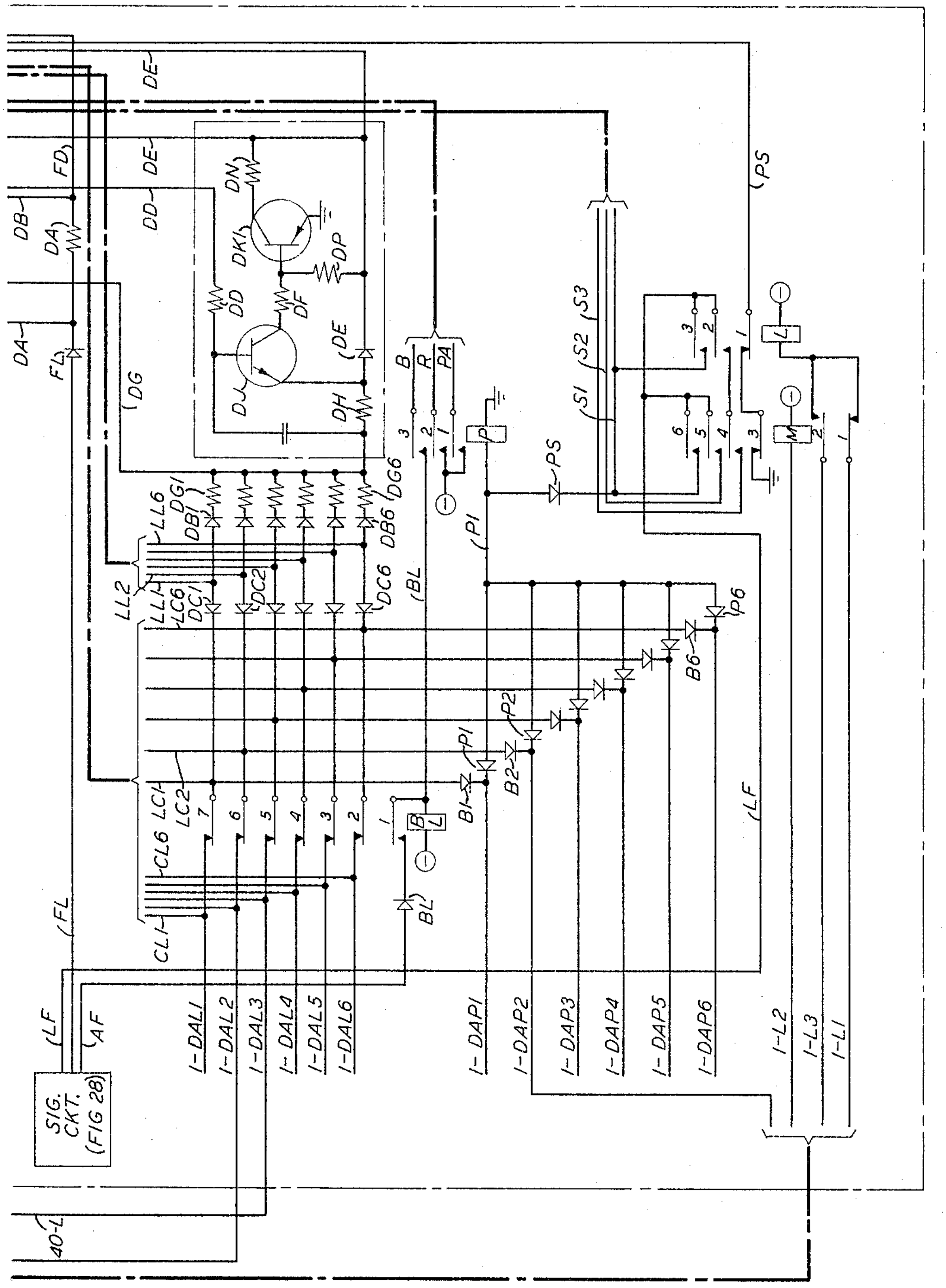

The operation of relay H also closes its make contacts 2 which apply a battery through break contacts 7 of relay 17–P to the conductor L11–L which extends from FIG. 17 to FIG. 16, over conductor DAL2, over break contacts 6 of relay 16–BL, through diode DC2 over conductor LL2 on FIG. 16 to FIG. 10 where this same conductor is connected to one side of lamp DA2 associated with direct access key K2. The other side of lamp DA2 is extended over conductor KL2, through cable K extending from FIG. 10 to FIG. 11, conductor KL2, over make contacts 4 of relay 9–K2 operated, conductor AL extending from FIG. 9 to FIG. 13, make contacts 2 of relay 13–A operated, to conductor FD extending from FIG. 13 to FIG. 16, through break contacts 1 of the brightness control key, BR. CONT, through the diode FL to the flutter output terminal of the Signal Circuit (FIG. 28).

Reviewing briefly, one side of the direct lamp DA2 is connected to this source of flutter potential while the other side of the lamp is connected to the battery on make contacts 2 of relay 17–H. The source of flutter potential comprises an interrupter which operates at a sufficiently low frequency so that the intermittent illumination of the lamp gives it a fluttering appearance which reminds the attendant that he is connected to the line circuit.

If the attendant at position 1 seizes line circuit 11 for an outgoing call before relay 17–F is released by the disconnection on a previous call of both an attendant at another position and the station served by line circuit 11, relay 17–F remains locked by its secondary winding to ground through the break contacts of relay 17–R. This condition temporarily precludes ringing of the station. However, the attendant at position 1 may start the ringing by operating his ring and flash R&F key. The operation of this key applies ground to conductor S of FIG. 17 to operate relay 17–R. The operation of this relay releases relay 17–F which transfers the tip and ring line conductors from the normal talking path to the source of ringing potential. The path to operate relay 17–R may be traced as follows: battery on one side of the winding of this relay, the other winding terminal of the relay, conductor S extending from FIG. 17 to FIG. 3, through the closed crosspoints of the crossbar switch, over conductor S from FIG. 3 to FIG. 8, through make contacts 10 of relay 8–CT, conductor SV extending from FIG. 8 to FIG. 11, break contacts 1 of the hold key, break contacts of the SR key, to the make contacts of the ring and flash key. The operation of this key extends this circuit over conductor RS and through break contacts 1 of relay 11–TR, over conductor RF, through make contacts 4 of relay 11–TJ to ground on the J lead as already described.

2.04–9. REMOVAL OF HANDSET BY CALLED PARTY

When the handset at the called station is removed from its mounting, the D.C. voltage superimposed on the ringing current during the ringing interval or direct battery voltage during the silent interval of the ringing operates relay 17–F sufficiently to close its make contacts 2. The closure of these contacts completes a circuit to fully operate relay 17–F through make contacts 4 of relay 17–H to ground on break contacts of relay 17–R. The operation of relay 17–F removes the ringing potential from the line at its break contacts 4 and 3, and connects the line through to the windings of relay 17–A and the talking circuit comprising conductors T1 and R1. The station bridge on the line operates relay 17–A which, in turn, closes an obvious path to operate relay 17–B. The operation of relay B closes its make contacts 2 to provide another source of battery for conductor L11–L and closes its make contacts 3 to provide another holding path for relay 17–F. The attendant is now fully connected to the called party at station 1, the connection is completed, and conversation may now take place.

2.04–10. DISCONNECTION

When the attendant disconnects first, such as for example by operating key RLS, the operation of this key removes the ground supplied to conductor AV on FIG. 11. This ground is supplied to the conductor both by break contacts on the R&F key through break contacts 1 of relay 11–H and make contacts 5 of relay 11–TJ, as well as through break contacts 1 and 2 of relay TR and then through make contacts 3 of relay 11–TJ to conductor J. The removal of the ground from this lead removes the ground from conductor A in FIG. 17 and thereby causes relay 17–D to release. The release of relay 17–D, in turn, releases relay 17–H. With relay 17–H released, the subsequent disconnection by the called station releases relay 17–A which, in turn, releases relay 17–B. Relay B is slow in releasing and during its release time the vertical magnets of the step-by-step switch associated with this line circuit are energized thereby causing the shaft to take one vertical step. When the relay 17–B releases, the vertical magnets are released and the release magnet is operated to return the shaft to its normal position. The release of relays 17–H and 17–B open both holding paths for relay 17–F and thereby causes it to release.

In the event that the called station disconnects first, relays 17–A and 17–B are released and the shaft is actuated in the manner described in the preceding paragraph. Subsequently, when the attendant disconnects, the release of relay 17–D opens the talking path and releases relay 17–H which, in turn, releases relay 17–F.

The release of relay 17–B and 17–H removes the battery potential from conductor L and thereby extinguishes the direct access lamp associated with direct access key 2. The release of relay 17–H also opens its make contacts 5 which removes the ground from the receive simplex and thereby releases relay 13–A.

The operation of the RLS key removes ground from the LK lead, as described, which causes relay 9–K2 to release by opening its holding path. The release of relay 9–K2, in turn, opens the holding path of relay 8–ST thereby causing it to release. The release of the latter relay opens a holding path for relay 8–SD to cause its release. The release of relay 8–SD opens the holding path of relay 8–CT and causes it to release. Contacts of relay 8–CT in parallel with contacts of relay 8–ST prevent relays 8–SD and 8–CT from racing each other during their release time. If the race were permitted, and relay 8–CT released first, relay 8–SD would remain locked operated.

Released relay 8–CT opens the TT, TR, RT, RR, A and S leads to the line circuit and releases hold magnet 3–LH1.

In the event that the attendant operates another line key rather than the RLS key at the termination of a conversation, the operation of the other line key effects the release of the connection by initially operating relay 8–KO as described. Operated relay 8–KO transfers the 8–ST relay winding from battery to ground and releases operated relay 9–K2 which, in turn, releases relay 8–ST. The remainder of the release function is the same as already described. The entire circuit, insofar as the connection just described is concerned, is now back in its original or normal condition with only relays 11–TJ and 11–E operated. These relays remain operated as long as the attendant headset is plugged into jacks A and B on FIG. 11.

2.05. *Call from subscriber station 1 to attendant position 1*

2.05–1. STATION 1 HANDSET REMOVED FROM ITS MOUNTING

When the handset at subscriber station 1 is removed from its mounting upon the initiation of a call by the subscriber thereat, a low resistance shunt is placed across the tip and ring of the line which is extended through break contacts 3 and 4 of relay 17–D to operate relay 17–A. The operation of relay A completes an obvious path to operate relay B. The operation of relay 17–B completes a path to operate relay G from ground on make contacts 4 of relay B, through break contacts 3 of relay H, through break contacts 2 of the vertical off-normal switch, through break contacts 1 of relay G, through the winding of the relay to battery. The closure of make contacts 2 of relay G completes an obvious circuit to operate relay 17–N.

The operation of relay 17–B closes its make contacts 2 which extends battery potential through break contacts 7 of relay P to conductor L leading to conductor DAL2 (FIG. 16) of attendant position 1. Battery on this conductor closes the following path to cause the lamp associated with direct access key 2 to be illuminated steadily: battery on conductor L11–L extending from FIG. 17 to FIG. 16, through break contacts 6 of relay 16–BL, through diode DC2 over conductor LL2 extending from FIG. 16 to FIG. 10, through the lamp associated with direct access key 2, over conductor KL2 extending from FIG. 10 to FIG. 9, through break contacts 3 of relay 9–K2, to conductor DE extending from FIG. 9 to FIG. 16, through resistor DN and the collector-base-emitter path of transistor DK1 to ground. Also, a similar path is closed (not shown) to illuminate the direct access lamp in any other attendant position having direct access to line circuit 11. The steady illumination of this lamp indicates that the line circuit is in a busy condition.

The operation of relay 17–B also closes its make contacts 3 which completes an obvious path to operate relay F. Make contacts 1 of relay G upon closing complete a path through break contacts 9 of relay P, through break contacts 3 of relay H to ground on make contacts 4 of relay B. This comprises a holding circuit for relay G.

Break contacts 3 and 4 of relay 17–F operated remove the power ringing circuit from the contacts of relay D.

2.05–2. VERTICAL STEPPING

As shown on FIGS. 1A–1D the L1, L2, L3 and PK conductors from attendant position 1 are connected to position 30 in the step-by-step switch banks of line circuits 11–20. Consequently, subscribers served by such line circuits must dial the digits 30 in order to reach the attendant at position 1.

Relay 17–A releases and reoperates as the subscriber at station 1 dials the digits 3 in an attempt to reach attendant position 1. Relay B is of the slow release type and remains operated during the pulsing of the A relay. Each release of relay A energizes the vertical magnets in series with relay C to step the shaft vertically. This path may be traced as follows: ground on break contacts of relay 17–A, make contacts 1 of relay B, break contacts 3 of the vertical off-normal switch, the winding of relay C, to the winding of the vertical magnet which has the other side of its winding connected to battery. Relay C is also of the slow release type and remains operated during vertical stepping. On the first vertical step the vertical off-normal springs operate which, by means of break and make contacts 3 of these springs, open the operating path for relay C and the vertical magnets and close a holding path for the same relay and another vertical magnet operating path under control of its own make contacts 1. After the last pulse of digit 3 is received, relay 17–A remains operated and relay 17–C releases thereby preparing the switch for rotary stepping.

In case of a momentary opening of a line before the first digit is dialed, relay A releases and then reoperates causing the shaft of the switch to take one vertical step. The normal post spring cam is adjusted to operate the normal post springs when the shaft of the switch is on level 1. Consequently, when relay C releases at the same time the switch is on level 1, a circuit is closed to operate the release magnet of the switch and return the shaft to normal. This circuit may be traced as follows: ground on make contacts 4 of relay B, break contacts 2 of relay C, make contacts 1 of the normal post springs, make contacts 1 of the vertical off-normal switch, to one side of the release magnet which has a battery connected to its other side.

2.05–3. ROTARY STEPPING

Next, the subscriber dials the digit zero. Relay 17–A releases and operates in unison with the received pulses of this digit. Each release of relay A energizes the rotary magnet in parallel with relay E. This path may be traced as follows: ground on break contacts of relay 17–A, make contacts 1 of relay B, make contacts 3 of the vertical off-normal switch, break contacts 1 of relay C, make contacts 3 of relay G, to one side of the winding of relay E, which relay has a battery connected to the other side of its winding as well as through break contacts 2 of the normal post springs to the rotary magnet. Relay E is slow to release and remains operated during the entire rotary stepping operation. After the last pulse of the digit zero has been received, relay A remains operated and relay E releases.

At this time, the subscriber served by station 1 having dialed the digits 30, the step-by-step switch portion of local circuit line 11 has now moved to its bank position 30 in which its wipers PK, L1, L2, L3 and P are connected to the correspondingly designated terminals of the switch bank. Conductor PK extends from FIG. 17 to FIG. 9. On FIG. 9, the PK conductor for attendant's position 1 is cross connected to the SK conductor for position 40 shown diagrammatically on FIG. 14. As previously discussed in the general description, this cross connection permits position 1 to answer calls on a primary common answering basis from any incoming line circuits dialing the digits 30 while the attendant at position 40 may, when position 1 is overloaded, answer the same calls on a secondary common answering basis by the operation of his SCA key. Operation of the SEC–LPS key at position 1 causes the calls directed to position 1 to be indicated at the secondary common answering lamps at position 40. Conductors L1, L2 and L3 as shown in FIG. 17 are multipled to the bank position 30 of the step-by-step switch in all of local line circuits 11–20. Conductors L1, L2, and L3 of bank position 30 are connected to correspondingly designated conductors on FIG. 16 of attendant position 1. The P conductor of FIG. 17 is not multiplied to other banks and extends to FIG. 16 of the attendant position 1 where it is connected to conductor DAP2. This connection in a manner described hereinafter controls the position pilot lamp and the blanking feature for this position when calls are received from line circuit 11.

2.05–4. PCA CALL STORAGE FACILITIES

Each attendant position includes a set of three line signal lamps (PCA 1, 2 and 3) and two relays 16–M and 16–L), which together, provide a means for storing a maximum of three calls at the position which are directed thereto by subscribers served by line circuits having incoming dial selection line circuits 11–20. If desired, the various attendant positions may be arranged for primary and secondary answering responsibility. In this case, a set of lamps in multiple may be provided at the secondary position. This is shown on FIG. 14 where the PK conductor of FIG. 9 is connected to SK conductor of FIG. 14. As described hereinafter, this permits the attendant at position 40, as shown on FIG. 15, to answer the calls received by position 1 over his PCA facilities and manifested by the flashing of the PCA 1, 2 and 3 lamps at position 1 and the SCA 1, 2 and 3 lamps at position 40.

The relays in the attendant position circuit associated with the call storage feature are operated when ground is connected to conductors L1, L2 and L3 by the various line circuits which dial the same position. These relays, in turn, connect flashing batteries to the local line incoming signal lamps PCA 1, 2 and 3. Conductors L1, L2 and L3 of each bank position are multiplied to corresponding bank terminals of all line circuits of this type (11–20) and are cross connected to the attendant position circuits according to the dial code assigned to each position.

At the end of rotary stepping the release of relay 17–E completes the following path to operate relay 17–P: ground on make contacts 4 of relay 17–B, the closed rotary off-normal switch contacts, break contacts 1 of relay 17–H, break contacts 1 of relay L, break contacts of relay E, break contacts 2 of relay J to the winding of relay 17–P. The operation of relay P causes the holding circuit for relay G to be opened to effect its release. The operation of 17–P also completes a path to transmit ringing tone back to the calling subscriber. This path may be traced as follows: the power ringing circuit, capacitor C–7, make contacts 10 of relay 17–P, break contacts 2 of relay L, break contacts 4 of relay D to the ring side of the line. The closure of make contacts 2, 3 and 4 of relay 17–P connects through the switch wipers to the windings of relays K, M and L which three relays comprise the circuit of the call storage feature.

The opening of make contacts 2 of relay G opens the operating circuit for relay N and thereby causes it to release. However, relay N is of the slow release type in order to provide a sufficient time for wipers L1, L2 and L3 to test for grounds on the switch bank contacts they have just engaged. Relays K, M, and L are operated by the currents over these conductors whenever all three conductors are grounded, thereby signifying that there are already three lines waiting to be answered by attendant position 1. If no lines are waiting to be answered by position 1, all of conductors L1, L2 and L3 are ungrounded and none of relays K, M, and L operate. In this case, the release of relay N completes a path from ground over break contacts 1 of relay K, through its own break contacts 3, and make contacts 4 of relay P to apply a ground to wiper L1. The ground on wiper L1 is extended over conductor L1 from FIG. 17 to FIG. 16. On FIG. 16 this circuit extends through break contacts 1 of relay M to one side of the winding of relay L. This latter relay now operates since the other side of its winding is connected to battery. The operation of relay 16–L completes the following path to cause the lamp PCA–1 to be energized with a flashing potential: conductor LF on FIG. 16 which is connected to a flashing battery within the signal circuit, make contacts 3 of relay 16–L, conductor S1 extending from FIG. 16 to FIG. 12, to one side of the PCA–1 lamp whose other side is connected to ground. The flashing PCA–1 lamp notifies the attendant at position 1 that he has an incoming call which may be answered by the operation of his PCA key. A path is also closed at this time to cause relay 16–P to operate from the flashing potential and, in turn, to energize the blanking feature. This is described in detail hereinafter.

The operation of relay 17–P opens its break contacts 7 and closes its make contacts 7 which transfers conductors L of FIG. 17 from a steady battery on contacts 2 of relays B or H to a flashing battery via conductor designated LF to the signal cicuit where it is connected to a flashing source of potential from the signal circuit as later described. This causes the direct access lamp 2 to change from a steady to a flashing condition. The closure of make contacts 1 of relay 17–P previously supplied a ground to the ST lead to energize the Signal Circuit.

At this time, both the PCA–1 lamp and the direct access lamp associated with key 2 are now flashing. The attendant at this time may either answer the call by the direct access means, in which case he operates his direct access key 2, or alternatively, he may answer it by means of his primary common answering circuit, in which case he operates his PCA key.

Reviewing the call storage operation briefly, it has been assumed so far that the subscriber served by line circuit 11 on FIG. 17 picked up his handset and dialed the digits 30 to interconnect himself with the attendant at position 1. It is further assumed that there were no other incoming calls to position 1 at that time and therefore the stepping of the step-by-step switch in line circuit 11 to its position 30 resulted in the flashing of the lamp associated with direct access key 2 and the flashing of the PCA–1 lamp. It has also been pointed out that at this time the attendant at position 1 has the option of either answering this call by operating his direct access key 2 or alternatively, by operating his PCA key.

2.05–5. PCA LAMP PROGRESSION AS ADDITIONAL STATIONS ATTEMPT TO SEIZE ATTENDANT POSITION 1

Figure 18:
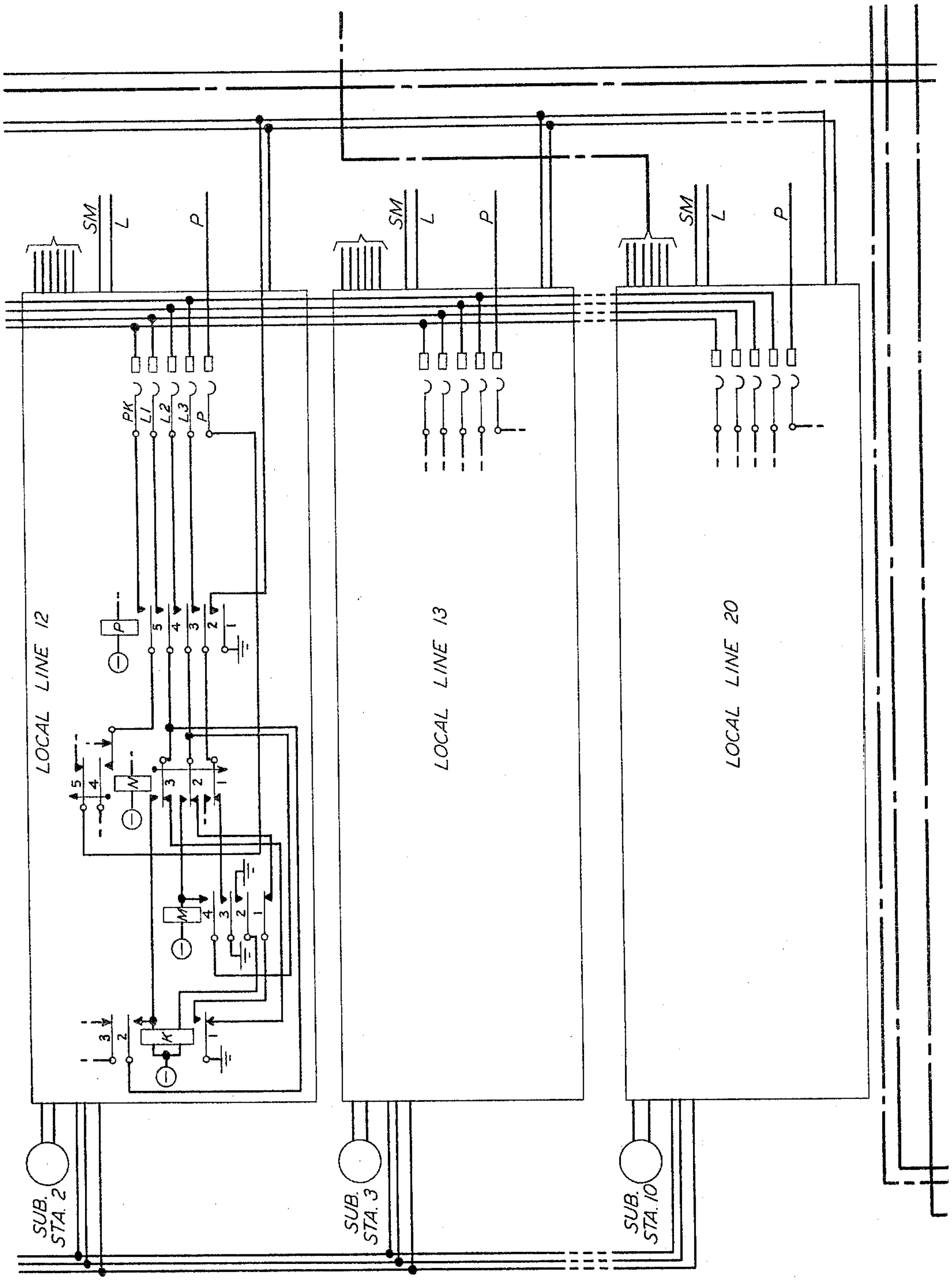

Let it now be assumed that a subscriber served by the line circuit 12 on FIG. 18 also picks up his handset and dials the digits 30 to interconnect himself with position 1 before the attendant at this position answers any of his incoming calls. When the second subscriber dials the digits 30 and line circuit 12 subsequently performs its test for ground on conductors L1, L2 and L3, its K relay is operated by the ground applied to conductor L1 at this time by local line circuit 11. In local line circuit 12, the path to operate the K relay may be traced from ground on conductor L1, through make contacts 4 of its P relay, through make contacts 3 of its N relay to one side of a winding of its relay K whose other side is connected to battery. The ground on make contacts 4 of relay P is also directly extended to make contacts 2 of relay K to provide a holding path for the relay upon release of its N relay. The release of relay N of line circuit 12 closes a path from ground on make contacts 1 of relay K, through break contacts 1 of relay M, through break contacts 2 of relay N, through make contacts 3 of relay P, to apply a ground over its wiper L2 to conductor L2. The ground on conductor L2 is extended from FIG. 18 to FIG. 16 where it operates relay 16–M. The operation of relay M opens the operating circuit for relay L and thereby causes it to release. At this time, the flashing battery from the signal circuit is extended through make contacts 5 and 6 of relay M to conductors S1 and S2 extending to FIG. 12, where they are connected to the PCA1 and 2 lamps to cause them to flash.

Again summarizing briefly, at this time the subscribers served by both line circuits 11 and 12 have picked up their handsets and dialed the digits 30 in an attempt to interconnect themselves with the attendant at position 1. Assuming that this attendant has not yet answered either call, both his PCA1 and 2 lamps would be flashing at this time. In addition, his direct access lamp No. 2 will also be flashing since the attendant at position 1 is assumed to have direct access to line circuit 11 by means of his direct access key 2. Also at this time, any attendant position having a direct access to line circuit 12 will have its corresponding direct access lamp flashing since the L lead on line circuit 12 will be interconnected with such a direct access lamp and will apply a flashing battery thereto.

Let it now be assumed that a subscriber served by line circuit 13 also picks up his his handset and dials the digits 30 to interconnect himself with position 1 before the attendant thereat has answered any calls. At this time the wipers of the step-by-step switch in line circuit 13 make the test for ground on conductors L1, L2 and L3 of bank position 30. The K relay of line circuit 13 operates from ground on conductor L1 in the manner already described for line circuit 12. Also, there is a ground on conductor L2 at this time and therefore, a circuit is closed in line circuit 13 from ground on its conductor L2 through make contacts 3 of relay P, make contacts 2 of relay N, to the winding of relay M to operate it. Relay M operated closes its make contacts 4 to complete a holding path for itself to ground on make contacts 3 of relay P. The subsequent release of relay N of line circuit 13 causes the ground on make contacts 3 of relay M to be extended through break contacts 1 of relay N and through make contacts 2 of relay P to conductor L3. The ground on conductor L3 is extended to FIG. 16 where it operates relay 16–L through make contacts 2 of relay M. The operation of relay L extends a flashing battery potential through its make contacts 2 and through make contacts 4 of relay M to conductor S3 which extends to FIG. 12 where it is conducted to the PCA3 lamp to cause it to flash.

At this time, the subscribers served by line circuits 11, 12 and 13 are all interconnected with attendant position 1, the attendant has not as yet answered any of these incoming calls, and therefore, all three of his PCA1, 2 and 3 lamps are now flashing. In addition, the direct access lamps will be flashing in any attendant positions having direct access to any of these three line circuits.

Any additional line circuits, such as for example, line circuit 20, whose subscribers dial the digits 30 at this time will receive a busy tone.

Thus, if for example, a line circuit similar to local line circuit 11 should dial the digits 30 at this time, its relays K, M and L will all be operated since there is ground on all of leads L1, L2 and L3 at this time. Its relay L operated locks to ground over the following path: its make contacts 1, break contacts 1 of relay H, make contacts of the rotary off-normal switch, and make contacts 4 of relay B. The operation and locking of relay L completes the following path whereby busy tone is applied to one side of the calling party's line: the output of the busy tone generator, capacitor C6, make contacts 2 of relay L, break 4 of relay D to the tip side of the calling line. The operation and locking of relay L opens the break contacts of relay L thereby breaking the holding path for relay P to cause its release. The release of relay P opens all the wiper circuits which results in the release of relays K and M. The subsequent hangup by the calling party releases relays A and B which completes the following path to energize the release magnet of the switch to cause its release: ground on break contacts of relay A, break contacts 1 of relay B, break contacts 8 of relay P, make contacts 1 of the vertical off-normal switch to the winding of the release magnet.

2.05–6. PCA LAMP REGRESSION

When there are two or three lines waiting to be answered at an attendant position, they are automatically answered in the order in which their calls arrive at the position providing the attendant answers by use of his common answering circuit. Assume that the previously described calls from line circuits 11, 12 and 13 are waiting to be answered as already described and that the attendant momentarily depresses his PCA key to answer a call with his PCA facilities. Since the detailed circuit operations concomitant to the answering of a call are fully described later, all that need be said at this point is that the P relay of a line circuit releases as an attendant connects thereto to answer an incoming call. The release of the P relay in line circuit 11, as position 1 answers its call, removes ground from conductor L1. The removal of ground from this conductor opens the holding path for relay K of line circuit 12 to cause it to release. Relay K of line circuit 13 remains held over ground on make contacts 2 of its relay M. The release of relay K of line circuit 12 causes its make contacts 1 to release and remove ground from conductor L2. Break contacts 1 of relay K of this line circuit close as the relay releases and extend the ground thereon through break contacts 3 of relay N and make contacts 4 of its relay P to conductor L1.

The removal of ground from conductor L2 as the K relay of line circuit 12 releases, causes relay M of line circuit 13 to release and, in turn, remove the ground from conductor L3. The release of relay M of line circuit 13 also opens one holding path for its relay K but it holds by ground on conductor L1 from line circuit 12. The removal of ground from conductor L3 causes relay 16–L to release, and its make contacts 2 now open to remove the flashing battery from lamp PCA3 in FIG. 12.

At this point, the call on line circuit 12 has now become first in line to be answered and the call on line circuit 13 has now moved up one to become second in line to be answered. There is now a vacancy in the PCA storage queue and thus the subscribers served by any others of line circuits 11–20 may at this time dial the digits 30 to interconnect themselves with position 1. In this case, any such call would become No. 3 in line to be answered.

Let it now be assumed that the attendant at position 1 has completed his conversation with the subscriber served by line circuit 11 and reoperates his PCA key to answer the call waiting on line circuit 12. The operation of the PCA key, as hereinafter described, effects the release of the P relay of line circuit 12 which removes ground from conductor L1 and thereby causes the K relay of line circuit 13 to release. The release of the K relay of line circuit 13 removes the ground from conductor L2 and reconnects it to conductor L1 as already described for the answering of the previous call. The removal of ground from conductor L2 causes relay 16–M to release and remove the flashing battery from conductors S1 and S2 which, in turn, causes lamp PCA2 on FIG. 12 to extinguish. The PCA1 continues to flash since the ground on conductor L1 is extended through break contacts 1 of released relay 16–M at this time to reoperate relay 16–L. The reoperation of this relay applies the flashing battery to conductor S1 and thereby maintains the PCA lamp 1 in a flashing condition.

At this time, the attendant is interconnected for communication with the subscriber served by line circuit 12 and the call on line circuit 13 has now become first in line waiting to be answered. There are thus two vacancies at this time in the primary common answering circuit and accordingly, calls may be received and stored from two line circuits of the type shown by line circuits 11–20.

Once the attendant finishes his conversation with the subscriber served by line circuit 12, he reoperates his primary common answering key which causes the P relay of line circuit 13 to release. This removes ground from conductor L1. The removal of ground from this conductor causes relay 16–L to release and extinguish the PCA1 lamp.

At this time the attendant at position 1 is interconnected for communication with the subscriber served by line circuit 13 and there are three vacancies in the PCA queue.

It should be noted that the attendant at position 1 may operate his secondary lamp key SEC–LPS on FIG. 12 and thereby cause the secondary lamps of the attendant at position 40 to be operated in parallel with the primary common answering lamps of attendant position 1 on FIG. 12. This key would normally be operated when the attendant at position 1 is overloaded with incoming calls and would like the attendant at position 40 to assist with the overload. Similarly, the attendant at position 40, in the event that he is overloaded with incoming calls, may operate his secondary lamps key and thereby cause the secondary lamps SCA1, 2, 3 of the attendant at position 1 to operate in parallel with the PCA-lamps of position 40. By this means the attendant position 1 is notified of the overload condition of position 40 and may assist in answering all his calls.

It should be remembered that calls may be answered by the indirect access or by the direct access facilities as described hereinafter. Also, incoming calls may abandon their attempt rather than wait for their turn to be answered. In these cases, the stored calls may not vacate their places in the storage queue in the order in which the calls arrived. For example, if there three lines waiting to be answered, the second line may be answered first, for example, by the direct access means. In this case, the release of its P relay removes ground from the the L2 lead thereby releasing relay M of the third line circuit. The release of relay M extinguishes PCA lamp 3 and causes the third waiting line to become the second waiting line.

2.05–1. POSITION PILOT BLANKING

The various lamps at a position will often be in different conditions of illumination at any given instant. For example, one or more of the direct access lamps may be illuminated steadily to indicate that their calls have been answered by other positions at which their line circuits have direct access. Other direct access lamps at the same position may be flashing to indicate line circuits in a calling condition whose calls have not as yet been answered. Also, the lamp representing the circuit to which the attendant is connected will be fluttering. Also, other lamps such as for example, the PCA and SCA lamps may also be flashing. In order to reduce the visual complexity of the lamp pattern under such conditions, means is provided in the present circuit for blanking some of the direct access lamps currently in a flashing condition as well as those which are burning steadily to indicate that their calls have already been answered by attendants at other positions.

In the preceding circuit description regarding the call storage feature, the operation of either or both of relays 16–M or 16–L also closes an obvious path to interconnect the flashing battery potential on conductor LF through diode PS to relay P. This causes the relay to operate and release at a rate determined by the flashing frequency of the interrupted potential on conductor LF. The operation and release of make contacts 1 of relay P applies an interrupted battery over conductor PA to the position pilot lamp P on FIG. 12. Thus, relay P operates and releases at a predetermined rate for the entire time that either relay 16–M or 16–L is operated and in turn, flashes the P lamp for the same time and at the same rate.

The opening and closing of make contacts 2 of relay P applies a flashing battery to conductor R which when the CH key of FIG. 12 is operated causes the chimes to sound once for each operation and release of relay 16–P. The opening and closing of make contacts 3 of relay P connects ground from conductor B on FIG. 12 when the signal restore key SIG RST is normal to one side of relay 16–BL to operate it. Relay BL operated closes a holding path for itself to ground on conductor AF as described in section 2.19–4. The operation of relay BL opens the path over which the direct access lamps are normally energized by the potentials from their related line circuits over conductors DAL1 and DAL6. Any energized ones of these lamps are now extinguished unless they are in a fluttering condition or are energized over their conductor DAP– on FIG. 16 as described in the following paragraphs. Let it be assumed that it is desired to have the blanking feature activated when the subscriber at station 1 and served by line circuit 11 calls attendant position 1. In this case, the P conductor of line circuit 11 on FIG. 17 is connected to conductor DAP2 on FIG. 16 since line circuit 11 has been stated to have direct access at this position by means of direct access key 2. At this time, once the subscriber at station 1, who is served by local line circuit 11, completes dialing the digits 30, and assuming that there are not at this time three or more PCA type calls waiting at the same position, a path may be traced from conductor LF of the signal circuit, through make contacts 7 of relay 17–P, make contacts 6 of the same relay, break contacts 5 of relay N, the P wiper and P conductor on FIG. 17, from there to conductor DAP2 on FIG. 16, through diode P2, to one side of the winding of relay 16–P. This relay now operates and releases in accordance with the flashing potential applied thereto by conductor LF. As already described, the operation of relay P also causes BL to operate and lock for the duration of the flashing interval. Relay BL operated opens the normal paths over which the direct access lamps are illuminated by their associated line circuits. However, at this time the flashing potential on conductor DAP2 is extended through diode B2 and diode DC2 to conductor LL2 and the direct access lamp 2 on FIG. 10. This path maintains direct access lamp 2 illuminated at a flashing rate even though relay 16–BL is operated. However, the lamps for all other direct access lines, except any whose lamp is in a flutter condition, are extinguished since no battery potential is applied to their associated DAP– lead on FIG. 16 at this time.

In order to illustrate another feature of the invention, let it be assumed that at the time line circuit 11 calls position 1 that position 1 is already conversing over another line circuit on a direct access basis and that direct access key 6 has been operated in order to effect such interconnection. At this time, a path may be traced from conductor DAL6 to conductor CL6 extended from FIG. 16 to FIG. 9. Recalling that relay 9–K6 would now be locked operated since direct access key K6 was initially operated to effect the connection, conductor CL6 may now be extended through make contacts 9 of relay 9–K6, over conductor LC6 extending from FIG. 9 back down to FIG. 16, to break contacts 2 of relay 16–BL. Thus, it is seen that the operation of a key relay provides a shunt across its associated pair of break contacts on relay 16–BL so that the fluttering lamp representing the circuit to which an attendant is currently in communication will not be extinguished by the blanking feature.

2.06. *Primary common answering—call received at position 1 from station 1 is answered by operation of the PCA key*

This section describes the operation of the circuit when the attendant at position 1 answers the call (described in section 2.05) from station 1 over local line circuit 11 by means of the primary common answering circuit. Relays 11–TJ and 11–E are operated in the same manner as described before, assuming the attendant's headset is plugged into jacks A and B.

2.06–1. OPERATION OF PCA KEY AND KEY RELAY CIRCUIT

One or more of the PCA lamps in FIG. 12 are operated at this time since it has been assumed that the subscriber at station 1 dialed the digits 30 to interconnect himself with the attendant at position 1. Therefore, the attendant at this position operates his PCA key on FIG. 10 in order to interconnect himself with station 1 by means of his primary common answering facilities.

The subsequently described circuit operations are similar in many respects to those already described for the direct access call from position 1 to station 1. Therefore in this section the specific circuit paths are enumerated only for those relays whose operations were not previously covered in detail. Also, for those relays which operate over similar or analogous paths for the answering of calls by both the PCA and the direct access circuits, it will merely be stated in this section that the relays operate. Reference is made to the preceding section which describes a direct access call for the specific paths over which these relays operate.

The attendant at position 1 operates his PCA key in order to answer an incoming call by means of the PCA facilities. Ground on conductor KF is extended through make contacts 2 of the PCA key to conductor KO to operate relay 8–KO. Next, relay 8–KN operates in the event that all key relays on FIG. 9 are in a released condition. Next, the closure of make contacts 2 of relay KN and the closure of make contacts 1 of PCA key on FIG. 10 completes a path to operate relay 9–PCA. Relay PCA operated completes a holding path for itself over its make contacts 2, through break contacts 1 of relay 9–IA, through break contacts 3 of relay 8–CP, to ground on conductor LK extending to FIG. 11. Make contacts 3 of relay PCA operated interconnect conductors LP and AL in preparation for energizing the lamp associated with the PCA key on FIG. 10.

The PCA key is of the nonlocking type and therefore is only momentarily depressed by the attendant. The release of this key removes the ground from conductor KO to release relay 8–KO. The release of relay 8–KO, opens the holding path of relay 8–KN to release it. The closure of break contacts 4 of relay 8–KO provide a path to maintain relay 9–PCA operated when make contacts 2 of relay KN open upon release of the relay KN. The closure of break contacts 1 of relay 8–KO closes a path through make contacts 5 of relay 9–PCA to operate relay 8–ST. The operation of relay ST applies a ground to conductors STB and STA to operate relays 4–PA1 and 4–PB1.

2.06–2. GATE CIRCUIT AND CONTROLLER OPERATION

In order to simplify the circuit description, it will once again be assumed that the call now being described is served by the A side of the controller shown in FIGS. 5 and 6. The operation of relay 4–PA1 closes its make contacts 8 which complete a path to operate relay 5–CA. The closure of make contacts 3 of this relay closes a path to operate relay 5–FA. The closure of make contacts 10 of relay 5–FA extends a ground to operate relay 5–GA as well as 4–GTA. The closure of make contacts 2 of relay 5–FA extends a ground to operate relay 6–AC. Relay 6–AC operated closes its make contacts 1 to provide a locking path for itself to ground on break contacts 4 of relay 7–FB normal.

2.06–3. OPERATION OF SELECT MAGNET

The operation of relay 5–GA closes its make contacts 2 which extend a path through make contacts 11 of relay 5–FA operated to conductor CPA extending to FIG. 4, through contacts on relay 4–PA1, to the CP lead extending to FIG. 8 to operate relay 8–CP. As before, a portion of the operating circuit for relay 8–CP comprises break contacts on the hold magnets of the crossbar switches associated with attendant position 1 in order to insure that all such hold magnets have released from the previous call before relay 8–CP may be reoperated.

The closure of make contacts 18 of relay CP extends a ground through break contacts 8 of relay 8–CT to operate relay 8–SD. The operation of relay CP also disconnects ground from the J lead to the attendant position circuit to disable the hold key, the special function keys, and the line keys to prevent interference if one of them should be operated during the time when the position is being served by the controller. Make contacts 4 of relay CP operated replace the LK lead ground which is removed by the opening of the J lead ground to maintain the locking circuit for relay 9–PCA. Make contacts 13 of relay 8–CP operated apply a ground to conductor AB which, in turn, operates relay 13–AB to open the receive simplex in the position circuit at the time that the transmission circuits are being closed. The operation of make contacts 14 of relay 8–CP extends a ground from break contacts 4 of relay CT, through make contacts 14 of relay 9–PCA, to the PK lead extending from FIG. 9 to FIG. 8, and from there to the PK lead on FIG. 17 which is connected to the PK terminal of the step-by-step bank for position 30 and additionally, is multipled to the corresponding bank position in all of line circuits 12–20.

The wipers of the step-by-step switch included as a part of local line circuit 11 are now on position 30 of the step-by-step bank and therefore, the ground on conductor PK is extended through make contacts 5 of relay 17–P, through break contacts 4 of relay N, through break contacts 3 of relay K, to the winding of relay F1 to operate it. The operation of this relay closes its make contacts 1 which extend a ground over conductor SM to operate the select magnet 3–LS90 associated with local line circuit 11. The operation of this select magnet closes its make contacts to apply a ground to the winding of relay 3–SO to operate it.

The closure of make contacts 2 of relay 17–F1 closes an obvious path to operate relay J. The closure of make contacts 1 of relay J completes a holding path for the relay to ground through break contacts 3 of relay 17–H and make contacts 4 of relay 17–B. Make contacts 2 of relay 17–J operated transfer the holding path of relay 17–P to ground on make contacts 3 of relay 17–F1. This places the holding of relay 17–P under control of a portion of the same circuit holding the select magnet operated to insure that the select magnet operating circuit is maintained through the line circuit until ground is removed from conductor PK on FIG. 9.

2.06–4. OPERATION OF HOLD MAGNETS

The operation of relay 3–SO as select magnet LS–90 operates applies ground to conductors OS1 and OS2 extending to FIG. 5 to operate relay 5–HA. The closure of make contacts 2 of this relay at this time extends a ground to conductor HMA leading to FIG. 4 where this ground is further extended through make contacts 7 of relay 4–PA1 operated to conductor HM, extending to FIG. 8, through make contacts 6 of relay 8–CP, to conductor HM1 extending to FIG. 3, through make contacts 1 of relay 3–SO operated to operate the hold magnet 3–LH1 associated with attendant position 1. With the closure of the crosspoints common to select magnet LS90 and hold magnet LH1, the six leads, TR, TT, RT, RR, A and S, of line circuit 11 are now connected through to the correspondingly designated leads on the contacts of relay 8–CT.

The hold magnet is now maintained operated by ground on make contacts 16 of relay 8–CP.

2.06–5. SEIZURE OF LINE CIRCUIT AND RELEASE OF CONTROLLER

The operation of hold magnet 3–LH1 applies a ground to conductor HO extending to FIG. 8 to operate relay 8–CT. Make contacts 10–15 of relay 8–CT extend the transmission leads from the line circuit 11 through to the transmission leads extending to attendant position 1. The opening of break contacts 4 of relay CT removes ground from conductor PK extending to line circuit 11 and thereby causes relay 17–F1 to release. The operation of make contacts 2 of relay CT apply ground to conductor HM.

Relay 17–F1 released opens its make contacts 1 thereby removing ground from conductor SM and causing select magnet 3LS90 to release. The release of relay 17–F1 also opens its make contacts 3 to release relay 17–P. This expedient serves to release relay 17–P earlier than if it were held operated until relay 17–H operates at the time the line is cut through to the attendant position circuit as will be shortly described. This early release of relay 17–P opens all wiper circuits for this line circuit to remove ground from lead L1 in time to permit the regression of other lines waiting to reach the same attendant position. With ground removed from conductor L1, the PCA lamps 1, 2, and 3 on FIG. 12 regress in the manner already described in the event that more than one line circuit is attempting to reach the same position. The heretofore second line in the queue now becomes the first waiting line and each additional line moves up one step.

If no other line circuits are waiting to reach this attendant position, the removal of ground from conductor L1 extinguishes the PCA lamp 1 at this time.

Relay 17–P released opens its make contacts 1 to remove ground from the ST lead extending to the signal circuit thereby de-energizing it in the event that it is not additionally energized by any other circuit at this time. The opening of make contacts 10 of relay P disconnects ringing tone from the calling line.

The release of select magnet LS90 releases relay 3–SO. The release of relay SO removes ground from conductors OS1 and OS2 to release relay 5–HA. The release of relay 5–HA operates relay 5–RA. The operation of this latter relay provides another locking path for relay 5–GA and 4–GTA. Relay 5–RA operated also opens the holding path for relay 8–CP to release it. Relay 5–RA operated also releases relay 5–FA. The release of this relay releases relay 4–PA1. The release of relay 4–PA1 in turn effects the release of relay 5–RA. It also releases relay 5–CA in the event that no other PA– relay on FIG. 4 is operated at this time. The release of relays 5–CA and 5–RA releases relays 5–GA and 4–GTA. If other attendant positions are holding their various 4PA– relays operated, relays CA, GA, and GTA remain operated until all positions have been served.

The release of relay 8–CP reconnects ground to the J lead and closes the receive simplex in the attendant position. At this time, ground on the A lead from the attendant position operates relay 17–D. The operation of this relay closes through the calling tip and ring to the A transformer on FIG. 17 which provides a two-to-four wire conversion. The closure of make contacts 5 of relay 17–D operates relay H. Relay H operated: locks under control of relay B, opens the operating circuit for relay P, closes a locking path through relay F, releases relay J, provides another source of battery for the L lead so that both the line and busy lamps will remain lighted until both the attendant and the calling station have disconnected, and by means of its make contacts 5 applies a ground to the receive simplex. This ground, in turn, operates relay 13–A. The locking of the 17–H relay to the operated B relay prevents the P relay from reoperating if the attendant disconnects first. The operation of the P relay would cause the line and busy lamps to flash and it would close through the PK lead again. The locking path for the F relay prevents the calling station from being rung if it disconnects while the attendant is still connected to the line circuit. At the end of the conversation when the calling station disconnects, the release of the 17–A and 17–B relays closes a circuit from ground at break contact 1 of relay 17–A, through break contact 1 of relay 17–B, through break contacts 8 of relay P, through make contacts 1 of the vertical off-normal springs, to one side of the winding of the release magnet RLS. The other side of the winding of this magnet is connected to battery and it therefore operates at this time to restore the step-by-step switch shaft to its normal position. The vertical off-normal springs then release and deenergize the release magnet.

2.07. *Direct access answering by position 1 of a call received from station 1*

The circuit operations described in this section assume that the call originated by the subscriber at station 1, as he dialed the digits 30 to reach attendant position 1 (as described in section 2.05), is answered by the attendant by means of his direct access facilities. In this case the attendant operates his direct access key 2 on FIG. 10 to interconnect himself with local line circuit 11 in precisely the same manner as described hereinbefore in connection with the call from attendant position 1 to station 1, which was assumed to be in an idle condition. The operation of key K2 on FIG. 10 causes the circuits shown on FIGS. 8, 9, and 5–7 to operate in the same manner as before described to interconnect the attendant position with the line circuit 11. The operation of relay 8–CT causes ground on the A lead from the attendant position to be applied to FIG. 17 to operate relay D. The operation of relay D operates relay H and closes the transmission path from the calling station to the attendant position. The operation of relay H also applies a ground to the receive simplex to operate relay 13–A in the attendant position. The operation of relay H also closes a locking path for relay F and releases relay P. The release of relay P opens the L1, L2 and L3 leads to cause a regression of the primary common answering lamps. The release of relay P also transfers the L lead from flashing to a steady battery.

The connection is released by the attendant in much the same manner as that already described. The attendant may effect a release of the connection by operating either the release key, the hold key, or any of the line keys. The release of any of these keys removes ground from conductor AV in the attendant position which, in turn, removes ground from conductor A in the line circuit. This causes the release on FIG. 17 of relays D, H (and F if the calling station has disconnected first). (See section 2.06–6 for release by station). The release of these relays releases relay 13–A. The holding path for relay 9–K2 is opened at this time and it releases. Next, relays ST, SD and CT release on FIG. 8 and, in turn, release the hold magnet thereby restoring the entire circuit to normal.

2.08. *Indirect access*

This portion of the description describes the operation of the indirect access facilities. These facilities are used when an attendant desires to interconnect himself with either another attendant position or a line circuit with which he does no have direct access. The calling attendant effects such a connection by first operating his indirect access key IA and by then dialing the code number assigned to the called attendant position or line circuit with which he desires to converse.

Many of the relays which operate in completing the call described in this section are the same ones which operated in serving the calls described in one or more of the preceding sections. Since the paths over which these relays operate were fully described in the preceding sections, such details are not repeated herein and instead the statement is made that each such relay operates or releases without specifying the circuit details. Therefore only the circuit detail for those relays whose operation has not been heretofore described are set forth in this section.

Relays 11–E and 11–TJ are operated providing the attendant's headset plugs are inserted into jacks A and B.

2.08–1. OPERATION OF INDIRECT ACCESS (IA) KEY AND KEY RELAY CIRCUIT

The operation of the indirect access key IA on FIG. 10 applies a ground over conductor KO to operate relay 8–KO. Relay 8–KN next operates provided that all the relays on FIG. 9 are released. The operation of the indirect access key also applies a ground to conductor KA to operate relay 9–IA which locks to ground on break contacts 3 of relay 8–CP.

The IA key is of the nonlocking type and therefore is only momentarily depressed by the attendant. The release of this key removes ground from conductor KO to release relay 8–KO. The release of this relay, in turn, releases relay 8–KN. The release of relay KO extends resistance battery over its break contacts 1, through make contacts 6 of relay 9–IA to the winding of relay 8–ST to operate it.

Figure 19:
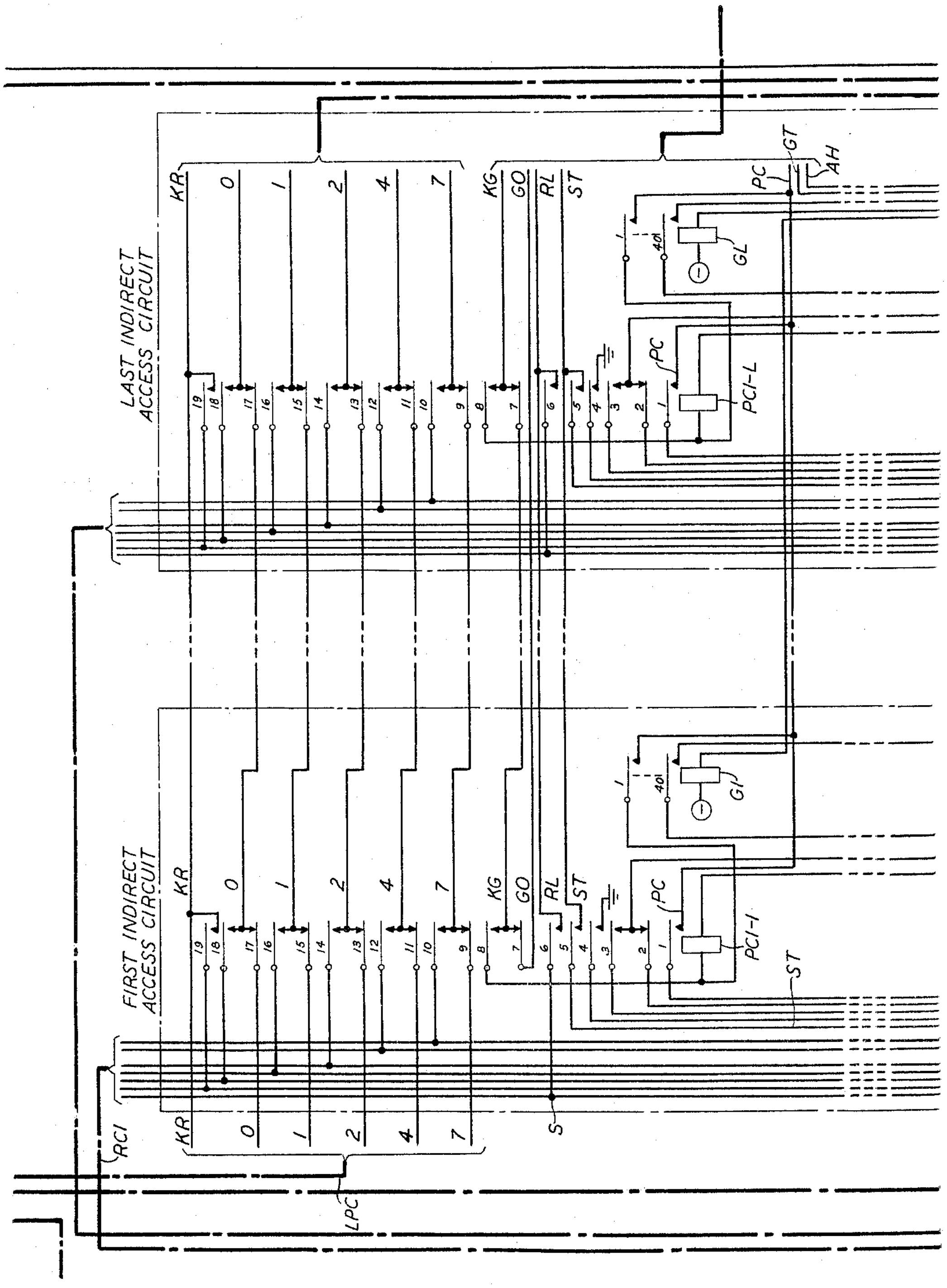
Figure 20:
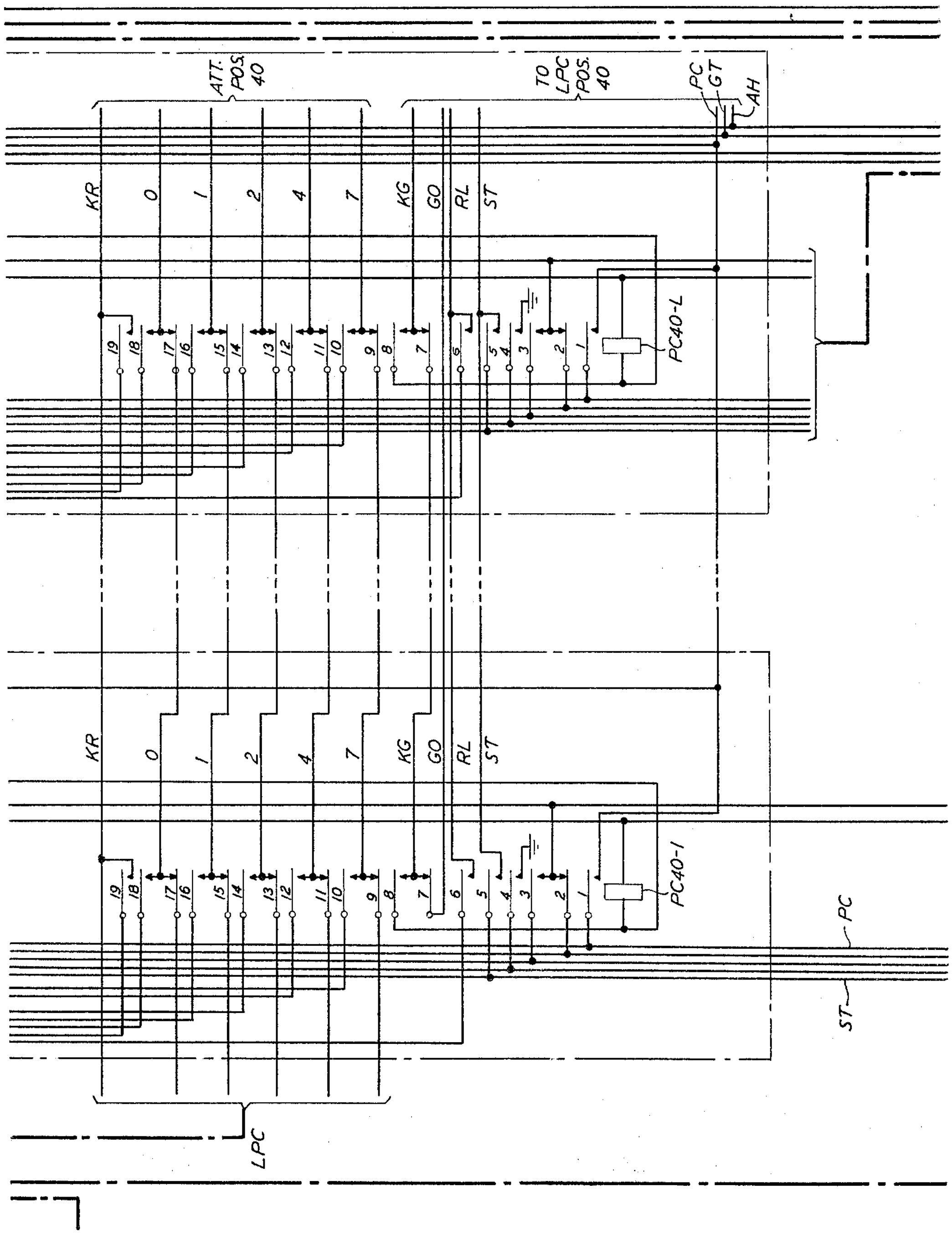
Figure 21:
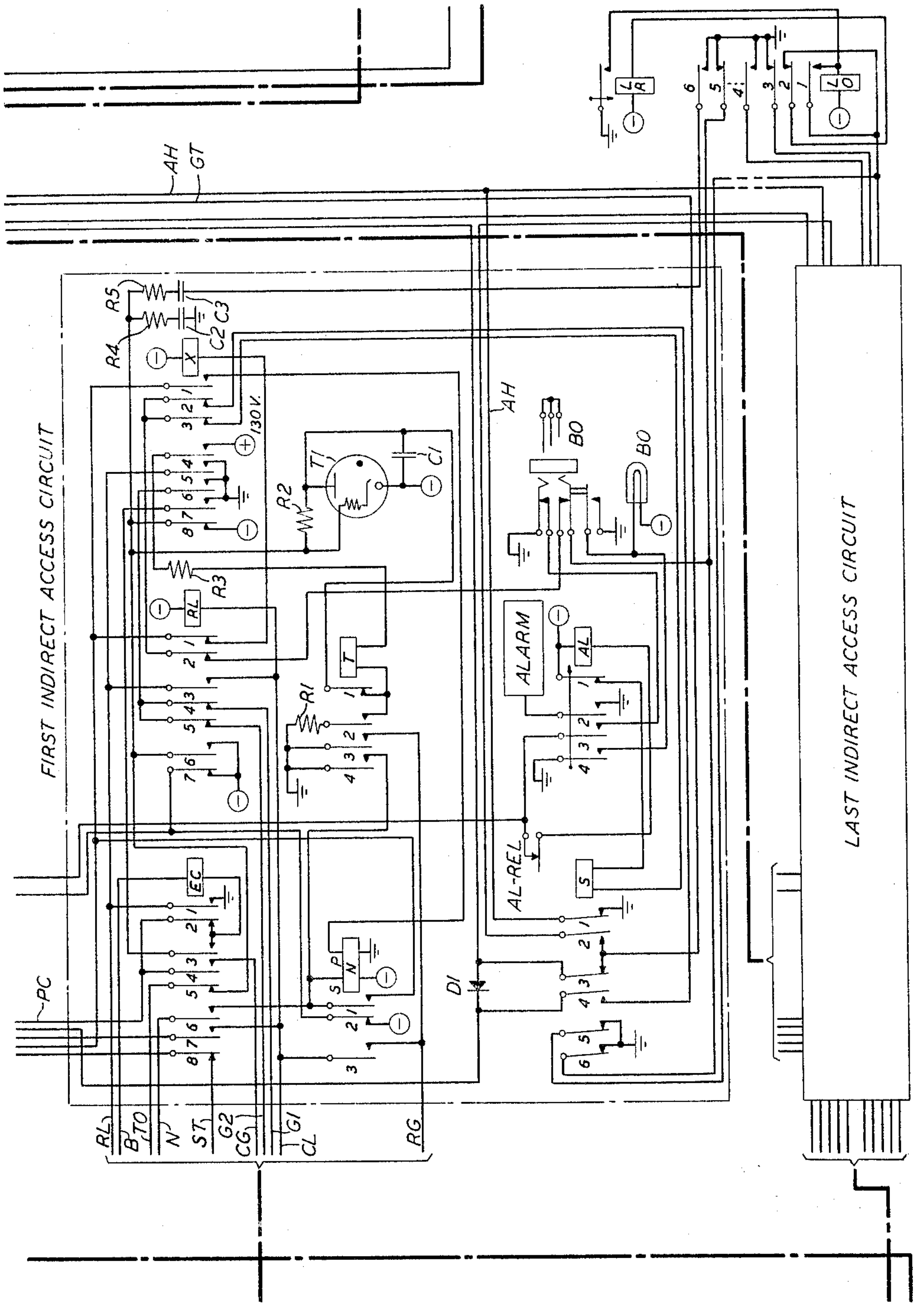

At this time, the following path is closed to operate relays PA1 and PB1 on FIG. 4: ground on make contacts 1 of relay 21–S, conductor AH extending from FIG. 21 and over FIGS. 20, 19, 8 and 9 to varistor V1 on FIG. 9, make contacts 12 of relay 9–IA, make contacts 3 and 4 of relay 8–ST, break contacts 3 and 2 of 9–SD, to conductors STB and STA respectively, to FIG. 4 to operate relays PA1 and PB2 as described in previous sections.

2.08–2. INDIRECT ACCESS CIRCUIT

It is believed that a brief general description of the indirect access circuits would be advantageous at this point before proceeding with a detailed description of the present call.

FIGS. 19–21 disclose two indirect access circuits, one in complete detail and the second one only in partial detail. The two indirect access circuits on these figures are designated First Indirect Access Circuit and Last Indirect Access Circuit, respectively. It may be seen from a study of these figures that each indirect access circuit comprises a PC– relay for each attendant position. Thus, since there are assumed to be 40 attendant positions in the presently disclosed embodiment, each such indirect access circuit on these figures comprises 40 PC– relays. Accordingly, the PC– relay associated with the first attendant position is designated PC1 while the PC– relay associated with the 40th position is designated PC40 The PC– relays on FIGS. 19 and 20 are depicted in the form of a grid with each vertical column of these relays being part of a different indirect access circuit and with each column containing one PC– relay per attendant position. Each horizontal row of the grid is associated with an individual attendant position and contains one PC– relay for each indirect access circuit.

The G– relays on FIG. 19 together with the relays on FIG. 21 comprise the control and gate circuit for each of the two indirect access circuits. Accordingly, each indirect access circuit comprises a vertical column of PC– relays together with a control and gate circuit comprising a G– relay on FIG. 19 and the circuits on FIG. 21.

Figure 2:
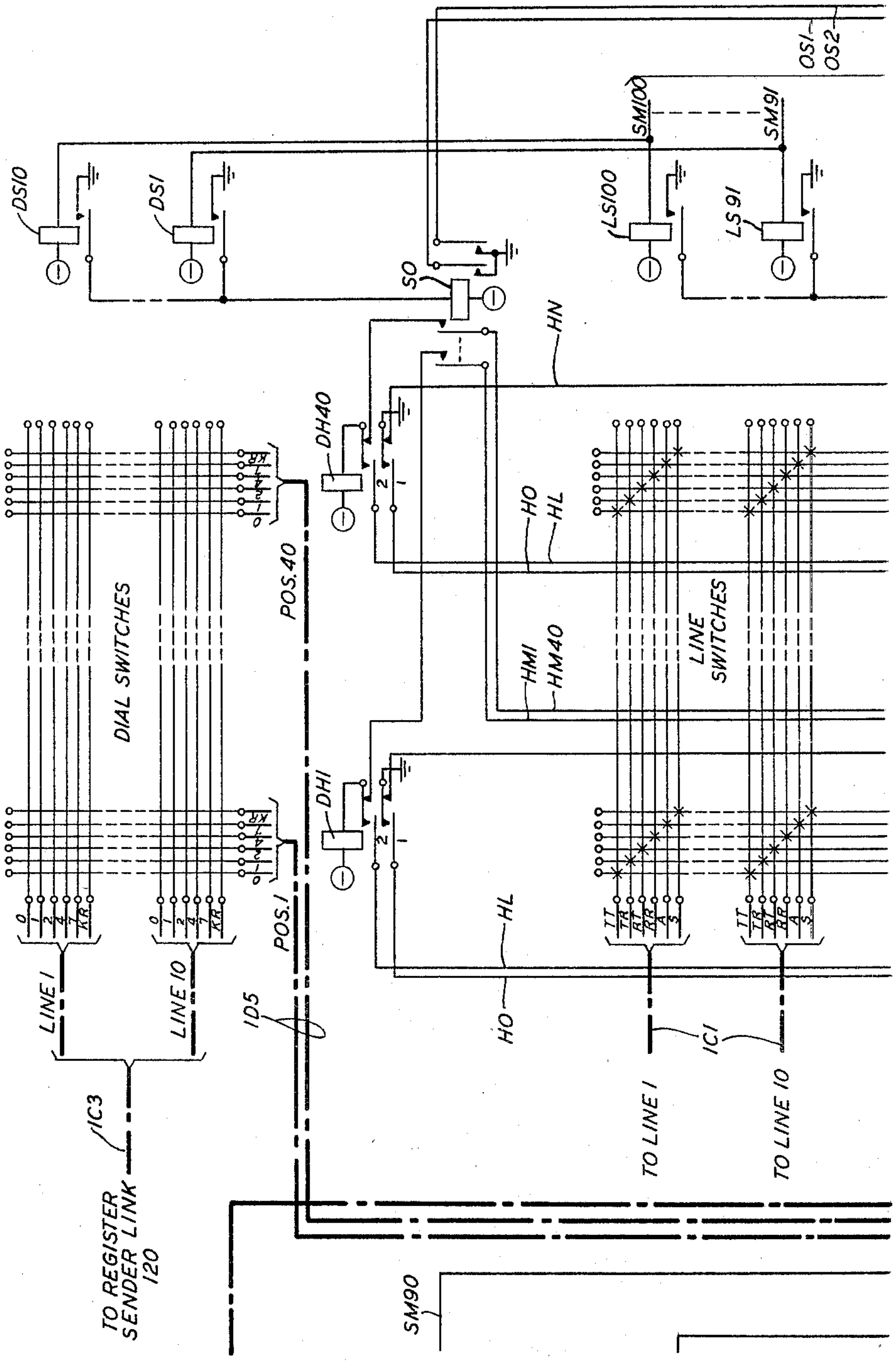

The five dial code leads 0, 1, 2, 4 and 7 from each attendant pushbutton dial set are chained through contacts on each PC– relay associated with an attendant position and are then normally connected to the particular column of the dial crossbar switch on FIG. 2 with which the attendant position is associated. On a direct access call none of the PC– relays associated with an attendant position making the call are operated and therefore, the dialing leads are fed directly to the crossbar switch of FIG. 2. On an indirect access code, however, the PC– relay is operated which is associated with the attendant position making the call and also with the indirect access circuit serving the call. In so doing it steers the dial leads to the associated register connector circuit where dialing information is registered and translated. Ground is then connected through the register connector circuit to the winding of the desired select magnet on FIGS. 2 and 3.

Only the gate circuit in a single one of the indirect access circuits can operate at a time and, therefore, only one indirect access circuit can accept a request for indirect access service at a time. The controller circuit shown on FIGS. 5–7 can serve only one attendant position at a time and therefore, only one PC conductor out of the plurality of such conductors shown on FIGS. 19 and 20 may be grounded at any one time. Since only one PC lead can be grounded at a time, only one position can seize an indirect access circuit at a time. The gate relay G– releases as soon as the PC– relay for its indirect access circuit operates and it cannot reoperate until its PC– relay releases. Therefore there can never be more than one operated PC– relay in any indirect access circuit. This precludes the possibility of the simultaneous seizure of the same indirect access circuit by two or more attendant positions.

When the connection between the attendant position and the called line is completed, the indirect access circuit and the associated register connector circuit are released. The common locking circuit works in conjunction with the individual control circuits to provide sequential operation of the indirect access circuit.

2.08—2.1. Steering circuit description

Each control circuit has a steering circuit comprising the S relay shown on FIG. 21. This relay has two main functions: (1) when the relay is in the operated position it signifies to the key relay circuit, by applying ground to the AH conductor, that the indirect access circuit is idle and is prepared to accept a request for service, (2) when the relay is released, it steers requests for service to the succeeding indirect access circuit. As each indirect access circuit is first seized, its S relay is released. When all indirect access circuits are busy, all corresponding S relays will be released and ground will be removed from the AH conductor thereby informing the LPC circuit that there are no idle indirect access circuits. No further indirect access calls can be made until one or more of the S relays reoperate. The winding of the S relay is connected to ground through normally closed contacts of the X and RL relays, the busy-out (BO) jack and the LO relay. Therefore, when the power supply is initially applied to the circuit, the S relay operates and locks itself around the LO relay contact. The S relay remains operated until its indirect access circuit is seized at which time it releases and remains unoperated until the LO relay in the locking circuit releases.

2.08–2.2. Locking Circuit Description

The locking circuit comprises relays LO and LR and is common to all indirect access circuits. The LR relay is very slow in operating to insure that all unoperated S relays in the various indirect access circuits which are not busy have sufficient time to operate before the lock-out circuit is reset. The LR relay operates through a make contact on the operated S relay of any associated indirect access circuit and, in so doing, it applies ground to the winding of the LO relay to operate it. Relay LO operated (a) locks itself to ground through any operated S relay, (b) releases the LR relay, and (c) opens the operate path for all associated S relays and (d) connects ground to the time-out circuit.

A request for indirect access service causes ground to be applied to the GT lead from the key relay circuit. This ground is applied to the winding of the G-relay of the indirect access circuit having the first operated S relay. The operation of the G– relay permits its associated indirect access circuit to be seized after which the S relay for the same circuit is released. The S relay cannot reoperate until the LO relay releases and closes the operate path to the S relays in all idle indirect access circuits. The released S relay steers the next request for indirect access service to the following indirect access circuit which is then seized. It, in turn, releases its S relay to steer succeeding indirect calls to succeeding indirect access circuits. In this way, each succeeding indirect access circuit serves a call before any preceding circuit can serve a second call. When all indirect access circuits have been seized and have served a call, all S relays will be released thereby permitting the LO relay to release. The release of this relay then closes ground to the S relay in each indirect access circuit which is not still busy at this time. The operated S relay resets the lock-out circuit and the next request for service then operates the G relay in the indirect access circuit associated with the first reoperated S relay. This expedient insures reasonably equitable usage of all indirect access circuits.

2.08–2.3. Operation of indirect access circuit

Once again it will be assumed that the A side of the controller shown on FIGS. 5–7 serves the present call. Next, relays 5–CA, 5–FA, 6–AC, 5–GA and 4–GTA operate as described in connection with previous calls. The operation of these relays in turn operates relays 8–CP and 8–SD. The following path is now closed to operate relay 19–G: ground on make contacts 4 of relay 9–IA, conductor KG extending from FIG. 9 to FIG. 19, break contacts 7 of all the PC– relays on FIG. 19, conductor GO extending from FIG. 19 to FIG. 8, make contacts 5 of relay 8–CP, conductor GT extending from FIG. 8 to FIG. 19, make contacts 3 of relay 21–S to the winding of relay 19–G which now operates from this ground since the other side of its winding is connected to battery.

The operation of the G– relay in an indirect access circuit, such as relay 19–G1 in the first indirect access circuit for example, connects the winding of each PC– relay in its associated access circuit to the PC conductor from the IA relay in each respective key relay circuit for the associated attendant positions. However, since only the key relay circuit of FIGS. 8 and 9 for position 1 has both its IA and CP relays now operated and only the PC lead in this key relay circuit is connected to ground, only the PC– relay associated with this attendant position can now operate. Thus, the following path is now closed to operate relay 19–PC1: Ground on break contacts 1 of relay 8–CT, make contacts 11 of relay 8–CP, make contacts 8 of relay 9–IA, conductor PC extending from FIG. 9 to FIG. 19, make contacts 1 of relay G1 to one side of the winding of relay PC1, through the winding of this relay to battery on break contacts 7 of relay 21–RL as well as to battery on break contacts 2 of relay 21–N. Relay 19–PC1 operated closes its make contacts 8 to complete a holding path for itself through break contacts 7 of all other PC relays on FIG. 19, to ground on conductor KG as supplied thereto by make contacts 4 of relay 9–IA. The operation of relay 19–PC1 also opens its break contacts 7 to remove ground from conductor GO and thereby open the operating path of relay 19–G1 to release it. The closure of make contacts 4 of relay 19–PC1 extends a ground through break contacts 1 of relay 21–RL to operate relay X.

The operation of relay 19–PC1 also closes its make contacts which complete a path to interconnect the dialing leads KR, 0, 1, 2, 4 and 7 from attendant position 1 to the similarly designated conductors extending over cable RC1 to the register connector circuit associated with the indirect access circuit No. 1. The aforementioned dialing leads extend to the attendant position 1 from the right-hand side of FIG. 19 while these same leads extend to the associated register connector from the upper left-hand corner of FIG. 19. It may be seen that the closure of make contacts 10, 12, 14, 16, 18 and 19 of relay 19–PC1 interconnects these conductors with the associated register connector circuit while the opening of break contacts 9, 11, 13, 15 and 17 of the same relay disconnects the same conductors, excluding conductor KR, from the dial switches of FIG. 2. The closure of make contacts 6 of relay 19–PC1 interconnects the S lead extending to the associated register connector with conductor RL extending to FIG. 9. The closure of make contacts 5 of relay 19–PC1 closes the ST lead from FIGS. 8 and 9 to FIG. 21.

Relay 21–X operated opens its break contacts 3 to release relay 21–S which is normally operated. Relay 21–X operated also closes its make contacts 6 to extend a ground through break contacts 4 and 5 respectively of relay 21–RL, to conductors G1 and G2 respectively extending to the associated register connector. A path is now closed from ground on the S lead, as supplied thereto by the associated register connector relay 23–ST at contacts 4 for the first indirect access circuit, through make contacts 6 of relay 19–PC1–1, conductor RL extending from FIG. 19 to FIG. 9, make contacts 10 of relay 9–IA, break contacts 5 of relay 8–CT, diode D1, conductor SC extending from FIG. 8 to FIG. 3, break contacts 2 of hold magnet LH1 to one side of the winding of the hold magnet. The hold magnet now operates since the other side of the winding is connected to battery. A path is now closed to operate relay 8–CT from ground on break contacts 1 of hold magnet 2–DH1, make contacts 1 of hold magnet 3–LH1, conductor HO extending from FIG. 3 to FIG. 8, make contacts 6 of both relays ST and SD, to the winding of relay CT which now operates by virtue of the battery on the other side of its winding. Make contacts 2 of relay CT now close and apply a ground to conductor HM which is extended through contacts of operated relay 4–PA1 to conductor HMA extending to FIG. 5, and through break contacts 1 of relay HA to operate relay RA.

It should be noted in the operation described so far that the hold magnet does not close any crosspoints since there is no select magnet operated at the time the hold magnet is operated.

The opening of break contacts 3 of relay 5–RA removes battery from conductor CPA thereby opening the operating path of relay 8–CP to effect its release. Relay 5–RA operated also causes relay 5–FA to release. Relay FA released removes ground from conductor LPA to cause relay 4–PA1 to release. Relay 5–FA released also causes relay 4–GTA to release provided no other PA– relays on FIG. 4 are operated at this time.

2.08–3. OPERATION OF REGISTER CONNECTOR

The operation of relay 19–PC1–1 interconnects the output conductors of the attendant's key dialer on FIG. 12 with the register connector circuit shown on FIGS. 22–26. The purpose of this circuit is: to receive the signals representing the successive digits dialed by an attendant which represent the code of the station or attendant with which he desires to be interconnected, to translate these signals from a two-out-of-five to a one-out-of-ten code form, to translate the successive digits dialed into an output indication on a conductor representing the code of the successive digits, and to apply a potential to the selected conductor which is connected at its other end to the select magnet of the called station or atendant position of the dialed code. The applied potential to this conductor operates the select magnet and prepares the circuit for the operation of the hold magnet associated with the calling attendant position.

The circuit is designed to handle two or three digit codes, the digits of which are dialed in sequence. Double registration caused by the simultaneous operation of two or more dial keys causes the ready lamp RL in the key set to flash. When this occurs, operation of the clear key CLR by the attendant releases the register connector. The desired code may then be redialed. The circuit does not required the use of either start or end-of-code keys. The first digit of the dialed code enables the circuit to determine whether the code comprises two or three digits. If the first dialed digit indicates a three-digit code, the circuit waits until all three digits have been dialed before signaling the key relay and controller circuit to make a final connection. If the first digit indicates a two-digit number, the circuit signals the key relay and controller circuit immediately after the second digit is registered and translated. For this reason, it is not possible to use three-digit codes which have the same first digit as those assigned to two-digit codes. For example, if there are any three-digit codes 100–199, two-digit codes 10–19 cannot be used. Similarly, if there are any three-digit codes 200–299, two-digit codes 20–29 cannot be used.

2.08–3.1. Registering

Figure 22:
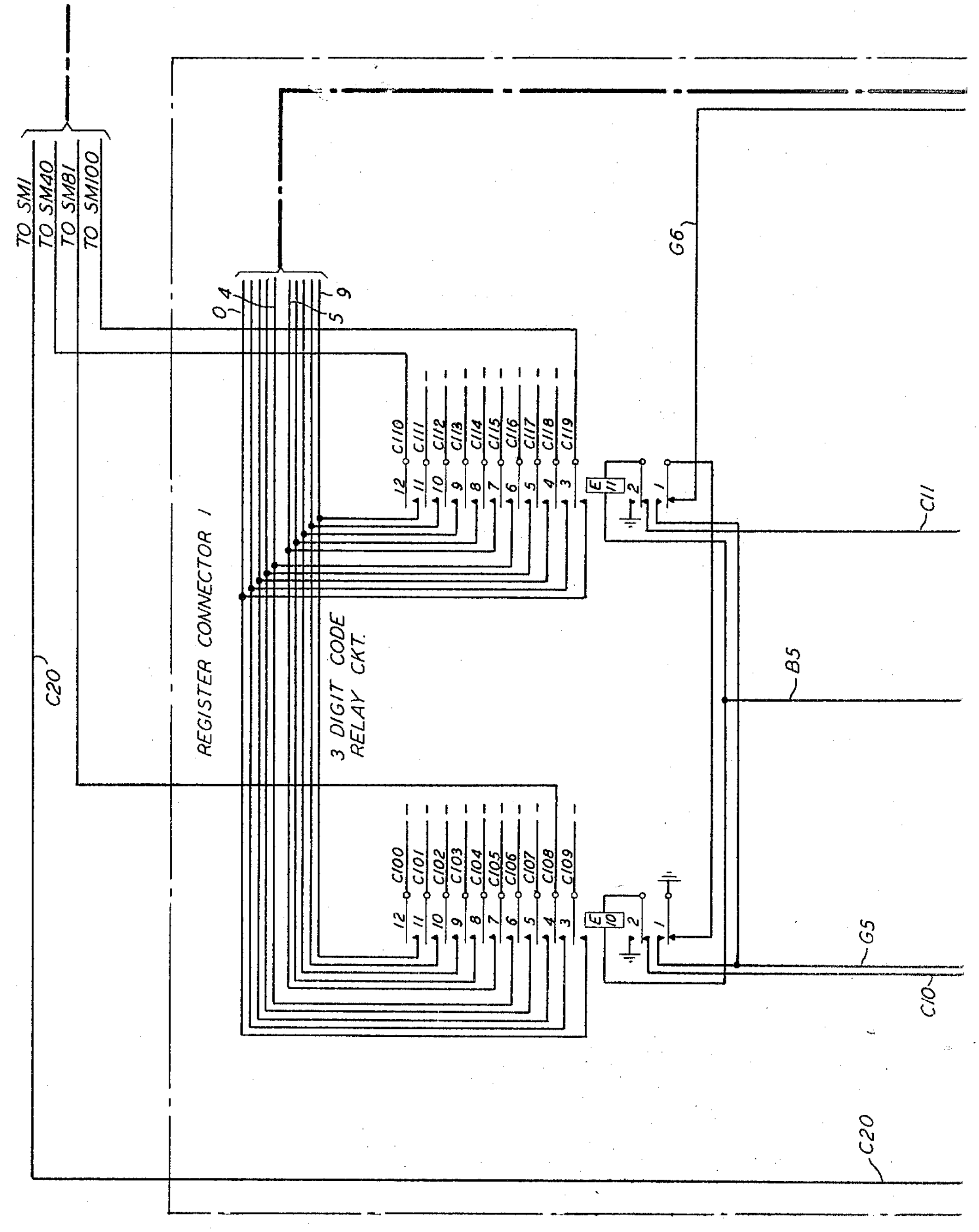
Figure 23:
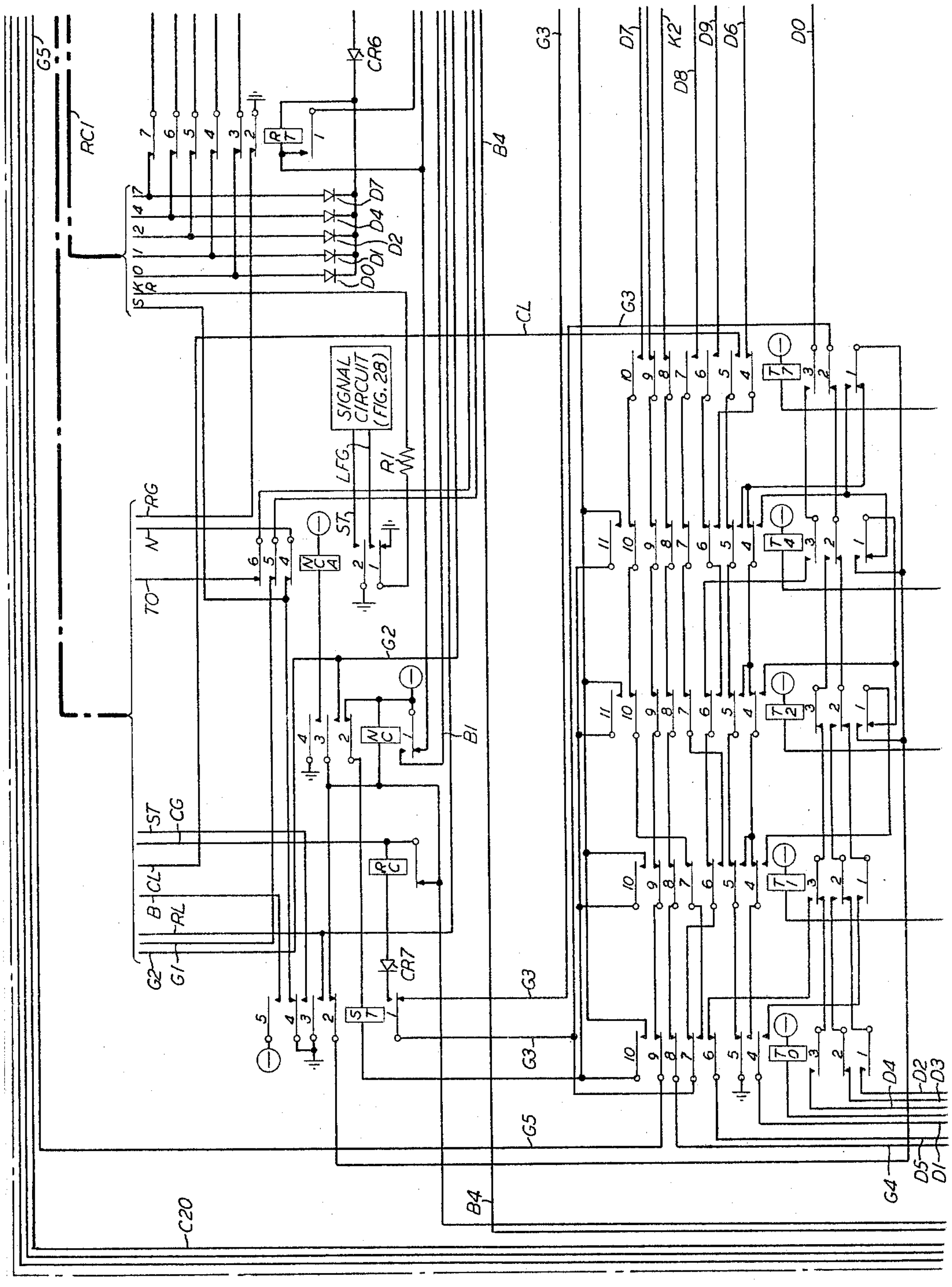
Figure 24:
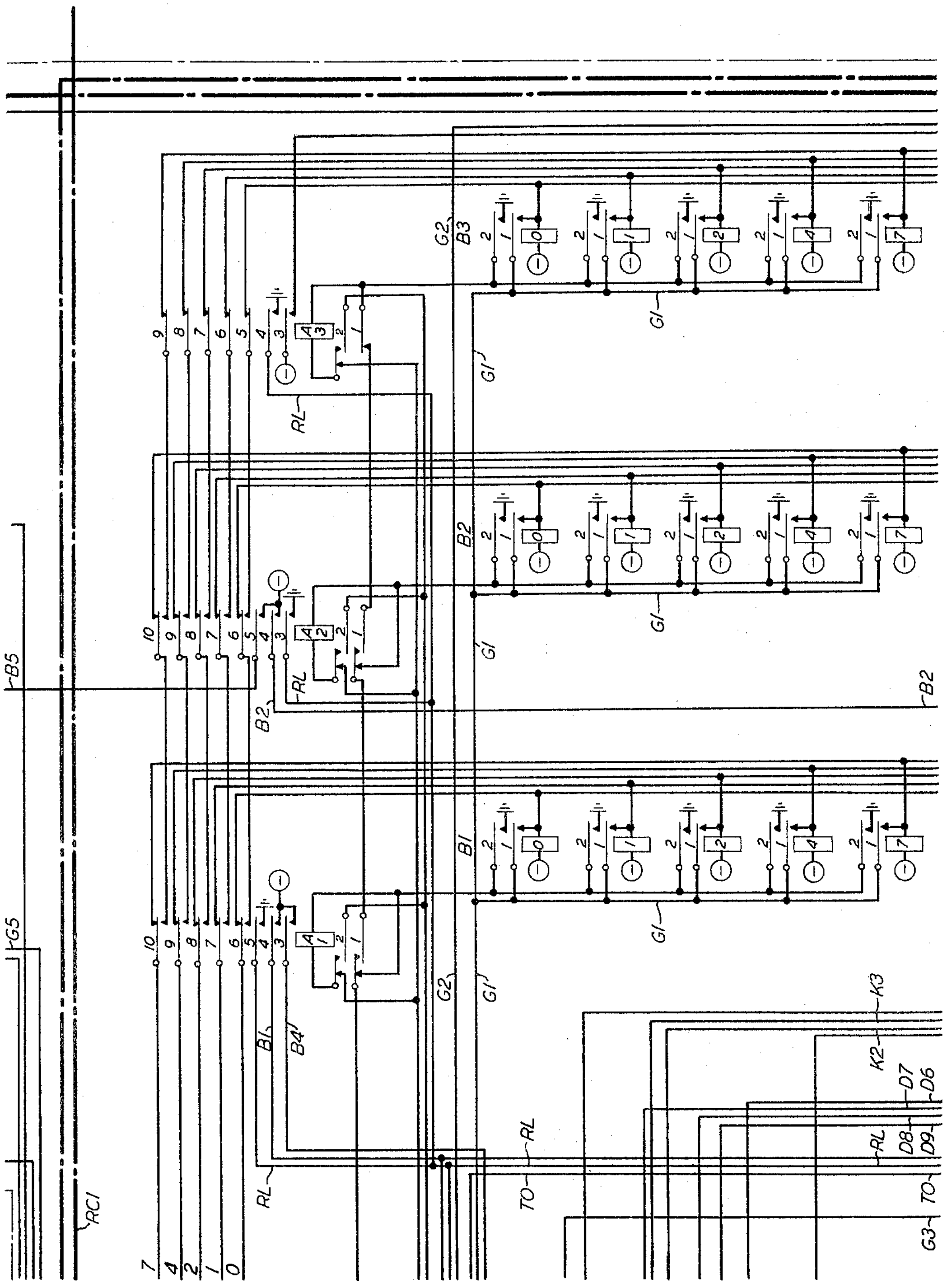

The seizure of this circuit by the first indirect access circuit extends a path from ground on make contacts 6 of relay 21–X, through break contacts 4 and 5 of relay RL, over conductors G1 and G2 extending from FIG. 21 to FIG. 23. Grounds on these conductors are used as operating and holding grounds by various portions of the register connector circuit as described hereinafter. Ground is applied to the KR lead at this time to light the ready lamp in the attendant's pushbutton dial set. The circuit to energize this lamp may be traced as follows: ground on break contacts 1 of relay 23–NCA, resistor R1, conductor KR extending from FIG. 23 to FIG. 19, make contacts 19 of relay 19–PC1, conductor KR extending from FIG. 19 to FIG. 12, through lamp RL, the break contacts of the clear key CLR to battery through resistance R1. Lamp RL is therefore energized at this time.

Information representing the digits dialed by the attendant is received from the pushbutton dial set in the form of ground on two of the five dial code leads. This information is received in the conventional two-out-of-five code form wherein digit 1 is represented by ground on the 0 and 1 leads; digit 2 by ground on the 0 and 2 leads; digit 3 by ground on the 1 and 2 leads; digit 4 by ground on the 0 and 4 leads; digit 5 by ground on the 1 and 4 leads; digit 6 by ground on leads 2 and 4; digit 7 by ground on leads 0 and 7; digit 8 by ground on leads 1 and 7, digit 9 by ground on leads 2 and 7; and digit 0 by ground on leads 4 and 7. Ground on the 7 lead alone represents a clear operation.

The received information is initially stored in its two-out-of-five code form before it is translated. The first received digit is stored in the B1 register on FIG. 24. This register comprises the 5 relays designated 0, 1, 2, 4 and 7. The numerical designation of each of these five relays corresponds with the designation of one of the 5 dial code leads. Each dial code lead is connected to the winding of its corresponding relay in the B1 register through normally closed contacts on the A1 relay on FIG. 24 and the RT relay on FIG. 23.

Referring now to FIG. 12, it may be seen that the depression by the attendant of any of the keys representing the digits 0 through 9 closes a path to extend ground on the J conductor, through the contacts of the selected depressed key, to the code conductors in accordance with the aforementioned two-out-of-five code. Let it be assumed as an example that the attendant dials a 1 as the first digit. The operation of the dial pushbutton 1 applies ground simultaneously to the 0 and 1 dial code leads. Ground is extended over these leads from FIG. 12 to FIG. 19, over break contacts 17 and 15 of relay PC1–L, over make contacts 18 and 16 respectively of relay PC1–1, over conductors 0 and 1 from FIG. 19 to FIG. 23, through break contacts 3 and 4 respectively of relay RT, through break contacts 6 and 7 respectively of relay A1, to the winding of register relays 0 and 1 to operate them. The operated register relays lock over their make contacts 1 to ground on conductor G1. The ground on conductors 0 and 1 is extended through diodes D0 and D1 on FIG. 23 to one side of the winding of relay RT which now operates since the other side of its winding is connected to battery through break contacts 1 of relay 23–NC. Relay RT is slow operating and does not operate until the register relays have fully operated. The operation of relay RT opens its break contacts which open the operating path for the register relays. The RT relay remains operated until the dial pushbutton is released in order to prevent false operation of the relays in the B2 register. The operated register relays 0 and 1 close their make contacts 2 to apply ground to one side of the winding of relay A1. This ground is also extended through break contacts 1 of relay A1 and through diode CR6 to the winding of relay RT to insure that it does not release before relay A1 operates.

The operation of relay RT closes its make contacts 1 which extend a battery through break contacts 2 of relay A1 to its winding to operate it. Relay A1 operated closes a locking path for itself to battery through break contacts 1 of relay 23–NC. Relay A1 operated also opens its break contacts 1 to remove the holding ground through diode CR6 for relay 23–RT thereby permitting it to release when the attendant releases the dial pushbutton 1. Make contacts 4 of relay A1 close at this time and apply battery to conductor B1 extending to the winding of relay 26–C1. This relay now operates since the other side of its winding is connected to ground through break contacts 1 of relay 25–D9, break contact 1 of relay 25–D2 and break contact 1 of relay 25–D1, conductor G6 extending from FIG. 25 to FIG. 22, break contacts 1 of relay 22–E11, break contacts 1 of relay 22–E10 to ground. Make contacts 3 of relay 24–A1 operated apply battery to conductor B4 which extends to one side of the windings of relays 25–D1 through 25–D9. Make contacts 5 of relay 24–A1 closed apply ground to conductor RL extending from FIG. 24 to FIG. 21 where it provides a holding ground for relay 21–RL over its make contacts 3 when it operates. Make contacts 6–10 of relay 24–A1 operated transfer the 5 dial code leads from the windings of the relays of the B1 register to the input of the relays of the B2 register via break contacts 6–10 of relay 24–A2. None of the relays in the B2 register operate at this time even if the attendant has not yet released the pushbutton for the first digit since the relay 23–RT remains operated so long as this pushbutton remains depressed. Relay RT operated disconnects the dial code leads from the input of the various register relays.

When the attendant releases the pushbutton for the first digit, ground is removed from the dial code leads and relay 23–RT releases. The release of this relay connects the five dial code leads to the input of the relays of the B2 register via the contacts 6–10 of relay 24–A1 operated and 24–A2 released. The circuit is now prepared to receive the second digit.

Let it be assumed that the atetndant dials a 0 for the second digit. At this time, ground is applied to the dial code leads 4 and 7 as the key 0 is depressed. The ground on these conductors is extended from the attendant position 1 to FIG. 24 and from there via make contacts 9 and 10 respectively of relay A1 operated, break contacts 9 and 10, respectively of relay A2 normal, to the windings of relays 4 and 7 of the B2 register. These relays now operate and close a holding path over their make contacts 1 for themselves to ground on conductor G1. Relay 23–RT now operates at this time in the same manner that it did for the dialing of the first digit. Make contacts 1 of relay 23–RT operated extend a battery through break contacts 2 of relay 24–A2 to operate it since the other side of its winding is connected to ground on make contacts 2 of the operated relays 4 and 7 of register B2. Relay A2 operated closes a locking path for itself in the same manner as did relay A1, steers the five dial code leads to the input of the B3 register via break contacts on relay A3, connects ground to the RL lead, connects battery via its make contacts 4 and conductor B2 to the winding of relay C2. This relay now operates by virtue of a ground applied to conductor K2 in a manner described hereinafter.

Relay 23–RT releases when the attendant releases the pushbutton for the second digit. The release of this relay connects the five dial code leads to the relays of the B3 register through the contacts of relays 24–A1 and A2 operated and A3 released.

Let it be assumed that the attendant next dials the number 8 for the third digit. This applies ground to code conductors 7 and 1 to operate relays 7 and 1 of the B3 register. Relay 23–RT operates at this time in the same manner that it did for the preceding two digits and causes relay 24–A3 to operate and complete a holding path for itself to battery on break contacts 1 of relay 23–NC. Relay 24–A3 operated connects ground over the RL lead, connects battery over the B3 lead to the winding of the relay 26–C3 which now operates in a manner described hereinafter, and disconnects the five dial code leads from the B3 register to prevent further registration. Relay 23–RT again remains operated so long as the pushbutton remains depressed. The register relays and relays A1, A2 and A3 remain operated until the circuit is released or until the NC and NCA relays on FIG. 23 operate.

2.08–3.2. Translation

The two-out-of-five to one-out-of-ten code translation is performed by relays T0, T1, T2, T4 and T7 on FIG. 23. The input to the translator might be considered to be conductor G3 which is connected to contacts 7 of relay T0 and contacts 2 of relay T7. The other end of this conductor is connected to ground at contacts 1 of relay C1 or contacts 3 of relay C2 during the time the translation function is being performed. The ground on conductor G3 is extended through the contacts of the five translator relays to one of the decimal output leads designated D0 through D9 of the translator in accordance with the particular two-out-of-five relays operated. Thus, ground on conductor G3 is extended to output conductors D1, D0 and D8 in that order as the attendant dials the digits 108.

Ground is provided to code conductor 7 alone when the clear key is depressed by the attendant. This causes the operation of relay T7 only in the translator which, in turn, extends the ground on break contacts 5 of relay T0, through break contacts 5 of relays T1, T2, T4 and make contacts 5 of relay T7 to conductor CL extending to the winding of relay 21–RL to operate it as described hereinafter.

The translator has a checking circuit which applies ground through break contacts 2 of relay 23–ST to the winding of relay NC to operate it when only one or more than two of the translator relays operate for any digit other than the last digit of a two or three digit code. The operation of relay T7 by itself is an exception as already described. The check circuit is disabled during the translation of the last digit of a two or three digit code by the operation of relay 23–ST. The faster operating ST relay prevents the operation of the NC relay by the check circuit and permits the sequence of operation to continue to the point when ground originating in the key relay circuit is applied to the CG lead from the indirect access circuit. Ground on the CG lead operates the NC relay through the break contacts of relay RC. For example, let it be assumed that due to a circuit defect only relay T0 operates in response to the reception of a dialed digit. In this case, ground is extended from make contacts 5 of relay T0, through break contacts 4 of relays T1, T2, T4, break contacts 1 of relay T7, break contacts 2 of relay ST to the winding of relay NC to operate it. Similarly, let it be assumed that due to a circuit defect all of relays T0, T1 and T2 operate in response to the dialing of a digit by the attendant. In this case, ground is extended from make contacts 5 of relay T0, make contacts 4 of relay T1, make contacts 1 of relay T2, through break contacts 2 of relay ST to the winding of relay NC to operate it. Thus, this check circuit insures that two and only two out of the five relays operate in response to the translation of any received digit with the exceptions hereinbefore noted.

Relays 26–C2 and 26–C3 operate during the reception and translation of the second and third received digits respectively. The K2 lead, which is in the operate path of relay C2, and the K3 lead, which is in the operate path of the C3 relay, are chained through contacts of the unoperated translator T– relays. The purpose of this is to prevent relay C2 from operating until after the translation of the first digit is completed and all T– relays are returned to normal and to prevent relay C3 from operating until the translation of the second digit is completed.

2.08–3.3. Connecting

2.08–3.3A. Two digit codes

When the attendant dials a two-digit code, the first digit is registered in the operated two-out-of-five relays comprising the B1 register and the second digit is registered in the relays comprising the B2 register as already described. As soon as the first digit is registered, the 24–A1 relay operates to close its make contacts 4 which apply a battery to conductor B1 extending to one side of the winding of the C1 relay and additionally, closes its make contacts 3 to apply battery to the B4 lead extending to the windings of relays D1 through D9 on FIG. 25. Relay 26–C1 operates at this time since the other side of its winding is connected to ground over conductor K1, break contacts 1 of relays D1 through D9, and conductor G6 extending to FIG. 22, and then through break contacts 1 of relay E10 and E11. Make contacts 14 through 18 of relay C1 are closed at this time and interconnect code conductors 0, 1, 2, 4 and 7 with the correspondingly designated ones of the translator relays T0, T1, T2, T4 and T7.

Let it be assumed that the attendant dials the digits 21 and that therefore the first digit received is a 2. Therefore, the 0 and 2 relays of the B1 register are operated at this time to apply ground by means of their make contacts 1 to code conductors 0 and 2. These grounds are extended over make contacts 18 and 16 respectively of relay C1 to the windings of relay T0 and T2 respectively to operate them. Make contacts 1 of relay 26–C1 are closed at this time to apply ground to conductor G3 extending to FIG. 23, through break contacts 1 of relay ST, through break contacts 2 of relays T7 and T4, make contacts 2 of relay T2, break contacts 2 of relay T1 and make contacts 1 of relay T0 to the D2 conductor. The ground on this conductor is extended through make contacts 11 of relay 26–C1 to the winding of relay 25–D2 which now operates since a battery is applied to the other side of its winding at this time by conductor B4 and make contacts 3 of relay 24–A1.

Relay D2 operated completes a holding path for itself through its make contacts 1, break contacts 1 of relay D1, to ground on conductor G6 as hereinbefore described. Relay D2 operated opens its break contacts 1 which, removes the ground from conductor K1 thereby permitting relay 26–C1 to release. The operation of relay D2 also competes a path to extend the ground on conductor G6 to the G4 lead. This path may be traced as follows: Conductor G6, break contacts 1 of relay D1, make contacts 1 of relay D2, make contacts 2 of relay D2, break contacts 2 of relay D9 to conductor G4. Ground on conductor G4 prepares a locking circuit for relay 26–C2 as described hereinafter. The release of relay 26–C1 disconnects the five code leads from the windings of the translator relays thereby releasing relays 23–T0 and 23–T2.

It has been assumed that the attendant has dialed the two digit code 21. As described, the reception of a 2 as the first digit operates relay 25–D2. The number 1 is now received over the code leads as the second digit. This is manifested by ground on code leads 0 and 1. The code leads at this time are now connected to the windings of the five relays comprising the B2 register and therefore, relays 0 and 1 of this register now operate and lock to ground on conductor G1. The operation of these relays extends a ground to one side of the winding of relay A2 to operate it. This relay operated completes a holding path for itself to battery on break contacts 1 of relay 23–NC. Relay A2 operated closes its make contacts 4 to apply a battery to conductor B2 extending to one side of the winding of relay 26–C2. Make contacts 5 of relay 24–A2 are now closed and extend a battery to the windings of relays E10 and E11 on FIG. 22.

The ground on conductor G4 may now be extended through break contacts 8 on all of the five translator T–relays, over conductor K2 to the other side of the winding of relay 26–C2. This relay now operates since the other side of its winding is connected to battery on conductor B2. Relay C2 operated closes its make contacts 2 to provide a holding path for itself to ground on conductor G4. Relay C2 operated connects the five code leads from the B2 register to the windings of the five translator T–1 relays. Relays T0 and T1 now operate by virtue of the ground applied to one side of their windings from operated relays 0 and 1 of the B2 register.

Figure 25:
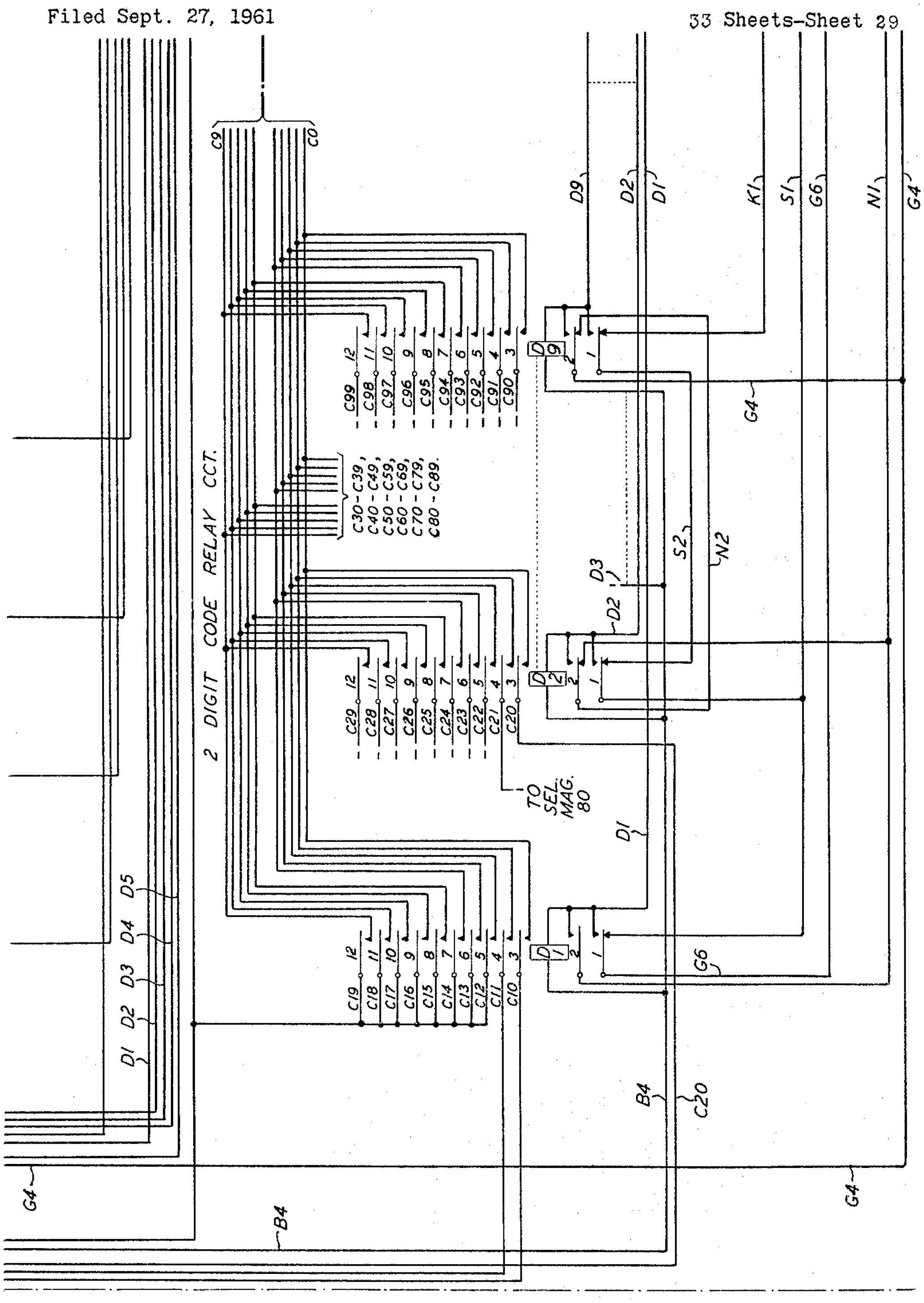
Figure 26:
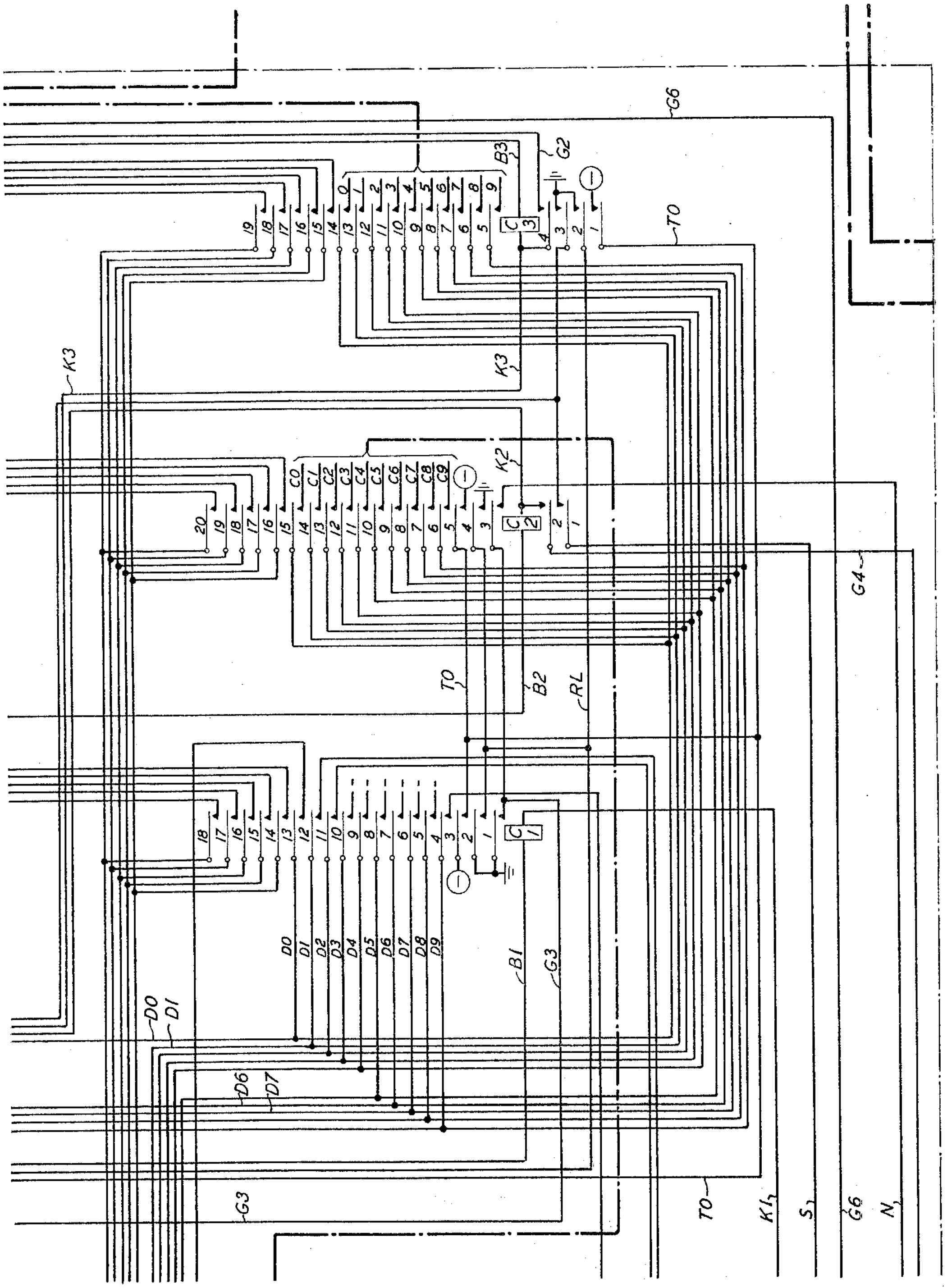
Figure 27:
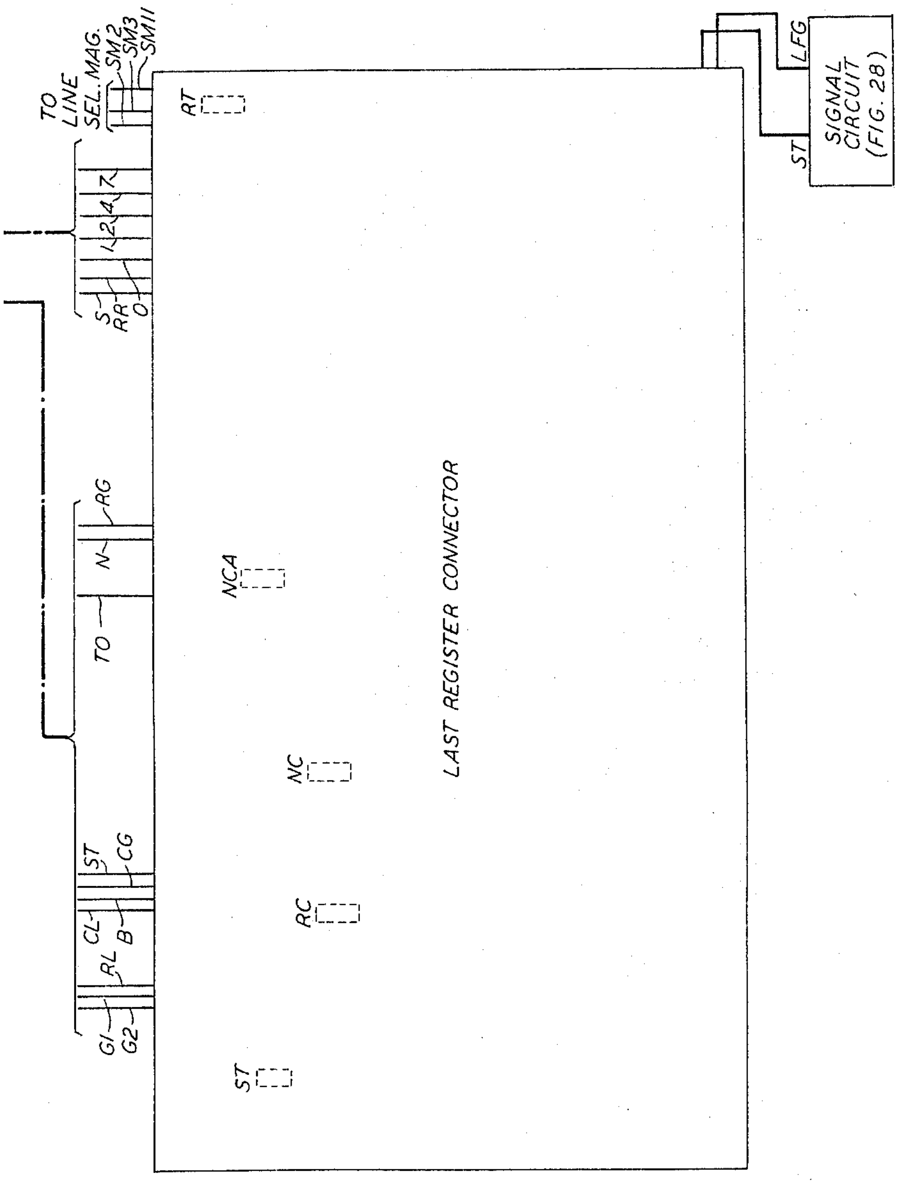

The translated output of two digit codes is taken from the contacts of relays D1 through D9 on FIG. 25. Thus, the upper contacts of relay D1 represent codes 10–19, the upper contacts of relay D2 represent codes 20–29 and so on, while the upper contacts of relay D9 represent codes 90–99.

Since it has been assumed in connection with the description of the circuit operation for two digit codes that the attendant dialed the code 21, the reception of a 2 for the tht first digit operated relay D2 as described. The reception of a 1 for the second digit causes the following path to be closed for subsequent application of ground to output code conductor 21 on make contacts 4 of relay D2 when ground is applied to conductor G3 as hereinafter described: from contacts 1 of relay ST (then operated), break contacts 2 of translator relays T7, T4 and T2, make contacts 1 of translator relay T1, make contacts 4 of translator relay T0, conductor D1 extending from FIG. 23 to FIG. 26, make contacts 14 of relay 26–C2, conductor C2 extending from FIG. 26 to FIG. 25, to code conductor 21 on make contacts 4 of relay 25–D2. As shown on FIG. 1E of the drawings, the output of the register connector for code 21 is connected to select magnet 80 which is associated with line 21. Similarly, the output of code conductor 21 on FIG. 25 is therefore extended and connected to the operating circuit for select magnet 80 (not shown) on FIG. 3.

The following path is now closed to operate relay 23–ST: ground on conductor G6, break contacts 1 of relay 25–D1, conductor S1 to conductor S, make contacts 1 of relay 25–C2, make contacts 10 on both of relays T0 and T1 operated on FIG. 23, one side of the winding of relay ST, through the winding of the relay and through break contacts 2 of relay NC to battery. Break contacts 2 of relay ST operated open the path from the translator check circuit to the winding of the relay NC. Make contacts 5 of relay ST operated apply battery to conductor B extending to the indirect access circuit and make contacts 4 of relay ST operated apply ground to conductor ST extending to the indirect access circuit.

In a manner described hereinafter ground is subsequently applied to conductor CG by the key relay circuit and the indirect access circuit. Ground on this conductor is extended through the winding of relay 23–RC, through diode CR7, make contacts 1 of relay ST, conductor G3, through the contacts of the five translator relays to the digit 1 output conductor D1, over make contacts 14 of relay 26–C2, over make contacts 4 of relay 15–D2, to the code 21 output conductor extending to select magnet 80 (not shown).

Ground on conductor CG is also connected through the break contacts of relay RC to the winding of the NC relay. At this point, the circuit determines whether the dialed number is assigned or unassigned and, if an assigned number has been dialed, whether the code is to be treated as restricted or nonrestricted, and whether two and only two translator relays have operated. If the dialed code is an assigned code, the conductor representing the code is cross connected on the distributing frame to the winding of an associated select magnet. Thus, the conductor for code 21 is cross connected to the winding of select magnet 80 (not shown).

(2.08–3.3A1) *Non-restricted operation.*—Ground on the CG conductor is applied simultaneously through the winding of relay RC in series with the select magnets as well as through the back contacts of the RC relay to the NC relay. Since the RC relay is comparatively faster operating than is NC, the operation of the RC in series with the select magnet removes the CG conductor ground from the NC relay thereby preventing its operation.

(2.08–3.3A2) *Restricted operation.*—In the event that the dialed two digit code is restricted, the path to the select magnet is open at this time. Thus, when ground is connected to conductor CG, relay RC does not operate which, in turn, permits the CG ground connected through the back contacts of relay RC to operate relay NC. Relay NC operated closes a locking path over its make contacts 3 to ground on conductor G2. Break contacts 1 of relay NC operated open the holding path for relays 24–A1 and A2 thereby permitting them to release. Make contacts 4 of relay NC operated operate relay NCA which at its break contacts 5 opens the holding path for the relays of the B1 and B2 registers thereby releasing them. The opening of break contacts 2 of relay NC releases relay ST.

The release of relay 24–A1 removes the battery from conductor B4 thereby releasing relay D2. Make contacts 1 of relay NC apply a ground to conductor B1 and the winding of relay 26–C1 so that it will reoperate following the release of relay D2. Make contacts 2 of relay NCA extend a ground over conductor ST to the signal circuit which causes it to return interrupted ground on the LFG lead. Contacts 1 of relay NCA transfer the KR conductor extending to the attendant ready lamp on FIG. 12 from a steady ground to interrupted ground on conductor LF from the signal circuit. The interrupted ground on the conductor LF causes the ready lamp at the attendant position shown on FIG. 12 to flash. The attendant should now operate the clear key.

(2.08–3.3A3) *Unassigned codes.*—If the code dialed is unassigned, the output conductor for this code will not be connected to a select magnet. Thus, when ground is nnected to conductor CG, relay RC will not operate and in turn will permit the operation of relay NC. From this point on the sequence of operation is the same as that just described for the restricted operation.

(2.08–3.3B) *Three digit codes.*—Let it once again be assumed that the attendant dials the three-digit code 108. The circuit operates in a manner similar to that already described with relay 24–A1 operating upon the dialing of the first digit. Assuming that this digit is a 1, it is register in the B1 register by the operation of the relays 0 and 1. The output of these relays is, in turn, connected to the T-translator relays which translate the information from its two out-of-five to a one-out-of-ten code form and, by means of contacts on relay C1 operated, causes relay 25–D1 to operate and lock. The opening of break contacts 1 of relay D1 removes the ground on conductor G6 from the S1 and S conductors extending through make contacts 1 of relay C2 when it is operated so that relay ST on FIG. 23 cannot operate after the second digit is dialed. The ground on conductor G6 is extended over make contacts 1 and 2 of relay D1 to conductor N1, and over contacts 2 of relays D2 and D9 to conductor G4. This provides locking and operating ground for relay C2.

Relay 24–A2 operates when the number 0 is dialed for the second digit and causes register relays 4 and 7 of the B2 register to operate and lock. Relay C2 operates and connects the output of the B2 register to the translator where the information is translated to a one-out-of-ten code form and applied over the D0 output conductor, over make contacts 15 of relay 26–C2 operated, over make contacts 3 of relay 25–D1 operated, to the winding of relay 22–E10 by means of its break contacts 2. This relay now operates and locks over its contacts 2 which comprise a make-before-break arrangement.

Pausing for a moment to notice a protective feature of the circuit, it should be observed that if the invalid code 19 had been dialed that a ground would now be on conductor C19 on make contacts 12 of relay D1. This ground would be extended to the winding of relay NC on FIG. 23 to operate it. The operation of this relay causes the ready lamp at the attendant position to flash as has already been described.

Continuing, the opening of break contacts 1 of relay 22–E10 removes ground from conductor G6. The closure of make contacts 1 of the same relay applies ground to conductor G5. The closure of the upper contacts of this relay prepares for connecting the 0 through 9 output leads from the translator, by the way of contacts on relay C3, to the output conductors associated with codes 100 through 109.

The removal of ground from conductor G6 releases relay D1. Relays C1 and ST cannot operate falsely when relay D1 releases since ground is removed from conductor G6 at this time. The removal of ground from this conductor also releases relay C2 which, in turn, releases the operated translator relays. With all translator relays normal, ground on conductor G5 is extended through break contacts 9 of all the translator T– relays, over conductor K3 to one side of the winding of relay C3. The other side of the winding of this relay is connected to battery via the make contacts 3 of relay A3. Relay C3 operated locks to ground on conductor G2 from the indirect access circuit. Relay C3 operated connects each of the five output leads of the B3 register to the winding of the corresponding translator T– relay. Assuming that an 8 is dialed as the third digit, it is registered in the B3 register by the operation of relays 7 and 1 and then translated in a manner similar to that already described. Subsequently, ground from the key relay circuit is applied over the D8 output conductor from the translator, over make contacts 6 of relay C3, over make contacts 4 of relay E10, to the conductor associated with code 108.

If code 108 is unassigned, the output code lead will not be cross connected at the distributing frame and the operation of the circuit will be the same as for the dialing of a two-digit unassigned code.

Assuming that code 108 is an assigned code, and assuming that it is the number which has been dialed, the operation of relays C3, T1, T7 and E10 connects the output of the translator to the output conductor for code 108. Since this is an assigned code, this conductor is cross connected at the distributing frame to the select magnet serving the called line or attendant position. If the call in this case is to be treated as restricted, relay NC will operate as already explained. If, on the other hand, it is to be non-restricted, the operation of relay RC prevents the operation of relay NC.

2.08–3.4. Clearing

An attendant may clear the register connector circuit of any registered code information by operating the clear key in his pushbutton dial set any time after he has dialed a first digit and before he has completed dialing a valid code provided he does so within a predetermined time-out interval. The operation of the clear key connects ground to code lead 7. This differs from dialing a digit in that the clear key applies ground to only one of the five code leads instead of two out of five. Ground on code lead 7 is fed through break contacts 7 of relay 23–RT and break contacts 10 of relay 24–A1 to the winding of relay 7 of the B1 register to operate it.

If the NC and NCA relays are operated, the A1 relay and the B1 register will be normal but the C1 relay will be operated as previously described for restricted and unassigned codes. Ground on dial code lead 7 is thereby extended through the contacts 10 of normal relay A1 and contacts 14 of operated relay C1 to the winding of translator relay T7 to operate it.

If the NC and NCA relays are normal, the A1 relay will be operated since, presumably, at least one digit has already been dialed. Ground on the dial code conductor 7 is therefore steered into the B2 register if relay A2 is normal or into the B3 register if A2 is operated. In either case the clear code is registered like any regular digit. The A– and C– relays associated with the register in which the clear signal is stored operate and ground the 7 lead to the winding of relay T7 in the translator thereby causing it to operate. A path is now extended from ground on break contacts 5 of relay 23–T0, through break contacts 5 of relay T1, T2 and T4, make contacts 5 of relay T7, over conductor CL extending to FIG. 21, to operate relay 21–RL and thereby effect a clearing operation in the manner described hereinafter.

The operation of relay 21–RL removes ground from conductors G1 and G2 thereby causing all operated relays in the register connector to release. The clearing operation causes the register connector to release in the same manner as it does during a normal release operation. The indirect access circuit however, is only reset at this time and is not fully released. When the clearing function is completed, ground is restored to the G1 and G2 leads and the circuit is ready to receive new dialing information.

2.08–3.5. Release of Register Connector

When a connection is then completed, or if for any reason the indirect access circuit times out, or if an attendant operates a line key or the release key subsequent to the operation of his indirect access key, ground is removed from conductors G1 and G2 by the indirect access circuit. This causes the release of the relays of the B-register, and the C3 relay. Each operated A– relay releases when its associated register relay is released. When all of the A– relays release, all other operated relays in the circuit release. When the ST, C1, C2, C3, A1, A2 and A3 relays release, ground is removed from the RL lead and this permits the release relay in the indirect access control circuit to release. During the release function the indirect access circuit is completely released and therefore ground is not reapplied to the G1 and G2 leads. In case the NC relay is operated, the release function causes it to release followed by the release of relays NCA and C1. This in turn releases the release relay in the indirect control circuit.

The RG conductor is in the operate path of the release relay in the indirect access control circuit. This conductor is connected to ground only when relay 23–RT is normal. This relay is normal only when all of the dial pushbuttons in the attendant position are normal. In other words, the release function cannot commence until the attendant removes his finger from the pushbutton dial set, unless, of course, he keeps his finger on the button long enough for the time-out circuit in the indirect access control circuit to function as described hereinafter. Conductor T0 is connected to battery whenever relay C1 or C2 or C3 is operated and is disconnected from battery whenever all of these relays are released. This discharges the time-out circuit in the indirect access control circuit after each digit is dialed and starts it retiming to provide the attendant with a full timeout interval within which he must dial the next digit. Thus, he has the same length of time in which to dial each digit regardless of whether he dials a two or a three-digit number. If the attendant fails to dial any digit within the allotted time-out interval the circuit is released. Before he can redial, the attendant must go through the procedure of seizing a vacant indirect access control circuit.

2.08–4. RELEASING THE INDIRECT ACCESS CONTROL CIRCUIT

2.08–4A. Early Release

If, after operating his indirect access key and seizing an indirect access circuit, an attendant changes his mind and subsequently operates any other line key or the release key at his position, he causes ground to be removed from conductor KG as relay 9–IA releases. This breaks the locking path for relay 19–PC1–1 to release it at this time. The release of this relay opens its make contacts 4 to remove the shunt from the P winding of relay 21–N thereby permitting it to operate from battery in series with relay 21–X. Make contacts 3 of relay N operated extend the grounded conductor RG from the register connector circuit to the winding of relay 21–RL to operate it. Make contacts 3 of relay RL now close and complete a holding path to ground for the relay on make contacts 5 of relay X. Break contacts 1 of relay RL open and release relay X. Make contacts 1 of relay X now open and, in turn, cause relay N to release. Relay RL releases when both relays X and N have released. Relay S cannot operate until both the X and RL relays are normal.

2.08–4B. Initiation of Normal Release

When the attendant making the indirect access call receives the ready lamp indication informing him that the indirect access circuit has been seized, he dials the two or three-digit number representing the line to which he wishes to be connected. As soon as this information is registered and translated by the register connector, relay 23–ST operates and connects battery to the B lead, connects ground to the ST lead and removes ground from the S lead. Ground on conductor ST from the register connector is extended over break contacts 8 of relay 21–EC, make contacts 5 of relay 19–PC1–1, conductor ST extending from FIG. 19 to FIG. 8 and then to FIG. 9, to the right-hand winding terminal of relay 8–SD. This ground shunts the battery supplied to the winding of the relay through resistor R3 to release the relay. The release of relay 8–SD opens its make contacts 6 to release relay 8–CT. Relay SD released extends the ground on conductor ST from the indirect access circuit, through diode V2, make contacts 12 of relay 9–IA, make contacts 3 and 4 of relay 8–ST, through break contacts 2 and 3 of relay SD to conductors STA and STB to operate relays 4–PA1 and 4–PBI thereby registering a request for service of the controller. The aforementioned ground on conductor ST is supplemented at this time by ground on conductor AH supplied through diode V1. However, the ground on conductor ST is also required since the ground on the AH conductor may be absent at this time if all register connector circuits are busy. Diode V2 prevents relay 8–SD from being released prematurely by ground on conductor AH. Diode V1 prevents ground on conductor ST from feeding back on the AH lead and thereby giving a false indication of an idle register connector circuit to other position relay circuits. Relay 8–CT released releases the operated hold magnet.

2.08–4C. Release of Indirect Access Circuit and Closure of Crosspoints

With ground on conductors STA and STB and with relays 4–PA1 and 4–PB1 operated, the circuit of FIGS. 8, 9, 4, 5, 6 and 7 now goes through a sequence of operation similar to that already described. Specifically, assuming that the A side of the controller again serves the call, relay 5–CA operates and, in turn, operates relay 5–FA, 6–AC, 5–GA and 4–GTA. Operated relay 5–GA closes its make contacts 2 which closes a circuit through contacts 11 of relay 5–FA to apply resistance battery to conductor CPA extending from FIG. 5 to FIG. 4. Ground on this conductor is extended over make contacts 3 of relay 4–PA1 and over the CP conductor from FIG. 4 to FIG. 8 to operate relay CP. Relay CP operated, in turn, closes its make contacts 18 to operate relay SD.

The operation of relay 8–CP closes the following path to operate relay 21–EC: ground on break contacts 1 of relay 8–CT, make contacts 11 of relay CP, make contacts 8 of relay 9–IA, conductor PC extending from FIG. 9 to FIG. 19, make contacts 1 of relay PC1–1, break contacts 2 of relay 21–EC to one side of its winding. This relay now operates since the other side of its winding is connected to battery over conductor B from the register connector circuit. Relay EC in operating closes its make contacts 3 to complete a locking path to ground for itself on make contacts 7 of relay X. Break contacts 8 of relay EC open at this time and remove ground from conductor ST extending to the key relay circuit. Make contacts 6 of relay EC operated connect the second winding of relay N over the N conductor to FIG. 23 where it is extended through break contacts 4 of relay NCA to the S conductor extending from FIG. 23 to FIG. 19 where this conductor is extended over make contacts 6 of relay PC1 to conductor RL extending to the key relay circuit.

The following path is now closed to operate the select magnet associated with the circuit the attendant is attempting to reach by his indirect access facilities: ground on break contacts 1 of relay 8–CT, make contacts 11 of relay 8–CP, make contacts 8 of relay 9–IA, conductor PC extending from FIG. 9 to the indirect access circuit of FIG. 19, make contacts 1 of relay 19–PC1–1, make contacts 4 of relay 21–EC, conductor CG extending from FIG. 21 to FIG. 23, through the winding of relay 23–RC, diode CR–8, make contacts 1 of relay ST to conductor G3.

Assuming the attendant dialed the three-digit code 108, the ground on conductor G3 may now be extended through the five translator T– relays which this time are operated to translate the third dialed digit, in this case the number 8, over the D8 output conductor from the translator, through make contacts 6 of relay 26–C3 and over make contacts 4 of relay 22–E10 to the output conductor for code 108. The ground on code lead 108 is now extended to the winding of select magnet 3–LS81 which now operates since the other side of its winding is connected to battery. The operated select magnet closes an obvious path to operate relay 3–S0. The operation of this latter relay closes its make contacts 41 and 42 which apply a ground to conductors OS1 and OS2 extending to FIGS. 5 and 6. This ground, in turn, causes relay 5–HA to operate.

Relay HA operated closes its make contacts 2 which apply ground to conductor HMA extending to FIG. 4 where ground on this conductor is extended through make contacts 7 of relay PA1, to conductor HM extending to FIG. 8. Ground on conductor HM is now extended through make contacts 6 of relay 8–CP, over conductor HM1 extending to FIG. 3, make contacts 1 of relay S0, through break contacts 2 of hold magnet LH1 to one side of its winding. The hold magnet now operates since the other side of its winding is connected to battery. The hold magnet in operating completes a holding path for itself as before described. The operation of select magnet LS81, followed by the operation of hold magnet 1, interconnects the conductors comprising column 1 of the crossbar switch with the conductors comprising row 81 of the switch.

The conductors comprising row 81 are connected to local line circuit 20 while the conductors comprising column 1 are connected to attendant position 1. Therefore, the closure of the crosspoints common to column 1 and row 81 prepares for interconnecting attendant position 1 with local line circuit 20.

The operation of hold magnet 3–LH1 closes its make contacts 1 to apply a ground to conductor HO extending to FIG. 8. Ground on this conductor is then extended over make contacts of relays ST and SD to the winding of relay CT to operate it. Relay CT operated closes through the leads from column 1 of the crossbar switch to those from the attendant position 1. The opening of break contacts 1 of relay CT removes ground from conductor PC extending from FIG. 9 to FIG. 19, and from there through the already described portion of the indirect access circuit and the register connector circuit, and thence over the code lead winding of the select magnet to release it. As before described, relay 8–CT operated: (a) connects ground to conductor HM; (b) transfers the SD relay winding from its operating path to a locking path under control of relay ST; (c) connects a second source of ground to the HL conductor for locking the hold magnets.

Select magnet 3–LS81 released opens the holding path for relay 3–S0 to release it. Relay S0 in turn releases relay 5–HA by removing ground from conductors OS1 and OS2. Relay HA released, in turn, operates relay RA from ground at the contacts of relay 8–CT. Relay RA operated provides another locking path for relay 5–GA and relay 4–GTA. Relay 5–RA operated also releases relay 8–CP and 5–FA. Relay 5–FA released, in turn, releases the PA– relay on FIG. 4 associated with attendant position 1 and opens the operating path of relays 5–GA and 4–GTA. Relay 4–PA1 associated with attendant position 1 released releases relays 5–RA and 5–CA provided no other PA– relays on FIG. 4 are operated. The release of relays 5–CA and 5–RA releases relays 5–GA and 4–GTA by opening their locking paths.

As before described the release of relay 8–CP (a) transfers the A capacitor from across the CT relay winding to the C resistor to provide a discharge path; (b) reconnects ground to the J lead; (c) transfers a locking path for the operated 9–IA relay back to the LK lead, and causes the receive simplex in the attendant telephone circuit to be closed. Diode D1 on FIG. 8 prevents ground on the HM lead from feeding back on the SC lead to the RL lead when a call by indirect access is directed to a line located on the lowest numbered line switch. This would result in a premature release signal to the indirect access circuit.

The release of relay 8–CP closes the following path to operate relay 21–N: ground on break contacts 15 of relay CP, make contacts 6 of relay CT, make contacts 10 of relay 9–IA, conductor RL extending to FIG. 19, make contacts 6 of relay PC1–1, conductor S extending to FIG. 23, break contacts 4 of relay NCA, conductor N extending to FIG. 21, make contacts 6 of relay EC, to the winding of relay N which now operates since the other side of its winding is connected to battery. Make contacts 3 of relay N operated connect the winding of relay 21–RL to the RG lead extending to the register connector circuit. This lead is connected to ground when relay 23–RT is normal. This relay is normal only when all pushbuttons in the dial set in the attendant position are released. This is a safety feature to insure that the indirect access circuit does not release until after the attendant removes his finger from the dial. Without this feature, an attendant making an indirect access connection to a two-way line circuit might still have a button in his dial set depressed when the indirect access circuit releases and he would, in this event, register a false digit in the register sender circuit used in dialing out over the two way line circuit.

To prevent the attendant from holding the indirect access circuit indefinitely, contacts 2 on the 23–RT relay are shunted by the normally open make contacts 3 on the 21–T relay on FIG. 21. This relay operates if the attendant fails to release the pushbutton in his dial set within a predetermined time-out interval, thus connecting ground to the RG lead. Ground on the RG lead is then connected by the operated 21–N relay over its make contacts 3 to the winding of the RL relay which operates and locks itself to ground through make contacts 5 of relay X as well as through make contacts 1 of relay EC and also, to the ground on the RL conductor from the register connector circuit. Thus, the RL relay is the last of these relays to release.

When both the 21–N and RL relays are operated, battery is removed from the right-hand side of the winding of relay 19–PC1–1 by break contacts 7 of relay RL and break contacts 2 of relay N, thereby causing relay 19–PC1–1 to release. Break contacts 1 of relay RL operated open the holding circuit for relay X thereby causing it to release. Relay RL operated opens its break contacts 4 and 5 to remove ground from conductors G1 and G2 extending to the register connector.

Relay X released opens its make contacts 7 to cause relay EC to release. Relay X released also restores the time-out circuit to normal. The release of both relays X and PC1-1 cause relay N to release. Relay RL releases when relays X, EC, and N are released in the indirect access circuit and all relays that have been connecting ground to the RC lead in the register connector circuit are released. If the 21–LO relay in the locking circuit is released, relay S reoperates when the RL relay releases and this indirect access circuit again prepares to serve a subsequent indirect access call.

2.08–5. MISCELLANEOUS FEATURES OF INDIRECT ACCESS CIRCUIT

2.08–5.1. Time Out of the Indirect Access Circuit

When relay 21–X operates, +130 volts is applied to the winding of relay T by make contacts 4 of relay X. At the same time, break contacts 8 of relay X open and disconnect the negative potential normally applied to the right-hand side of capacitor C1 through resistor R2. Capacitors C2 and C3 are a timing means and their upper terminals now start to charge from 48 volt minus potential to the positive potential supplied through resistors R4, R5, R2, the winding of relay T and through resistor R3 and make contacts 4 of relay X. When the voltage on the capacitors reach the break-down value of the cold cathode gas tube, the tube conducts and operates the T relay which locks itself over its make contacts 2 and resistor R1 to ground. Relay T at its contacts 1 disconnects the anode voltage from the tube and stops its conduction. Capacitor C1 prevents RF transients from causing the gas tube to conduct falsely.

The time-out interval is determined by the value of the charging capacitors and the resistor network. This interval may be varied between any desired limit, such as, for example between 7 and 18 seconds, by utilizing different values of resistance for resistor R2.

A portion of the timing circuit for the gas tube comprises the series circuit comprising resistor R4 and capacitor C2 to ground. Also, relay 21–LO is normally operated when the timing operation takes place and therefore, a paralleling circuit comprising resistor R5 and capacitor C3 in series to ground on make contacts 6 of relay LO also helps determine the charging time of capacitor C1. When all the indirect access circuits become busy, relay LO is released and a substantial portion of the timing capacitance is disconnected from the charging circuit. Under these conditions, the time-out interval is reduced to ⅓ of the normal time. As soon as one of the indirect access circuits becomes idle, the LO relay operates, but it releases again as soon as a vacant circuit is sized by another call unless in the meantime another indirect access circuit becomes idle.

When relay 21–T operates for a time-out, it closes its make contacts 4 to operate relay N. Its make contacts 3 extend ground through make contacts 3 of relay N to the winding of relay RL to operate it. Relay RL operated releases relay X as its break contacts 1 open. The release of relay X, in turn, releases relay T. The rest of the circuit is released in the normal manner.

2.08–5.2. Clear Function

When an attendant dials a non-valid code, or if he depresses two or more buttons simultaneously, or if for some reason ground is applied to only one instead of two out of the five dial code leads, the non-valid code (NC) relay in the register connector operates and causes the ready lamp RL to flash in the attendant's pushbutton dial set. The attendant may clear any information stored in the register connector circuit without relinquishing the indirect access circuit which he has seized provided he does so before he has completed dialing a valid code and before the circuit times out. To clear the register, the attendant operates his clear button. This causes ground to be applied only to code conductor 7 in the atendant position and from there over the same conductor through the indirect access circuit to the register connector circuit. The register connector, in response to the receipt of ground on only this conductor, causes ground to be applied to conductor CL extending from FIG. 23 to FIG. 21 in the manner already described. Ground on this conductor operates relay 21–RL which locks itself through the contacts of the operated X relay to ground, and to ground from the register connector on the RL conductor. Relay RL operated release relay X as well as all of the operated relays in the register connector circuit. Relay X released restores the timing circuit to normal. Since the N relay does not operate during the clear function, the PC1–1 relay is not released and the indirect access circuit remains seized by the attendant. When X relay in the indirect access circuit and all of the relays in the register connector circuit are released, the RL relay releases and allows the X relay to reoperate through make contact 4 on relay 19–PC1–1. Relay X reoperated starts the timing circuit and reapplies ground to leads G1 and G2 to the register connector circuit. The register connector is now ready to receive the new dialing information and the attendant is so notified by his dial set ready lamp RL which changes from a flashing to a steady indication.

2.08–5.3. Busy Out and Alarm Features

The indirect access circuit may be busied out for maintenance purposes. This is accomplished by the insertion of a plug in the BO jack. A normally closed contact on the BO jack is in series with the winding of the S relay. When this contact is opened, relay S is released. When the S relay is released, it steers requests for indirect access service to the next indirect access circuit in the same manner as the circuit would if it were busy. A normally open contact on the BO jack connects ground to the BO lamp which lights to remind the maintenance personnel that the circuit is busied out.

When relay 21–AL operates, it locks up through normally closed contacts on the BO jack and on the alarm release (AL–REL) key. Operated relay AL releases the S relay if it is operated and extends ground to an alarm circuit to bring in an audible and visual alarm in that circuit.

When battery and ground are applied to the S relay winding at the time relay LO is released, they are also applied at the same time to the AL relay. This relay is a relatively slow-operating relay, whereas the S relay is much faster in operating. The S relay therefore normally wins the race and operates. In doing so it disconnects ground from the AL relay and prevents it from operating. In the event that the S relay fails to operate, however, the AL relay operates and brings in the alarm.

When a request for indirect access circuit is received, ground on conductor GT is connected through contact 3 on the operated S relay to the windings of relay G and relay AL simultaneously. Normally, the G relay operates and, in turn, operates the PC– relay before the AL relay operates. When the PC relay operates it disconnects ground from the AL relay and prevents it from operating. If either the G relay or the PC relay fails to operate, the AL relay operates and brings in an alarm.

During the release cycle of the indirect access circuit after the 21–EC relay has operated, the N relay is operated from ground on the RL conductor as already described. The operated N relay applies ground from the RG conductor to the windings of the RL relay and the AL relay simultaneously. Normally the RL relay wins the race, releases relay PC1–1 and releases relay X which, in turn, releases relay EC. The release of EC relay prevents the operation of the AL relay. However, in the event of the failure of the RL relay to operate or, of either the X or the EC and PC–1 relays to release, the AL relay operates and brings in an alarm. The insertion of a plug in the BO jack releases the operated AL relay which in turn retires the alarm.

2.08–6. ANSWER OF THE CALL BY THE SUBSCRIBER AT STATION 10

It has been described so far in connection with the description of the indirect access facilities how the attendant at position 1 operated his indirect access key and then dialed the three-digit code 108 to interconnect himself with the subscriber 10 served by local line circuit 20 on FIG. 18. Once the interconnection is made at the crosspoints of the crossbar switch as well as at the contacts of various relays within the circuit of FIGS. 8 and 9, the desired connection is essentially completed and ringing current is applied to the called subscriber's line in much the same manner as already described for the direct access call from attendant position 1 to subscriber 1 served by the local line circuit 11 on FIG. 17. Once called subscriber 10 picks up his hand-set to answer the call, local line circuit 20 behaves in precisely the same manner already described for local line circuit 11 in order to complete a talking path between the attendant and subscriber 10.

2.08–7. RELEASE OF THE CONNECTION

The indirect access circuit and the register connector circuit release as they complete their functions in setting up the desired interconnections. Therefore, upon the release of these two circuits, the remaining circuit is in essentially the same condition as it was for the direct access call already described to subscriber 1 on FIG. 17. The main exception is that relay 9–IA is operated instead of one of relays K1–K6 on FIG. 9. Therefore, the release of the circuit as either party hangs up or as the attendant operates another line key, is essentially the same as that already described and need not be repeated.

2.09. *Override connections*

This section describes the circuit operations for calls between attendant positions. The connections described so far have included various types of calls from an attendant position to line circuits as well as a call from a line circuit to a selected attendant position. It will be recalled that in establishing a connection from an attendant position to a line circuit that the select magnet is operated that is associated with the level of the crossbar switch to which the conductors from the called line circuit are connected and that the hold magnet is then operated which is associated with the column of the switch to which are connected the conductors of the calling attendant position. It will also be recalled that on calls from a line circuit to an attendant position that a select magnet and a hold magnet were similarly operated but in this case the select magnet which operated is the one associated with the calling circuit (the line circuit) while the hold magnet that operated is the one associated with the called circuit (the attendant position).

It may be observed from the diagrammatic drawings of FIGS. 1A–1E and from FIGS. 2 and 3 that each attendant position is connected to both a selected row as well as to a selected column of the crossbar switch. Thus, for example, attendant position 1 is connected by metns of conductors extending from the key relay circuit to column 1 of the switch and is also connected by means of its conductors TT, TR, RT, RR and A (FIG. 13) to level 1 of the switch. The providing of each position with an appearance on an individual row or level of the crossbar switch enables each attendant position to call another position in much the same manner that it would call a line circuit. Accordingly, in accordance with the present invention, a calling attendant may complete a call to another attendant either by operating a direct access key, if the called position is provided with a direct access key at the calling attendant position, or by operating the indirect access key and then dialing the assigned code of the called position. In either event, the call is completed by first operating the select magnet of the level on the crossbar switch assigned to the called attendant position and by then operating the hold magnet associated with the calling attendant position.

A call between the attendant positions in the system comprising the present invention is termed an override call since a calling attendant overrides a called attendant and completes a connection to the called position regardless of the idle or busy condition of the called circuit. The reason for this arrangement is that the presently disclosed system was designed for use in installations wherein calls between attendants often take place under semi-emergency or emergency conditions and therefore it is mandatory that such calls should proceed to completion regardless of whether the called position is busy at the time with another connection.

Most of the circuitry and equipment associated with the override function in a called attendant position is shown on FIG. 13. Shown on this figure is an amplifier A, a speaker SPKR, a manually operable key designated HS–LS, and a resistance bridge comprising resistors A1, A2, B1, B2, C1, C2 and D1, D2. The speaker together with the key HS–LS provides a means whereby the attendant at the overridden position may transfer any incoming speech signals from his headset receiver to the loudspeaker. Amplifier A prevents a calling (overrider) attendant's speech from being heard in the overridden attendant's receiver while the overridden attendant's override channel is connected to the speaker. The resistance bridge comprises a side tone circuit wherein, under certain conditions described hereinafter, side tone is provided for either one or both of the attendants' speech.

An override call from the attendant at position 40 to the attendant at position 1 will now be described in order to describe the details of the override circuit.

A study of FIGS. 1A–1E shows that either attendant may contact the other one by means of the direct access facilities. Specifically, the operation of direct access key 3 at position 40 enables the attendant thereat to interconnect himself with attendant position 1 and also, the operation of direct access key 3 at position 1 enables its attendant to interconnect himself with position 40. The L lead for direct access key 3 at position 40 is connected to the L lead of attendant position 1 and the SM lead for direct access key 3 at position 40 is connected to the select magnet SM1 whose level of the crossbar switch is exclusively associated with the TT, TR, RT, RR and A conductors from attendant position 1. Thus, the operation of direct access key 3 at position 40 operates select magnet 1 as a first step in connecting position 1 to position 40. The operation of direct access key 3 at position 40 also completes a path for the direct access lamp 3 at the position to be energized over a circuit including in part conductor L extending from attendant position 1. Similarly, the operation of the direct access key 3 at attendant position 1 closes a path to operate select magnet 40 as first step in interconnecting position 40 with position 1 and additionally completes a path to light direct access lamp 3 at position 1 over a circuit which includes in part the L conductor from position 40.

Although both of these positions are interconnectable with each other in either direction on a direct access basis, either position may, if it is so desired, call the other by means of the indirect access facilities. Thus, referring to FIG. 1E, the indirect access code assigned to select magnet 1 and position 1 is 20 while the indirect access code for position 40 and select magnet 40 is 110. Thus, an attendant at position 1 may call the attendant at position 40 by operating his indirect access key and dialing code 110, while the attendant at position 40 may call position 1 by operating his indirect access key and dialing the code 20.

It will be assumed, in order to simplify the present description, that the attendant at position 40 calls position 1 by means of the direct access facilities as he operates his direct access key 3. Position 40 is shown for the most part in diagrammatic form on FIG. 15. However, it is identical in all respects to position 1 shown on FIGS. 10–13 and 16. Therefore since the following description refers to some circuit elements of position 40 not specifically disclosed therein, the reader need only refer to the circuit details of position 1 for an understanding of the same details of position 40. The same is true for the position and key relay circuit for position 40 shown on FIG. 14. It is similar in all respects to the circuit of FIGS. 8 and 9, the key relay circuit for position 1, and therefore reference should be made to these figures for an understanding of any details required for the operation of the circuit of FIG. 14.

2.09–1. ESTABLISHMENT OF CONNECTION BETWEEN POSITIONS 1 AND 40

Figure 14:
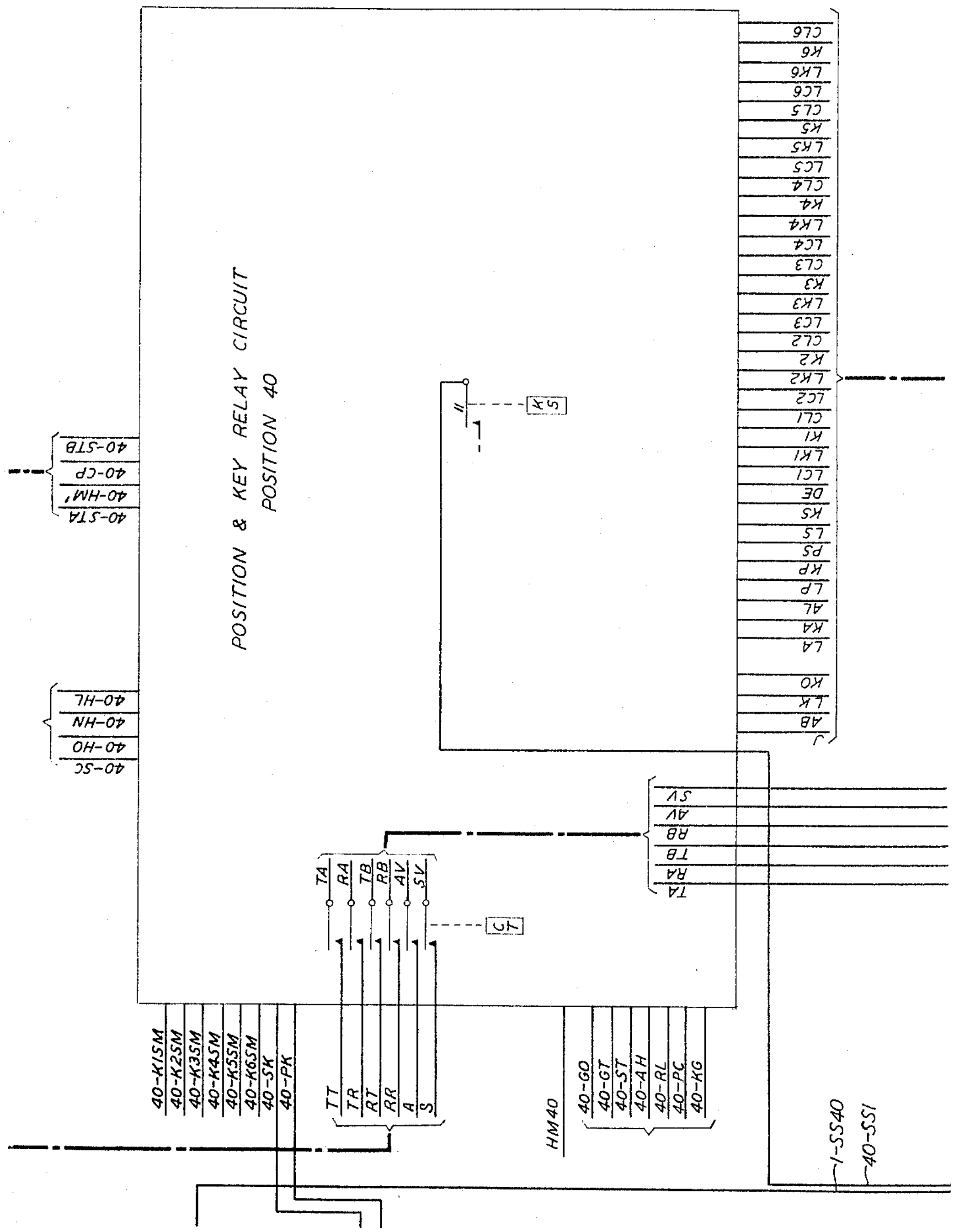

The operation of direct access key 3 by the attendant in position 40 causes the circuit of FIG. 14 to operate in much the same manner as already described for FIGS. 8 and 9 in connection with the direct access call from position 1 to station 1 of FIG. 17. Specifically, the operation of direct access key 3 of position 40 operates its key relay circuit on FIG. 14 which, in turn, operates relays 4–PB1 and 4–PA40. The operation of these relays, in turn, in a manner similar to that already described, causes the controller on FIGS. 5–7 to be seized which controls the operation of circuits within FIG. 14 to complete a path to operate the select magnet 1 and hold magnet 40 on FIGS. 2 and 3 and to close the crosspoints on the crossbar switch unique to the column and row on the switch to which the transmission conductors from attendant positions 1 and 40 are connected. Specifically, the conductors TA, RA, TB, RB and AV from position 40 on FIG. 15 are extended through contacts of relay 14–CT to conductors TT, TR, RT, RR and A extending to column 40 of the switch. The crosspoints common to column 40 and row 1 are now closed and therefore these conductors may be extended from level 1 of the switch to FIG. 13 of position 1.

The interconnection of the two positions as the crossbar switch crosspoints close completes a path whereby a ground in the calling attendant position is extended to operate relay 13–C in the called position. This path may be traced as follows: ground on the J lead in position 40, through make contacts 3 of relay TJ in position 40, conductor RF, break contacts 2 of relay 40–TR, make contacts 5 of relay 15–TJ, break contacts 1 of relay 15–H, conductor AV extending from position 40 to the contacts of relay 14–CT, conductor A extending through the closed crossbar switch crosspoints common to select magnet 1 and hold magnet 40, out over conductor A on level 1, to FIG. 13, to the winding of relay 13–C which now operates since the other side of its winding is connected to battery. Make contacts 2 of relay C operated extend a battery to operate the override lamp OV on FIG. 12 thereby notifying the attendant at this position that another attendant is overriding him.

The closure of the crossbar switch crosspoints also completes a path whereby ground from the attendant position 1 is extended to position 40 to operate relay A in that position. This path may be traced as follows: ground on the center tap primary of transformer D (FIG. 13), over conductors RR and RT extending from FIG. 13 to the crossbar switch, through the cross points common to select magnet 1 and hold magnet 40, conductors RR and RT extending from column 40 of the switch to FIG. 14, through make contacts on relay 14–CT, over conductors RB and TB to FIG. 15, through the primary of the transformer 15–C, through the lower primary of the transformer 15–B, break contacts of relay AB in position 40 to the winding of its relay A which operates since the other side of its winding is connected to battery.

The operation of relay 13–C in position 1 and the operation of relay A in position 40 completes the following path to energize the direct access lamp 3 of position 40 in a fluttering manner to notify the calling attendant that he is now connected to position 1: battery on make contacts 1 of relay 13–C, over conductor L extending from FIG. 13 to FIG. 15, conductor 40 DAL3 through contacts of its relay BL and its diode DC3 to one side of its direct access lamp 3, through the lamp to its other side, through make contacts 4 of the K3 relay in the key relay circuit of FIG. 14, over conductor AL on FIG. 14 to FIG. 15, make contacts 2 of the A relay operated in FIG. 15, over conductor FD through BR CONT KEY back contacts to conductor FL which has a fluttering potential applied thereto by the signal circuit of FIG. 28.

Reviewing the portion of the override call described so far it may be seen that the operation of the direct access key 3 in position 40 has interconnected that position with position 1 and the override lamp at position 1 is now lit to notify the attendant thereat that another attendant is interconnected with him on an override basis. The direct access lamp 3 at position 40 is energized by a fluttering potential to signify to the attendant thereat that he is now interconnected with the attendant at position 1.

The D transformer and conductors RT and RR on FIG. 13 of attendant position 1 are now interconnected with conductors RB and TB of position 40, conductors TR and TT of position 1 are connected to conductors RA and TA of position 40 and conductor A of position 1 is interconnected with conductor AV of position 40. Thus, the transmission and control conductors of position 40 are interconnected with the transmission and control conductors of the override portion of attenadnt position 1 and the attendants at the two positions may now converse.

The relays which are operated at position 1 on FIG. 13 at this time as well as the specific portions of the circuit which are used on this figure depend upon the following:

(1) whether the overridden attendant is currently manning his position,
(2) whether he is connected to a line circuit or another attendant position at this time (as manifested by the operation or nonoperation of his A relay),
(3) whether he has operated his HS–LS key to direct incoming override speed currents to his headset or whether he has left the key in its normal position so that the ncoming override speech currents are directed to the loudspeaker at his position.

Thus, from the foreging, it may be seen that there are a number of different conditions in which the overridden position 1 may be at the time it receives an override call. These various conditions are described in the following paragraphs. However, the HS–LS transfer key is described first since an understanding of its functions is necessary to an understanding of the subsequently described conditions.

2.09–2. HS–LS TRANSFER KEY

The HS–LS key determines whether an incoming overrider speech will be directed to the attendant's headset or to the loudspeaker at his position. The operation or nonoperation of this key, in turn, controls the operation of relay 13–HS. With this relay released, relays 13–A1 and 13–B cannot operate and the LS lamp associated with the HS–LS key is lighted thereby indicating that the override channel is connected to the loudspeaker. With relay B idle, the output of amplifier A is coupled through the repeating coil D to the override receive conductors RT and RR. This amplifier functions to permit an overrider to hear the called attendant's speech as well as the speech from the distant end of any connected line, but prevents the overrider from talking into the called attendant's receiver while the overridden channel is connected to the loudspeaker.

If this time, the nonlocking HS–LS key is depressed, a ground is extended from the make contacts of the key, through break contacts 3 of relay HT, to operate relay HS. This relay in operating closes a holding path for itself over its make contacts 2, through break contacts 2 of relay HR, over conductor GK, to ground on make contacts 1 of relay TJ. The release of key HS–LS extends a path over its break contacts, through make contacts 4 of relay HS to the winding of relay HT to operate it. Make contacts 5 of relay HT complete a holding path for relay HT independent of the HS–LS key and through the make contacts 4 of relay HS. The operation of make contacts 4 of relay HT transfers the make contacts of the HS–LS key from the winding of relay HS to the winding of relay HR. Under this condition, operated relay HS permits the subsequent operation of relays A–1 and B and extinguishes the LS lamp thereby indicating that an override call will not be connected to the loudspeaker. The subsequent operation of the HS–LS key operates relay HR which releases relay HS and holds relay HT until the key is released. Relay HS released again lights the LS lamp and permits closing the override connections of the loudspeaker.

When all plugs are withdrawn from jacks A and B, on FIG. 11, the incoming overrider speech is connected to the loudspeaker. The locking path for relay HS is opened at relay TJ thereby releasing relay HS if operated.

2.09–3. CONDITION 1—OVERRIDDEN POSITION CONNECTED TO A LINE CIRCUIT OR ANOTHER ATTENDANT POSITION AND THE HEADSET-LOUDSPEAKER FEATURE IS IN THE HEADSET CONDITION

In this condition, relay 13–A is operated in a manner similar to that described for previous connections. It has already been explained how relay 13–C is operated at this time. Also, since the incoming overrider seech is to be directed to the receiving attendant's headset, relays HS and HT are operated by the momentary operation and release of the HS–LS key. The following path is now closed to operate relay A–1: One side of the winding of the relay, make contacts 5 of relay HS operated, make contacts 4 of relay A operated, to the J conductor ground on make contacts 3 of relay C operated.

The incoming speech signals from the overrider attendant position are recived over conductors TR and TT while the speed currents from the overridden attendant at position 1 are transmitted to the attendant at position 40 over the conductors RR and RT. The incoming speech signals from position 40, although received over conductors TR and TT, are not applied directly to the headset receiver of the attendant at position 1. Instead, they are applied to conductors TA and RA and from there over the closed circuit paths extending to the line circuit with which the overridden attendant at position 1 is currently connected. These speech currents then pass through this line circuit and through the sidetone circuitry of the third party with whom the attendant at position 1 is currently conversing and reappear at position 1 on its conductors TB and RB. From there, they are applied to the attendant's headset receiver. This path may be traced as follows: Conductors TR and TT incoming from the overrider's position 40 to the overridden position 1 on FIG. 13, capacitors TR and TT, make contacts 6 and 4 of relay A–1, conductors RA and TA, extending from FIG. 13 and over FIGS. 11 and 10 and then through the key relay circuit of FIG. 8, in a manner similar to that already described, to the line circuit and to the station with which the attendant is currently conversing at the time his position is overridden. The speech currents then pass through the sidetone circuitry associated with this line circuit and are returned through the line circuit serving this station, although the closed crossbar switch crosspoints and ultimately are returned to attendant 1 via his TB and RB conductors. These returning speech currents on conductors TB and RB are extended over the sleeves of jacks A and B and the sleeves of plug A and B to the attendant's receiver.

The path over which the speech currents generated by the overridden attendant's microphone are received by the overrider attendant is equally involved since they similarly travel through the sidetone circuitry of the station with which the overridden attendant is currently conversing before they reach the overrider attendant position. This path may be traced as follows: The transmitter of the attendant at position 1, the tips of plugs A and B, the tips of jacks A and B, capacitors A and B, through the transformer A from its secondary to its primary winding, conductors RA and TA, from there through the side tone circuit associated with the line circuit with which the attendant at position 1 is already connected, back through the existing connection over which the attendant 1 is connected to this line circuit, conductors TB and RB extending from FIG. 11 to FIG. 13, make contacts 5 and 6 of relay 13–C, the input of amplifier A, through the amplifier, over break contacts 1 and 3 of relay B, one side of the winding of transformer D, the other side of the winding of the transformer, and from there over conductors RT and RR via the circuitry interconnecting the two attendant positions to attendant position 40.

Thus, reviewing the operations described under this set of assumed conditions, it may be seen that the sidetone circuitry associated with the party with whom the attendant at position 1 was already conversing at the time his position was overridden is involved both in transmitting speech currents from the microphone of the attendant at position 40 to the receiver of the attendant at position 1 as well as the speech currents from the microphone of the attendant at position 1 to the headset receiver of the attendant at position 40.

2.09–4. CONDITION 2—OVERRIDDEN POSITION IS CONNECTED TO A LINE CIRCUIT OR ANOTHER ATTENDANT POSITION AND THE HEADSET-LOUDSPEAKER FEATURE IS IN THE LOUDSPEAKER CONDITION

The second set of conditions described assumes that the attendant is manning his position, that he is currently connected to a line circuit or to another attendant position as manifested by the operation of his A relay, and that the headset-loudspeaker feature is in the loudspeaker condition. Under these conditions, the A relay in the overridden attendant position is operated, his A–1 relay is released, his B relay is released, and his C relay is operated in a manner similar to that already described. At this time, the speech currents from the overriding attendant's transmitter are received at the overridden position over conductors TR and TT and from there are transmitted through the resistor bridge to the loudspeaker. One side of this path may be traced as follows: Conductor TR, capacitor TR, break contacts 5 of relay A–1, resistor A–2 in the bridge, break contacts 5 of relay B, break contacts 1 of relay HT to one side of the loudspeaker. The other side of this path may be traced as follows: Conductor TT, capacitor TT, break contacts 3 of relay A–1, resistor C–1 of the bridge, break contacts 7 of relay B, break contacts 2 of relay HT to the other side of the loudspeaker. The sidetone path over which the calling attendant hears his own speech currents may be traced as follows: Conductor TR, capacitor TR, break contacts 5 of relay A–1, resistor D–1 of the bridge, break contacts 1 of relay A–1, to terminal 2 of the secondary of transformer D. The other side of this path may be traced as follows: Conductor TT, capacitor TT, break contacts 3 of relay A–1, resistor B–2 in the bridge, break contacts 2 of relay A–1 to terminal of the secondary of transformer D. The sidetone currents impressed on the secondary of transformer D are in turn impressed by the primary of the transformer on conductors RT and RR extending back to the headset of the calling attendant. Thus, in summary, the resistance bridge is used both to transmit the calling attendant's speech currents to the loudspeaker in the called position as well as to provide a sidetone path whereby the calling attendant may hear his own speech.

It should be noted in connection with this condition that amplifier A is a unidirectional device that therefore prevents the sidetone speech currents of the overrider attendant, which appear on the scondary of transformer D, from being applied to conductors TB and RB and thereby being impressed upon the receiver of the overridden attendant position.

The called attendant's speech currents are transmitted to the calling attendant's headset by a circuit which includes the sidetone path of the party with whom the called attendant was conversing at the time his position was overridden, as well as the amplifier A on FIG. 13. This path may be traced as follow: The called attendant's transmitter, the tips of plugs and jacks A and B, capacitors A and B, the primary winding of transformer A, the secondary winding of the same transformer, to the connected line circuit over conductors TA and RA, through the sidetone circuitry associated with the line circuit, back on conductors TB and RB, through make contacts 5 and 6 of relay 13–C, through the amplifier A, break contacts 1 and 3 of relay B, the secondary and primary of transformer D, and out over conductors RT and RR to the headset of the overrider attendant. The overridden attendant hears his own speech by means of the sidetone circuitry associated with the line circuit to which he is currently connected as these currents return to his position over conductors TB and RB.

2.09–5. CONDITION 3—THE OVERRIDDEN POSITION IS NOT CONNECTED TO A LINE CIRCUIT OR ANOTHER ATTENDANT POSITION AND THE HEADSET-LOUDSPEAKER FEATURE IS IN THE LOUDSPEAKER CONDITION

The third set of conditions assumes that the overridden position is idle since it is not currently connected to a line circuit or another attendant position and that the headset-loudspeaker feature is in the loudspeaker condition. With this set of conditions, the 13–A relay is released, the 13A1 relay is released, the 13–B relay is released, the 13–C relay is operated in a manner similar to that already described.

In this condition, the speech current from the overrider position is transmitted to the overridden position and is applied to the loudspeaker thereat in precisely the same manner described in connection with the immediately preceding condition. Also, the overrider receives sidetone for his speech currents in the same manner described for the preceding condition. The overridden attendant cannot talk to the overrider attendant until he either connects himself with a line circuit or transfers his position to the headset condition. The reason for this is at this time the speech currents from his microphone, which appear on conductors TA and RA, cannot progress beyond the open make contacts 4 and 6 of relay A–1 or the open make contacts 9 and 10 of relay B.

2.09–6. CONDITION 4—THE OVERRIDDEN POSITION IS NOT CONNECTED TO A LINE CIRCUIT OR ANOTHER ATTENDANT POSITION AND THE HEADSET-LOUDSPEAKER FEATURE IS IN THE HEADSET CONDITION

The next set of conditions described is identical to the preceding set except for the fact that the headset-loudspeaker is now in the headset condition. Accordingly, relays A and A–1 are released while relays B and C are operated. The path over which relay B operates may be traced as follows: Ground on conductor J, make contacts 3 of relay C, break contacts 3 of relay A, make contacts 3 of relay HS operated, make contacts 2 of relay TJ operated, to the winding of relay B which now operates since the other side of its winding is connected to battery. The resistance bridge is now used to transmit the speech currents in both directions between attendants as well as to provide a sidetone medium for the speech currents of each attendant. The speech currents from the overrider attendant are received at the headset in the overridden position as follows: Conductors TR and TT from the overrider position, capacitors TR and TT, break contacts 3 and 5 respectively of relay A–1, resistors C–1 and A–2 respectively in the bridge, make contacts 8 and 6 respectively of relay B operated, to conductors RB and TB respectively, the sleeves of jacks A and B respectively, the sleeves of plugs A and B respectively, to the headset receiver. The path over which the speech currents from the overridden attendant's microphone are transmitted to the overrider position is as follows: The microphone in the overridden position, the tips of plugs A and B, the tips of jacks A and B, capacitors A and B, both windings of transformer A, conductors RA and TA, make contacts 9 and 10 of relay B operated, resistors B–1 and D–2 in the bridge, break contacts 2 and 1 of relay A–1, both windings of transformer D, to conductors RT and RR extending to the headset in the overrider position.

The sidetone path for the incoming overrider speech current is as follows: Conductors TR and TT, capacitors TR and TT, break contacts 5 and 3 of relay A–1, resistors D–1 and B–2 of the bridge, break contacts 2 and 1 of relay A–1, and the transformer D and conductors RT and RR extending back to the overrider position. The sidetone path for the overridden position is as follows: The transmitter of the overridden position, plugs A and B, jacks A and B and conductors TA and RA all in a manner similar to that already described, make contacts 9 and 10 of relay B operated, resistors A–1 and C–2 of the bridge, make contacts 6 and 8 of relay B operated, and conductors TB and RB extending back to the headset of the overridden position in a manner already described.

2.10. *Dialing*

The pushbutton dial shown on FIG. 12 transmits coded information which is translated in the register-sender circuit or in the register-connector circuit.

When a dial line is seized for an outgoing call, an idle register sender is automatically connected. For central office or PBX lines, the attendant may operate the start key to recall an idle register-sender when required. The operation of this key places a resistance battery on conductor 0. When an indirect access key is operated, an idle register connector is automatically connected to the output leads of the pushbutton dialer as described.

When either a register-sender or a register-connector is ready to accept digits, ground is furnished on the KR lead to light the RL lamp in a steady manner. A steady RL lamp is the signal to start dialing for the attendant. Operating a digit key grounds two-out-of-five dial code leads designated 0, 1, 2, 4 and 7. The keys are depressed one at a time when a number is dialed. One key must be released before another is pressed. If two or more keys are pressed at the same time, or if a non-valid indirect access code is dialed, the RL lamp will flash to indicate an error. Operating the CLR key erases all stored digits, after which the RL lamp restores to a steady condition. The operation of the CLR key disconnects the ready lamp from conductor KR and applies a ground to conductor 7.

At the completion of dialing, the attached register-sender or register-connector is released. However, on central office and PBX calls, the end key must be operated to signal the end of a train of digits before the register-sender is released. Operation of the end key applies ground to conductor 4 only.

2.11. *Lamp signals*

2.11–1. LINE LAMPS

On incoming calls from line circuits with which a position has direct access, the line circuit connects a flashing battery to the DAL– lead to which it is connected on FIG. 16. This battery is extended through break contacts of relay BL and diode DC– to one side of an associated lamp on FIG. 10. This causes the lamp to flash since the other side of the lamp receives a ground in the key relay circuit.

2.11–2. POSITION PILOT LAMP AND BLANKING

Each attendant position is provided with a P lamp which flashes to signify the presence of incoming calls to which the attendant should give priority. When a position is to be alerted by the flashing of this lamp, a DAP– conductor on FIG. 16 is interconnected with the P conductor of the line circuit whose incoming calls are to be announced by the flashing of the P lamp. On such incoming calls, the line circuit applies flashing battery over its P lead, over the connected DAP– lead, through an associated diode, to operate relay P intermittently. This in turn causes the P lamp to flash. Relay BL also operates and locks at this time in order to extinguish the direct access line lamps of all calls except one currently in a flutter condition (thereby signifying the circuit to which the attendant is currently connected) and any that continues to receive a flashing battery through a diode from its associated DAP– conductor. Relay BL is held operated by a ground on conductor AF at the times relay P is momentarily released. Relay BL releases when relay P releases as battery is removed from the DAP– conductor.

2.12. *Busy indication*

When a line circuit is seized by any position, battery from the seized line circuit is connected over the L leads to light steadily the line lamps connected in multiple at all other direct access line keys assigned to the same line at all other attendant positions. The lamp associated with the key making the line seizure displays a flutter signal since the other side of the lamp is connected to a flutter ground rather than a steady ground.

2.13. *Hold winking*

When a central office or PBX line is held by operating the hold key, a wink frequency is connected in the line circuit to the L lead. This winks all line lamps associated with the held lamp until an attendant reseizes the line.

2.14. *Outgoing signaling*

2.14–1. AUTOMATIC SIGNALLING

When a line arranged for automatic ringing is seized, the line circuit applies ringing voltage to the line without the operation of any ringing keys in the attendant position.

2.14–2. MANUAL SIGNALLING

Manual signaling is applied to the line circuits by operating the ring and flash key R&F or the short ring SR key. Ground for signaling, under control of break contacts at relay 11–TR is connected via conductor RS to the ringing keys. Operating the R&F key connects ground from conductor RF through break contacts at the SR and hold HLD keys to the SV lead. When a line circuit is seized, the operation of the R&F key applies ground through the crosspoints of the crossbar switch to the S lead into the line circuit to operate its signaling relays (relay D of FIG. 17). Similarly, the SR key connects ground through a resistor for signaling a short ring when a selective signaling line circuit arranged for marginal S lead control has been seized.

2.15. *Holding*

To hold a central office or a PBX line, the hold key on FIG. 11 is momentarily depressed. This removes ground from the ringing keys SR and R&F, grounds the SV lead at its make contacts 1, and completes a path to operate relay 11–H. Ground on the SV lead operates, via lead S, a slow release holding relay in the line circuit. Relay H in operating opens the AV lead, releasing a relay in the line circuit to connect a locking path for the holding relay. Relay H also opens the LK lead at its contacts 2 to drop the line circuit. Relay H is made slow to release so that the AV lead is maintained open until the line is disconnected from the position. The line circuit, having established a hold bridge, winks the line lamps of the held line at all appearances until the line is reseized.

2.16. *Flashing*

To flash an operator in attendance on a central office or PBX line connection, the ring and flash R&F key on FIG. 11 is repeatedly operated and released. Whenever a central office or PBX line is seized, relay TR operates and at its contacts 1, disconnects signaling ground from the lead RS to the ringing keys. The flashing operation is traced from ground on conductor RF, through break contacts of the R&F key, then over lead TR, make contacts 5 of relay TJ through break contacts 1 on relay H, to the AV lead. Flashing applied to the AV lead releases and reoperates the line connecting relay in the line circuit.

2.17. *Recording*

A recorder is provided at each attendant position for recording all calls served by each attendant. The recorder is shown on the right-hand side of FIG. 11 and is connected through make contacts 7 and 8 of relay TJ to contacts on relay TR. The contacts on relay TR in turn, either connect the recorder to the secondary of transformer B or the secondary of transformer C. Relay TR is operated whenever the attendant position is connected to a central office line or a PBX trunk. In this condition, its make contacts 4 and 6 connect the recorder to the secondary of transformer B. Relay TR is released for all other types of calls and at these times its break contacts 3 and 5 connect the recorder to the secondary of transformer C.

Present regulations require that an intermittent warning tone be impressed upon any public telephone line whenever a conversation over the line is being recorded. Relay TR and transformer B along with certain equipment in the central office line circuit, are provided to insure that no conversations will be recorded in the event that the equipment which generates the warning tone and impresses it upon the line should become inoperative.

Special signals representing both sides of all calls both to and from an attendant position are impressed upon conductors RB and TB which are connected by means of plugs A and B and jacks A and B to the attendant headset receiver. Accordingly, since the primary of transformer C is connected across these conductors, the same signals appear across the secondary winding of the transformer. It has already been explained that relay TR is normal except for calls to or from central office lines or PBX trunks. Therefore, during the normal condition of the relay, the secondary winding of transformer C is connected by means of break contacts 3 and 5 of relay TR and make contacts 7 and 8 of relay TJ to the recorder which in turn records the calls served by an attendant under these conditions.

The following description explains in detail the operation of the recorder circuit whenever an attendant position is connected to a central office line circuit or a PBX trunk. The necessary circuit details of a central office trunk are shown in FIG. 1A of the drawings and therefore, in the following description, it should be assumed that attendant position 1 as shown in FIGS. 10, 11, 12, 13 and 16 is interconnected with the central office or PBX line circuit 1 shown in the upper left-hand portion of FIG. 1A. Accordingly, conductors TA, RA, TB, RB, AV and SV respectively of the attendant position are at this time connected with conductors TT, TR, RT, RR, A and S respectively of the line circuit.

The interconnection of attendant position 1 with line circuit 1 of FIG. 1A completes the following path to operate relay 11–TR: Ground on the left-hand winding terminal of relay TR, the winding of the relay, break contacts 11 of relay 13–B, the top primary winding of transformer B, out over the simplex comprising both secondary windings of transformer A as well as conductors TA and RA, through the various interconnecting circuits to conductors TT and TR in line circuit 1 of FIG. 1A both windings of inductor T, the upper secondary winding of transformer P, to battery on make contacts 3 of relay A. This relay A is at this time operated over the following path by virtue of its interconnection with attendant position 1: Battery on one side of the winding of the relay, through the winding of the relay, conductor A, through the crossbar switch field, conductor AV in the attendant position, break contacts 1 of relay 11–H, make contacts 5 of relay TJ, break contacts of the R&F key and make contacts 3 of relay TJ to ground on the J conductor. Relay A on FIG. 1A in operating closes an obvious path to operate relay D on the same figure. Relay D in operating closes a holding path for itself to battery in series with relay A on FIG. 13 of the attendant's circuit over a simplex involving the lower secondary of transformer P on FIG. 1A, the secondary of transformer A on FIG. 1A, conductors RT and RR, conductors RB and TB in the attendant's circuit, the primary winding of transformer C on FIG. 11, the lower primary winding of transformer B, break contacts of relay 13–AB and through the winding of relay A to battery. Relay D on FIG. 1A holds and relay A on FIG. 13 operates over this same series circuit.

The top primary winding of transformer B is connected to the simplex comprising the primary windings of transformer A and conductors TA and RA extending to the central office or PBX line circuit. The lower primary winding of transformer B is connected to the simplex comprising the primary windings of transformer C and conductors TB and RB which also extend to the central office of PBX line circuit. These two simplexes comprise what is known as a phantom circuit wherein one simplex comprises one side or conductor of the circuit while the other simplex comprises the other side of the circuit. The other end of this phantom circuit terminates on FIG. 1A on line circuit 1. The side of the phantom comprising the simplex TT and TR is extended through the two windings of inductance T, through one side of the top secondary winding of transformer P, to battery on contacts 3 of relay A. The side of the phantom comprising the simplex RT and RR extends through the secondary windings of transformer A, the lower secondary winding of transformer P, to ground through the contacts and lower winding of relay D. The two secondary windings of transformer P are connected by a capacitor so that the entire secondary is effective across the phantom circuit.

With this arrangement, the transformer P on FIG. 1A and the transformer B on FIG. 11 are effectively interconnected signalwise by the phantom circuit with one side of the phantom circuit comprising the simplex associated with the transmit conductors while the other side of the phantom circuit comprises the simplex associated with the receive conductors. Accordingly, since the transformer P on FIG. 1A and the transformer B on FIG. 11 are interconnected signalwise, any signal impressed on the primary of transformer P is induced on the secondary of transformer B and recorded by the recorder in the event that relay 11–TR is operated.

The tip and ring conductors from the central office or PBX are extended through make contacts 1 and 2 of relay A on FIG. 1A to the T and R input conductors of the recorder-connector. The purpose of this circuit is to provide a passive path whereby the signals on conductors T and R always appear on conductors T–1 and R–1 and whereby the signals on conductors T and R appear on conductors 3 and 4 along with a warning tone for recording purposes as generated by the beep tone generator. The speech currents appearing on conductors T and R also appear on conductors 3 and 4 since the current over conductor R flows through the primary of transformer Q which by means of its secondary applies the speech signals to the input of the amplifier A. The beep tone also normally appears on conductors 3 and 4 since the output of the beep tone generator is applied to another input of the amplifier A. The amplifier comprises an AND circuit together with other circuitry whereby no output appears on conductors 3 and 4 whatsoever if the signals from the beep tone generator are not received at the required rate. In other words, speech signals representing both ends of the conversation are applied to conductors 3 and 4 as long as the beep tone circuitry is operative to superimpose the required warning tone through amplifier A to conductors 3 and 4 for recording purposes. However, if the beep tone generator becomes inoperative or if for any reason the beep tone is not received by the amplifier, it prevents any speech currents from appearing on conductors 3 and 4.

Conductors 3 and 4 from the recorder-connector are connected to the primary winding of transformer P. It has already been explained how transformer P on FIG. 1A is effectively interconnected signalwise with transformer B on FIG. 11 so that any input signals applied to the primary of transformer P are applied to the secondary of transformer B and recorded by the recorder in the event that relay TR is operated. Relay TR is operated at this time over the transmit simplex, as has already been explained, since the position is connected to a central office or PBX line circuit, and therefore the recorder is operative to record all conversations between an attendant and subscriber served by a central office or PBX line circuit provided that the beep tone generator in the line circuit continues operative to permit speech currents as well as beep tone signals to be applied to the primary of transformer P.

In the event that the beep tone generator should become inoperative, no speech currents are applied to the conductors 3 and 4 from the recorder-connector and accordingly no speech currents are transmitted over the phantom circuit from transformer B to transformer P on FIG. 11 and hence, the recorder is unable to record any speech. However, the conversation between the attendant and the subscriber served by the line circuit with which he is connected can continue since the speech currents continue to be applied by the recorder-connector from conductors T and R to conductors T–1 and R–1 and from there over conductors RT and RR to conductors TB and RB. These conductors are in turn connected to the sleeves of jacks and plugs A and B and from there to the headset receiver of the attendant.

Thus, by this means, the recorder is operative to record the conversation in the event that the beep tone circuitry is operative in the recorder-connector and, in the event that it should become inoperative, the recorder ceases to function but yet the attendant and the party with which he is connected may continue their conservation without interruption.

2.18. *Dark environment lamp lighting*

It is contemplated that the attendants manning the position circuits of the present invention will often be stationed in darkened environments such as for example, dimly lighted rooms, etc. It is desirable in such circumstances that all idle direct access lamps be dimly lit in order to permit each attendant to maintain easy orientation of all components at his position. The transistors DJ and DK1 on FIG. 16 together with their associated circuitry provide a means for permitting each attendant to cause the switchboard lamps at his position to be either dimly lit during their no signal condition or alternatively to be completely deenergized. Also provided is means whereby the lamp intensity during the dimly lit no signal condition can be adjusted by each attendant.

The transistor regulator on FIG. 16 acts to maintain a constant reduced lamp supply voltage during the no signal condition. This reduction in voltage is under control of the attendant by means of the manually adjusted potentiometer (DIM) on FIG. 12.

When no active lamp signal indication is present and with the brightness control switch (BR CONT) in the "on" position, battery is connected to conductor DG extending from FIG. 12 to FIG. 16. This battery is supplied to conductor DG by make contacts 3 of the brightness control switch. The battery on this conductor is reduced by the various DG-resistors and is then applied through a DB-diode to conductors LL1–LL6 each of which is connected to one side of the similarly designated lamps on FIG. 10. The other side of the lamps is connected through break contacts on their associated key relays of FIG. 9 to conductor DE extending from FIG. 9 to FIG. 16 where it is connected through resistor DN and the emitter-collector path of transistor DK1 to ground. The current in this circuit causes lamps LL1–LL6 to light dimly.

Each of the diodes DB1–DB6 prevents battery from a line circuit from falsely lighting other lamps at the same position while diodes DC1–DC6 prevent battery on the DG lead from falsely lighting lamps at other positions.

Transistor DJ senses the slight deviations in voltage as traffic changes the number of active lamps at the position. Diode DE is connected to provide a reference voltage at the emitter of transistor DJ so that part of any change in load voltage will appear across the base-emitter junction as the input signal to transistor DJ. The input signal controls the collector current of transistor DJ which through resistor DF is the base current of transistor DK1. Transistor DK1, whose emitter and collector are in series with the lamp load, provides the desired regulating function by maintaining an almost constant voltage drop across its emitter and collector. However, the collector current varies in accordance with the lamp load demand. As the lamp load increases, transistor DJ senses the change and causes an increase in the base current at transistor DK1 thereby resulting in an increased collector current. The decreased resistance through transistor DK1 as its emitter-collector current is increased causes the resistance of this path to lower and thereby apply an increased potential to the lamps in order to compensate for the increased load factor.

The turning of the brightness control switch to its "off" position (1) removes battery from the DG lead thereby extinguishing all idle signal lamps and (2) short circuits the resistor DJ which dims a lamp in the flutter condition. A ground is connected to conductor DE at this time thereby disabling the regulating function of the circuit.

2.19. *Signal circuit*

FIG. 28 discloses the circuit details of the signal circuit which is used to provide the flashing, fluttering and winking signals which are used by the various portions of the present system to provide signal lamp indications at the attendant positions. This circuit also provides certain signaling potentials used in connection with the position pilot lamp blanking feature.

2.19–1. FLUTTER

The flutter potential is provided by a free-running multivibrator comprising transistors T30 and T31 together with their associated circuit elements shown on the upper right-hand portion of FIG. 28. This circuit provides a continually interrupted current path to ground at the rate of approximately 12 pulses per second to its output conductor FL. This conductor is connected to the similarly designated conductor on FIG. 16 of the attendant's circuit which by means of make contacts 2 of relay 13–A causes a line lamp on FIG. 10 to flutter whenever the attendant is connected to the line circuit represented by the line lamp.

2.19–2. FLASHING

The rest of the circuit on FIG. 28 comprises the equipment for generating the flashing and winking lamp potentials as well as the equipment associated with the position pilot lamp blanking feature.

Transistors TA1 and TA2 together with their associated circuitry constitute a free-running multivibrator having an operating frequency of approximately 60 cycles a minute which comprises the timing unit for the circuit. Relay FL1 is in series with the collector of transistor TA1 and accordingly operates each time transistor TA1 conducts, and releases each time transistor TA1 is nonconducting. The potentiometer P1 controls the ratio of the "on" time of transistor TA1 to its "off" time and consequently controls the percent make and break of the contacts of relay FL1.

A circuit requiring a flashing or winking potential from the signal circuit applies a ground to conductor ST to energize the signal circuit. Thus, for example, local line circuit 11 shown in FIG. 17 is one such circuit which utilizes a flashing potential. When the circuit of FIG. 17 desires a flashing battery potential from the signal circuit, it closes make contacts 1 of relay 17–P to apply a ground to the ST lead extending to FIG. 28. Ground on the ST lead operates relay ST over an obvious circuit. The closure of make contacts 1 and 2 of relay ST completes a path to operate relay W from ground on the break contacts of relay FL1 each time FL1 is released and to operate relay FL from ground on the make contacts of relay FL1 each time FL1 is operated. Accordingly, since relay FL1 operates and releases approximately 60 times a minute, relays W and FL operate and release at the same frequency. Relay FLA is connected to ground on make contacts of relay FL each time it operates and accordingly relay FLA follows each operation of relay FL. Similarly, make contacts 2 of relay FLA extend a ground to the winding of relay FLB to cause it to follow each operation and release of relay FLA. Make contacts 1 on relay FLB extend a battery to conductor LF each time the relay is closed. Therefore since all of relays FLB, FLA, FL and FL1 operate and release approximately 60 times a minute, a battery is momentarily applied to conductor LF at the same rate. Also, make contacts 2 of relay FLB apply an interrupted ground at the same rate to conductor LFG.

2.19–3. WINKING

The winking signal, which is used to indicate a hold condition on a central office of PBX line, is furnished by relay W. As previously explained, the operation of relay ST closes a path from relay W to the back contact of relay FL1. Let it be assumed that when the circuit is seized relay FL1 is in the operate portion of the flashing cycle. In this case, relays FL and FLA operate and in turn operate relay W. When relay FL1 releases, ground through its back contact holds relay W operated. When relay FL1 operates on the next half cycle, relay W releases. Relay FL1 in operating operates relay FL again along with relay FLA which, in turn, operates relay W again. This cycle is repeated as long as relay ST remains operated. As can be seen, the W relay remains operated over a major portion of the flashing cycle 97% and is released for a relatively short period 3%. The operation and release of relay W opens and closes the battery potential to the central office or PBX line circuits over conductor LW.

2.19–4. BLANKING

When the blanking feature at the attendant position is made operative and the position pilot lamp is operated by an incoming call, the blanking relay in the attendant's lamp circuit is operated to blank out all lamp indications except the lamp associated with the line to which the attendant is connected, and the lamp associated with the incoming call which should be answered by the attendant. During each half cycle of the flashing interval, ground is applied over conductor AF to hold operated the blanking relay.

Relay ST, which is operated by the calling line circuit, operates relay BL1 from ground on its make contacts 3 and operates relay BL from ground by way of its make contacts 4 and break contacts 2 of relay FLA provided relay FLA is released. The make contacts of relay BL and break contactsof relay FL supply a holding ground on conductor AF. Operation of relay FLB applies a battery to conductor LF which causes circuit operations in the attendant position circuit whereby the blanking relay therein operates. This relay comprises relay 16–P in attendant position 1. The subsequent operation of relay FL removes ground from conductor AF. On the next half of the flashing cycle, relay FL releases thereby re-applying ground to conductor AF. The release of relay FL also releases relay FLA which in turn operates relay BL. The contacts of relay BL operated also supply a ground to lead AF.

On the next half cycle, relay FL operates but ground is maintained on the AF lead by relay BL operated. Relay FLA operates and opens the path for relay BL. Relay BL is slow to release by virtue of diode D20 to insure that the operating path of the blanking relay is closed before the opening of the holding path on conductor AF. This sequence of operations continues until a call is answered, at which time the operate path of the blanking relay 16–P is no longer provided in the attendant circuit and both the P and BL relays release.

Referring briefly to FIG. 16, it may now be appreciated that the flashing battery potential on conductor LF is extended directly to relay 16–P or through make contacts on relays M or L and through the PS diode to the winding of relay P which operates and releases to follow the flashing of the potential on conductor LF. Each operation of relay P closes its make contacts 3 to complete a path to operate relay 3–BL. This relay is provided with a holding path which prevents it from releasing each time relay P releases. This holding path comprises diode BL and conductor AF extending to the signal circuit where, as has just been described, a ground is applied to conductor AF for a sufficient period of time to prevent relay BL from releasing during the release periods of relay P.

It is to be understood that the above-described arrangements are but illustrative of the application of the principles of the invention. Numerous other arrangements may be devised by those skilled in the art without departing from the spirit and scope of the invention.

What is claimed is:

1. A switching system comprising, subscriber stations, an attendant position, a plurality of manually operable keys at said position each of which is individually associated with one of said stations, and common control switching facilities responsive to the operation of a selected one of said keys to alternatively complete incoming and outgoing connections between said position and the subscriber station associated with said selected key.

2. A switching system comprising, subscriber stations, attendant positions, common control switching facilities including a crossbar switch, a plurality of manually operable keys at each attendant position with each key being individually associated with one of said stations, and means including said switching facilities responsive to the operation of a selected one of said keys at any one of said positions to alternatively complete incoming and outgoing connections between said one position and the subscriber station associated with said selected key.

3. A switching system comprising, subscriber stations, attendant positions, common control switching facilities including a crossbar switch having a row individual to each station and a column individual to each position, a plurality of manually operable keys at each attendant position with each key at a position being individually associated with one of said stations, and means including said switching facilities responsive to the operation of a selected one of said keys at a calling one of said positions to interconnect said calling position with the subscriber station associated with said selected key by closing the crossbar switch crosspoints common to said interconnected station and position.

4. A switching system comprising, subscriber stations, attendant positions, an indirect access key and a push-button signal transmitting mechanism at each of said positions, means responsive to the operation of said indirect access key at a calling one of said positions followed by the transmission of a code individual to a selected called station upon activation of said signal transmitting mechanism for registering said code, means responsive to said registration for translating said registered code into an indication exclusive to said called station, a crossbar switch having a level individual to each one of said stations and a column individual to each one of said positions, and means including said crossbar switch responsive to said translation for interconnecting said calling position with said selected station by closing the crossbar switch crosspoints common to said interconnected position and station.

5. In a switching system, a subscriber station and an attendant position, common control switching means including a crossbar switch having a row individual to said station and a column individual to said position, and means responsive to the initiation of an off hook condition at said station for interconnecting it with said attendant position by closing the crossbar switch crosspoint common to both.

6. In a switching system, subscriber stations, attendant positions, common control switching equipment including a crossbar switch having a row individual to each station and a column individual to each position, a line circuit individual to each subscriber station, means responsive to the off hook condition at a calling one of said stations for operating its associated line circuit, and means responsive to the operation of said line circuit whereby said switching equipment interconnects said calling station with one of said positions by closing the crossbar switch crosspoint common to both.

7. In a switching system, subscriber stations, attendant positions, a line circuit exclusive to each subscriber station, selective means at each station operable under control of the subscriber thereat for producing an indication representing a selected one of said positions, means comprising the line circuit associated with a calling one of said stations responsive to the operation of the selective means thereat for registering the identity of any selected position, and means responsive to said registration for interconnecting said calling station and said selected position.

8. In a switching system, subscriber stations, attendant positions, a line circuit exclusive to each station, a dialing mechanism at each station selectively operable under control of the subscriber thereat for generating signals exclusive to any selected called position, a signal registration means in each line circuit for registering the signals generated at its associated station, and switching means responsive to the registration in a line circuit of a signal representing a called position for interconnecting said called position with the station associated with said last-named line circuit.

9. In a switching system, subscriber stations, attendant positions, a line circuit exclusive to each station, a dialing mechanism at each station selectively operable under control of the subscriber thereat for generating signals exclusive to any selected called position, a step-by-step switch in each line circuit operable in response to the receipt of dial signals from its associated station representing a selected position, and switching means responsive to the operation of the step-by-step switch in a line circuit for interconnecting said selected position and the station associated with said last-named line circuit.

10. In a switching system, subscriber stations, attendant positions, a line circuit exclusive to each station, a dialing mechanism at each station selectively operable under control of the subscriber thereat for generating signals exclusive to any selected called position, a signal registration means in each line circuit for registering the signals generated at its associated station, and switching means including a crossbar switch having a row individual to each of said stations and a column individual to each of said positions, said switching means being responsive to the registration in a line circuit of a signal representing a called position for interconnecting said called position with the station associated with said last-named line circuit by closing the crosspoints of said crossbar switch common to both.

11. In a switching system, attendant positions, subscriber stations, selectively operable means for interconnecting said subscriber stations under control of the subscribers thereat with any selected one of said attendant positions, call storage facilities including signal lamps at each of said attendant positions, means for storing at said positions any calls directed thereto, and means operable under control of the attendant at a called position for answering said calls in the order in which they are directed to said called position.

12. In a switching system, attendant positions, subscriber stations, selectively operable means for interconnecting said subscriber stations under control of the subscribers thereat with any selected one of said attendant positions, call storage facilities including signal lamps at each of said attendant positions, means for storing at said positions any calls directed thereto while the attendant thereat is currently engaged on another call, means including said storage lamps for indicating the number of calls currently waiting to be answered at said attendant positions, and means operable under control of the attendant at a called position for answering said calls in the order in which they are directed to said called position.

13. In a switching system, attendant positions, subscriber stations, selectively operable means for interconnecting said subscriber stations under control of the subscribers thereat with any selected one of said attendant positions, call storage facilities including signal lamps at each of said attendant positions, means for storing at said positions any calls directed thereto while the attendant thereat is currently engaged on another call, and means operable under control of the attendant at a called position for answering said stored calls in the order in which they are directed to said called position.

14. In a switching system having attendant positions and subscriber stations, common control switching means operable to interconnect any position with any station, a plurality of direct access keys at each position each of which is individually associated with one of said subscriber stations, means responsive to the operation of any selected one of said direct access keys for interconnecting its position with the subscriber station represented by said selected key, an indirect access key and a pushbutton signal transmitting mechanism at each attendant position, means responsive to the operation of said indirect access key at a position for interconnecting said mechanism with a register connector operable to register and translate transmitted digits, means responsive to the subsequent transmission of a code representing a called station upon activation of said signal transmitting mechanism by the attendant at a calling position for registering the digits of said code, means responsive to the registration of said transmitted digits for translating said registration into an indication exclusive to said called station, and means responsive to said indication for interconnecting the calling position with said called station.

15. In a switching system having attendant positions and subscriber stations, common control switching means operable to interconnect any position with any station and with any other position, a plurality of direct access keys at each position each of which is individually associated with one of said subscriber stations or one of said attendant positions, means responsive to the operation of any selected one of said direct access keys for interconnecting its position with the subscriber station or attendant position represented by said selected key, an indirect access key and a pushbutton signal transmitting mechanism at each attendant position, means responsive to the operation of said indirect access key at a position for interconnecting said mechanism with a register connector operable to register and translate transmitted digits, means responsive to the subsequent transmission of a code representing a called station or position upon activation of said signal transmitting mechanism by the attendant at a calling position for registering the digits of said code, means responsive to the registration of said digits for translating said registration into an indication exclusive to said called station or position, and means responsive to said indication for interconnecting the calling position with said called station or position.

16. In a switching system having attendant positions and subscriber stations, a plurality of line circuits each of which is individually associated with one of said subscriber stations, a crossbar switch having rows and columns, means connecting each of said line circuits to an individual row of said crossbar switch, means connecting each of said attendant positions with an individual column of said crossbar switch, and means operable for closing a selected crosspoint of said crossbar switch to interconnect the attendant position and the line circuit common thereto.

17. In a switching system having attendant positions and subscribers stations, a plurality of line circuits each of which is individually associated with one of said subscriber stations, a crossbar switch having rows and colums, means connecting each of said line circuits to an individual row of said crossbar switch, means connecting each of said attendant positions with an individual column of said crossbar switch, and means operable in response to the initiation of an off hook condition at a calling station to interconnect a certain attendant position and the line circuit associated with said calling station by closing the crosspoint of said crossbar switch common thereto.

18. In a switching system having attendant positions and subscriber stations, a plurality of line circuits each of which is individually associated with one of said subscriber stations, a crossbar switch having rows and columns, means connecting each of said line circuits to an individual row of said cross bar switch, means connecting each of said attendant positions with an individual column of said crossbar switch, and means operable in response to the initiation of a call at one of said positions for closing the crosspoint of said crossbar switch common to said one position and the line circuit associated with the called station.

19. In a switching system having attendant positions and subscriber stations, a plurality of line circuits each of which is individually associated with one of said subscriber stations, a crossbar switch having rows and columns, means connecting each of said line circuits to an individual row of said crossbar switch, means connecting each of said attendant positions with an individual column of said crossbar switch, and means operable responsive to the initiation of a call at one of said stations for closing the crosspoint of said crossbar switch common to said one position and the line circuit associated with the called station.

20. In a switching system, a first subscriber station, attendant positions, means including switching equipment responsive solely to an off hook condition at said first station for interconnecting it with a predetermined one of said attendant positions, a second subscriber station, and selective means under the control of the subscriber at said second station for causing said switching equipment to interconnect said second station with any selected one of said positions.

21. In a switching system, a first subscriber station, attendant positions, a line circuit individual to said first subscriber station, common control switching equipment, means responsive solely to the initiation of an off hook condition at said first station for operating its associated line circuit, means responsive to the operation of said line circuit whereby said switching equipment interconnects said first station with a preselected one of said positions, a second subscriber station, a line circuit exclusive to said second subscriber station, selective means at said second station operable under control of the subscriber thereat for producing an indication representing any selected one of said positions, means comprising the line circuit associated with said second station responsive to the operation of the selective means thereat for registering the identiy of any selected position, and means including said common control switching equipment responsive to said registration for interconnecting said second station and said selected position.

22. In a switching system, a first subscriber station, attendant positions, common control switching equipment including a crossbar switch having a row individual to each station and a column individual to each position, a line circuit individual to said first station, means responsive solely to the off hook condition at said first station for operating its associated line circuit, means responsive to the operation of said line circuit whereby said switching equipment interconnects said first station with a preselected one of said positions by closing the crossbar switch crosspoint common to both, a second subscriber station, a line circuit individual to said second station, a dialing mechanism at said second station selectively operable under control of the subscriber thereat for generating signals exclusive to any selected called position, a step-by-step switch in the line circuit for said second station operable in response to the receipt of dial signals from its associated station and representing any selected called position, and switching means including said crossbar switch responsive to the operation of said step-by-step switch for interconnecting said selected called position and said second station by closing the crossbar switch crosspoints common to both.

23. In combination, subscriber stations, attendant positions, a switching network selectively operable to interconnect the various stations and positions, a plurality of lamps at each position with each lamp at a position being individual to one of said subscriber stations and with certain stations being represented by a lamp at more than one position, means for causing the lamp at each position representing a station currently in a calling or a busy condition to glow, and means at a given position responsive to the receipt of a call from a preselected one of said stations for energizing the lamp associated therewith at said given position and for causing any other energized lamps at the same position to extinguish.

24. The combination recited in claim 23 together with a pilot lamp at said given position and means responsive to the arrival of a call at said given position from said preselected station to cause said pilot lamp to glow.

25. In combination, subscriber stations, attendant positions, a switching network selectively operable to interconnect the various stations and positions, a plurality of lamps at each position with each lamp at a position being individual to one of said stations and with certain stations being represented by a lamp at more than one position, means for causing the lamps at each position representing stations currently in a calling or busy condition to glow, and means at each position responsive to the receipt of a call from preselected ones of said stations for energizing the lamps associated therewith and for causing all other energized lamps to extinguish.

26. The combination recited in claim 25 together with a pilot lamp at each position and means at each position responsive to the receipt of calls from said preselected stations for causing its pilot lamp to glow.

27. In combination, subscriber stations, a line circuit individual to each of said stations, attendant positions, a switching network selectively operable to interconnect the various stations via their line circuits with said positions, a plurality of lamps at each position with each lamp at a position being individual to one of said stations, means for causing the lamps at each position associated with a station currently in a calling or a busy condition to glow, means included in the line circuits of certain stations and responsive to the initiation of a call therefrom for extending a blanking potential to a preselected called position, and means at said called position responsive to the receipt of said blanking potential for energizing the lamp associated with said certain station at said called position and for causing all other energized lamps at the same position to extinguish.

28. The combination recited in claim 27 together with a pilot lamp at said called position and means responsive to the receipt of said blanking potential for causing said pilot lamp to glow.

References Cited by the Examiner

UNITED STATES PATENTS

| | | | |
|---|---|---|---|
| 1,507,144 | 9/1924 | Valette | 179—84 |
| 1,927,531 | 9/1933 | Stonebridge | 179—18 |
| 2,261,243 | 11/1941 | Flint | 179—27.23 |
| 2,444,033 | 6/1948 | Cohrt | 179—18.8 |
| 2,534,850 | 12/1950 | Bowne | 179—18 |
| 2,761,908 | 9/1956 | Bakker | 179—27.02 |
| 2,857,472 | 10/1958 | Judy | 179—27.1 |
| 2,883,472 | 4/1959 | Stehlik | 179—18 X |
| 2,927,970 | 3/1960 | Blow et al. | 179—18.8 |
| 3,050,588 | 8/1962 | Benson et al. | 179—18 |
| 3,115,551 | 12/1963 | Plyer | 179—18 |

FOREIGN PATENTS

| | | |
|---|---|---|
| 937,258 | 9/1963 | Great Britain. |

KATHLEEN H. CLAFFY, *Primary Examiner.*

WALTER L. LYNDE, WILLIAM C. COOPER, ROBERT H. ROSE, *Examiners.*

L. A. HOFFMAN, *Assistant Examiner.*